United States Patent [19]
Winn et al.

[11] 3,876,979

[45] Apr. 8, 1975

[54] DATA LINK ARRANGEMENT WITH ERROR CHECKING AND RETRANSMISSION CONTROL

[75] Inventors: Melvin Winn, Lombard; William R. Wedmore, Glen Ellyn; John S. Young, Addison, all of Ill.

[73] Assignee: GTE Automatic Electric Laboratories Incorporated, Northlake, Ill.

[22] Filed: Sept. 14, 1973

[21] Appl. No.: 397,454

[52] U.S. Cl. .......................................... 340/146.1 BA
[51] Int. Cl. ........................ G06f 11/08; G08c 25/02
[58] Field of Search ................ 340/146.1 BA, 172.5

[56] References Cited

UNITED STATES PATENTS

| | | | |
|---|---|---|---|
| 3,473,150 | 10/1969 | McClelland | 340/146.1 BA |
| 3,641,494 | 2/1972 | Perrault et al. | 340/146.1 BA |
| 3,648,256 | 3/1972 | Paine et al. | 340/146.1 BA |
| 3,671,945 | 6/1972 | Maggio | 340/146.1 BA |
| 3,676,846 | 7/1972 | Busch | 340/146.1 BA |

*Primary Examiner*—Charles E. Atkinson
*Attorney, Agent, or Firm*—John T. Winburn

[57] ABSTRACT

At each end of a four wire transmission facility, there is a transmitter and a receiver, used between the base location of a toll service position system (TSPS) and a traffic office having operator positions. The messages are used for functions such as lighting lamps and signalling operation of keys. There are buffer stores for a number of messages, and they are given sequence numbers from one to seven. If there is an error such as a sequence number other than one expected next, or a Bose-Chandhuri check error indication, a retransmission request message is sent. In response thereto, all messages subsequent to the last sequence number correctly received before the error was detected are retransmitted, the first retransmitted message having a retransmission flag as a part thereof. At the receiving end all messages received after the erroneous messages are rejected until the one with the flag bit set is received. The rejected messages are counted, with a maintenance request if a given number is exceeded.

9 Claims, 70 Drawing Figures

OVERALL BLOCK DIAGRAM

OVERVIEW DIAGRAM

OVERALL BLOCK DIAGRAM

POSITION MULTIPLEXER (MUX)

KEY STATE INTERPRETER
(KSI)

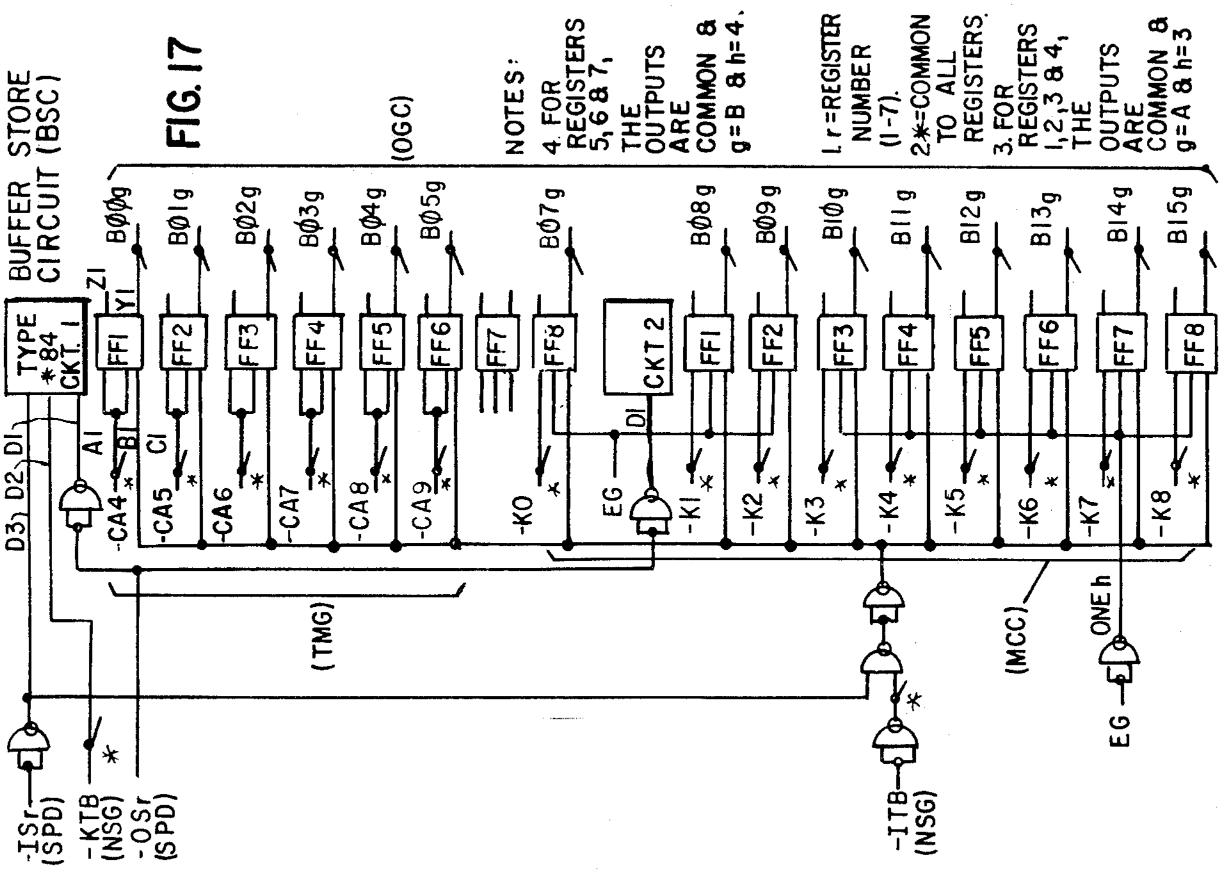
FIG. 17

NOTES: 1. r=REGISTER NUMBER (1-7). 2. *=COMMON TO ALL REGISTERS. 3. FOR REGISTERS 1,2,3 & 4, THE OUTPUTS ARE COMMON & g=A & h=3. 4. FOR REGISTERS 5,6 & 7, THE OUTPUTS ARE COMMON & g=B & h=4.

FIG. 13

NEW STATUS WORD GENERATOR (NSG)

$NEW.SK = T3 \cdot \overline{PSB} \cdot \overline{BFF}(SK \cdot \overline{SI} \cdot \overline{Z} + SK \cdot SI \cdot K \cdot \overline{I} + \overline{SK} \cdot \overline{SI} \cdot K)$ $NEW.SI = T3 \cdot \overline{PSB} \cdot \overline{BFF}(SK \cdot SI \cdot \overline{Z} + SK \cdot SI \cdot K \cdot I + \overline{SK} \cdot SI \cdot K)$

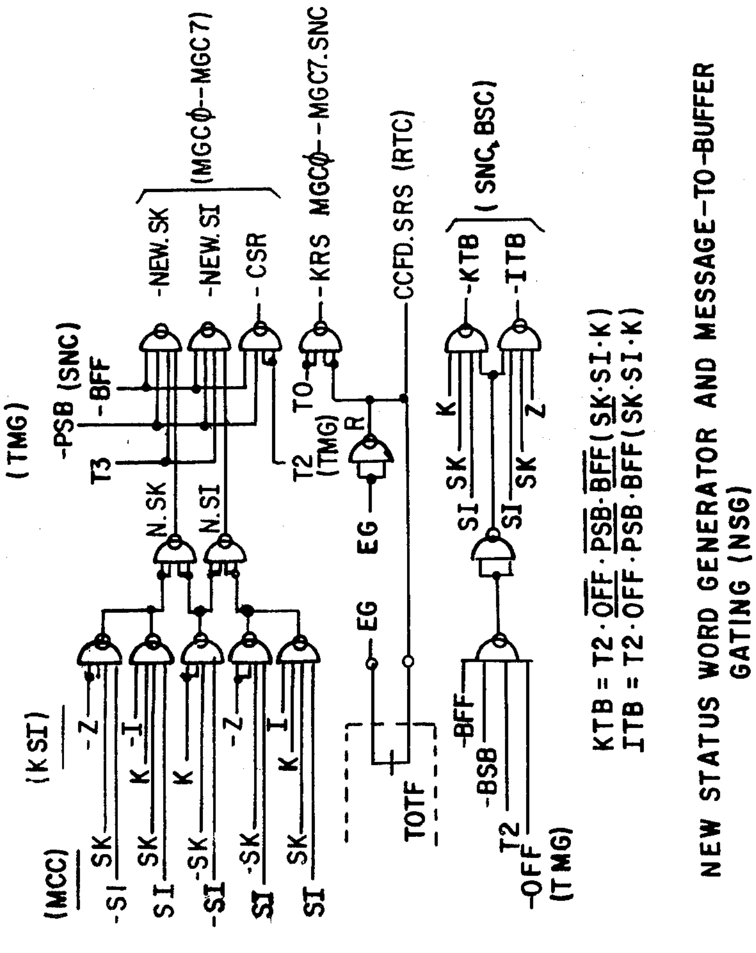
$KTB = T2 \cdot \overline{OFF} \cdot \overline{PSB} \cdot \overline{BFF}(\underline{SK} \cdot SI \cdot K)$ $ITB = T2 \cdot OFF \cdot PSB \cdot BFF(SK \cdot SI \cdot K)$

NEW STATUS WORD GENERATOR AND MESSAGE-TO-BUFFER GATING (NSG)

1 NSG PER COPY

TIMING AND CONTROL CIRCUITS (TMG)

BUFFER STORE CONTROL
SEQUENCE NUMBER COUNTERS
(SNC)

POSITION AND SEQUENCE NUMBERS DECODERS (SPD)

OUTPUT GATING CIRCUIT
(OGC)

OFF-LINE DETECTOR WAVEFORMS

POSITION SCAN TIMING WAVEFORMS

TRAFFIC OFFICE MATRIX--WORD W01

TRAFFIC OFFICE MATRIX--WORD W15

LT1-SEND MULTIPLEXER

FIG. 38 RT SEND MULTIPLEX

RT RECEIVE---GATE CLOCK PULSES

RT RECEIVE---DEMULTIPLEXER

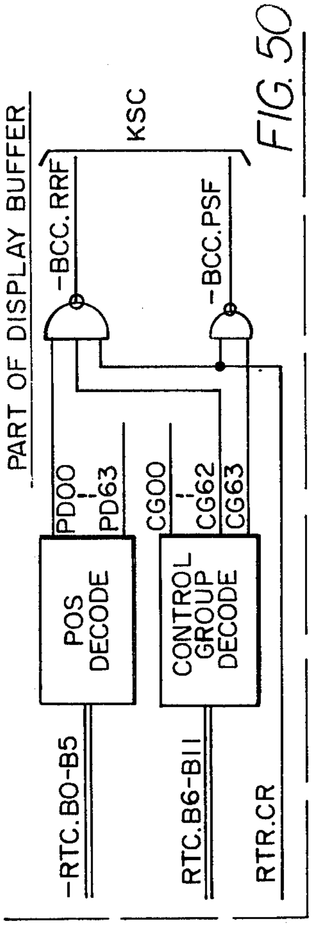
FIG. 50
TRAFFIC OFFICE MATRIX TOAF1
| | | |
|---|---|---|
| W00 | DATA LINK TRANSMITTER FOR T.O.# | 0 |
| 01 | " " " " " | 1 |
| 02 | " " " " " | 2 |
| 03 | " " " " " | 3 |
| 04 | " " " " " | 4 |
| 05 | " " RECEIVER A " " | 0 |
| 06 | " " " " " " | 1 |
| 07 | " " " " " " | 2 |
| 08 | " " " " " " | 3 |
| 09 | " " " " " " | 4 |
| 10 | " " RECEIVER B " " | 0 |
| 11 | " " " " " " | 1 |
| 12 | " " " " " " | 2 |
| 13 | " " " " " " | 3 |
| 14 | " " " " " " | 4 |
| 15 | CONTROL BITS DLA,DMB,DLB,BCF,SRS,TFF | |
FIG. 46
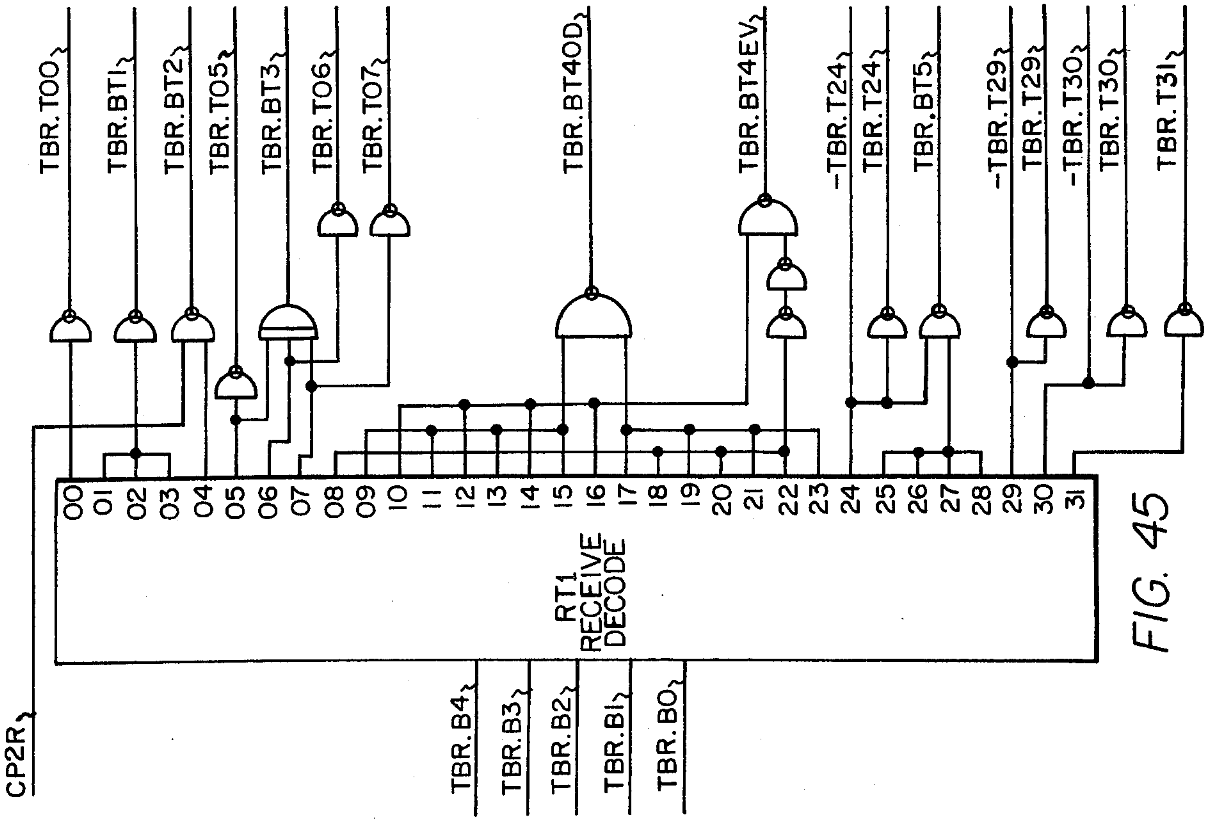
FIG. 45

S LOAD MESSAGE QUEUE
SH. 2-3

S LOAD MESSAGE QUEUE
SH. 3-3

S DATA LINK CONTROL
SH. 1-4

S DATA LINK CONTROL
SH. 2-4

S DATA LINK CONTROL
SH. 3-4

S UNLOAD DATA LINK
SH. 2-3

S STORE MESSAGE IN BUFFER
SH. 1-1

DATA LINK ARRANGEMENT WITH ERROR CHECKING AND RETRANSMISSION CONTROL

BACKGROUND OF THE INVENTION

1. Field of the Invention

This invention relates to a data link arrangement with error checking and retransmission control, and more particularly to a data link used in a communication switching system such as a toll service position system, to send a sequence of command messages to a plurality of operator positions for functions such as lighting lamps, and for receiving a sequence of indication messages from the operator positions for functions such as operation of keys.

2. Description of the Prior Art

Data transmission relating to operator positions is included in the description in the Bell System Technical Journal, December 1970, Volume 49, No. 10, particularly at pages 2596–2612. In this type of system, if any errors are detected, a message should be retransmitted. However by the time a retransmission request is sent back to the source of the message, other messages may have already been sent, so that the retransmitted message is out of sequence. This could cause some problems, for example if the messages are a series of digits of a telephone number and become out of order, the number is wrong.

SUMMARY OF THE INVENTION

According to the invention, a sequence number is sent with each message, and this sequence number is compared with the number expected, e.g. one greater than the sequence number of the previous message in rotation with number one following the highest number (seven). If there is a failure such as in the sequence number comparision, or an error indicated by checking bits sent with the message, then a retransmission request message is sent back. An important feature of the inventions relates to a provision for retransmitting not only erroneous message, but all subsequent messages in sequence, even though they may have been already transmitted. A retransmitted message flag is sent as part of the first message retransmitted, and at the receiving end all messages received after the erroneous message are rejected until the message with the retransmission flag is received.

CROSS REFERENCE TO RELATED APPLICATIONS

This invention is included in a TSPS system briefly described in the GTE Automatic Electric Technical Journal, Vol. 12, No. 7, July 1971, pages 276–285.

The central processor and the peripheral controller are disclosed in a U.S. patent application for Control Complex for TSPS Telephone System, by E. F. Brenski et al, now U.S. Pat. No. 3,818,455.

Hereinafter referred to as the Central Processor patent application.

The key scanner disclosed herein is claimed in a U.S. patent application by A. Limberg, W. R. Wedmore, and J. S. Young Ser. No. 395,896, filed on Sept. 10, 1973.

The jack status reporting circuit disclosed in FIG. 9 herein is claimed in U.S. application by J. S. Young, Ser. No. 397,566, filed on Sept. 14, 1973.

DESCRIPTION OF THE DRAWING

FIGS. 12–18 are functional block diagrams of circuits of the key scanner;

FIGS. 40–45 are functional block diagrams of the remote terminal receiver;

FIG. 46 is a diagram showing word assignments for one traffic office matrix;

FIG. 50 is a functional block diagram of a portion of the display buffer at a traffic office;

DESCRIPTION OF THE PREFERRED EMBODIMENT

The system in which the invention is embodied is described in an article entitled "Improved Efficiency in Toll Handling with TSPS (Traffic Service Position System)" in the GTE Automatic Electric Journal, Vol. 12 No. 7, July 1971, pages 276–285. The central processor is disclosed in a U.S. patent application for a Control Complex for TSPS Telephone System by E. F. Brenski et al, now U.S. Pat. No. 3,818,455.

TRAFFIC OFFICE CONTROL-OVERVIEW

1. General

All operator's positions associated with TSPS installation function as a single team. However, it is convenient for administrative reasons to divide the positions into groups and to permit these groups to be independently located as desired by the operating telephone company. Such a group of positions and certain associated administrative and control hardware constitute a traffic office (TO).

a. The following limits have been established:

1. Each traffic office may include up to 62 positions.

2. Up to 9 traffic offices may be provided; however total positions may not exceed 320.

b. In addition to the operator's positions, a traffic office is considered to include:

1. A redundant voice band Data Link for 2-way communication with the central control unit.

2. A Display Buffer and associated control equipment for turning lamps on and off at the positions under program control.

3. A Key Scanner for sensing and reporting operator key operations to the program.

4. A Centralized Supervisor system. This is an independent switching arrangement for voice communications between operators and supervisors within the traffic office.

5. Administrative cabinets, which provide a lamp display of position status.

6. Controlled Traffic Cabinet, which permits the chief administrator (operator) to communicate certain instructions to the program.

7. Each traffic office includes a read only teletype machine for reporting force administration information to the chief operator as a part of the FADS program (Force Administration Data System). The teletype is controlled via a dedicated facility and is treated as an I/O device rather than a part of the traffic office control.

8. The Maintenance Report Generator originates various fault and diagnostic response messages which are sensed and reported by the Key Scanner in a manner identical to that for key operations on working positions. It is therefore referred to as a psuedo position with address 00 although there is nothing that physically resembles a console.

9. Means are provided for training new operators independent from "live" traffic. Training positions are associated control units are included as a permanent part of the traffic office; this equipment simulates various call handling situations. Training equipment has no connection with other units in the traffic office or with the base control, and is not discussed further in this specification.

Figure 1:
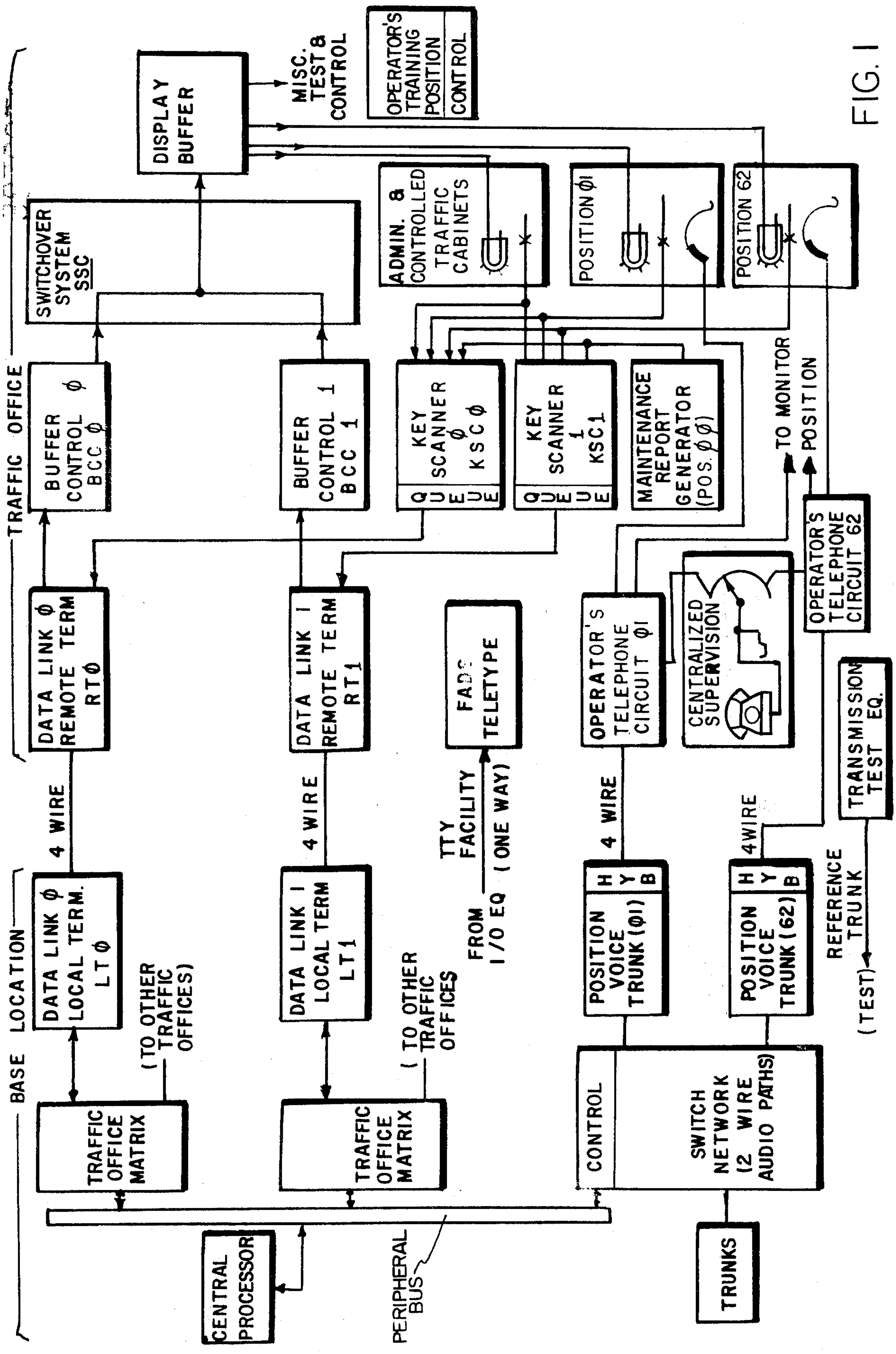
FIG. 1 is a block diagram of a traffic office and its interconnection with the base unit in a TSPS system.

A block diagram of a Traffic Office and its interconnection with the base unit shown in FIG. 1. The Traffic Office portion of the equipment shown is a separate entity, and is so treated regardless of location. That is, there are no differences in the hardware types, frame complements, or method of operation whether the Traffic Office is collocated with the base unit or is remote, except that in the former case it is feasible to share power supplies.

c. As shown, there are a number of facilities dedicated for the interconnection requirements. In the collocated case these reduce to switch-board cable; otherwise, it is necessary to consider the transmission and reliability constraints for each function. A Traffic Office is divided into two distinct areas:

1. The operating area is designed to provide a pleasant working environment for the operating team, with careful attention paid to such things as color schemes, ambient light and noise, and floor plans. This area contains those equipment items having to do directly with the team, and includes the working and training consoles, administrative cabinets, Supervisor's telephone equipment and the FADS teletype.

2. The equipment room contains the following items:

A. Two-Traffic Office Control Frame (TOCF) (See FIG. 2).

B. One Traffic Office Transfer(TOTF).

C. A plurality of Display Buffer Circuit Frames (DBCF). One frame is required for each ten equipped positions.

D. One-Traffic Office Supervisory Frame (TOSF).

E. One Operator's Position Equipment Frame (OPEF)

F. Conventional telephone type D.C. power (48 V. nominal), 150 Ampere capacity.

G. Carrier and/or other facility related equipment as required.

In the collocated case, the Traffic Office equipment area is a part of the base unit and is served by the same power supply.

2. Hardware Organization 2.1 Common Control a. A convenient starting point for considering the functions of the various hardware groups is the unit of packaging: the frame.

At the base location, traffic office control functions center on the Traffic Office Access Frame (TOAF); that is, the frame contains the hardware that directly interfaces with the stored program control. This equipment includes those items on the block diagram FIG. 1 shown as the Traffic Office Matrix and the Data Link, Local Terminal.

At the Traffic Office the principal control functions are provided by equipment located in the Traffic Office Control Frame (TOCF). This equipment includes the Data Link Remote Terminal (RT), the Buffer Control (BCC), and the Key Scanner (KSC). Together these two frames and appropriate interconnecting facilities constitute an electronic common control.

Two copies of this common control are always provided. On FIG. 1 the number 0 and 1 on each of the respective subdivisions of the control indicate the copy number.

Figure 2:
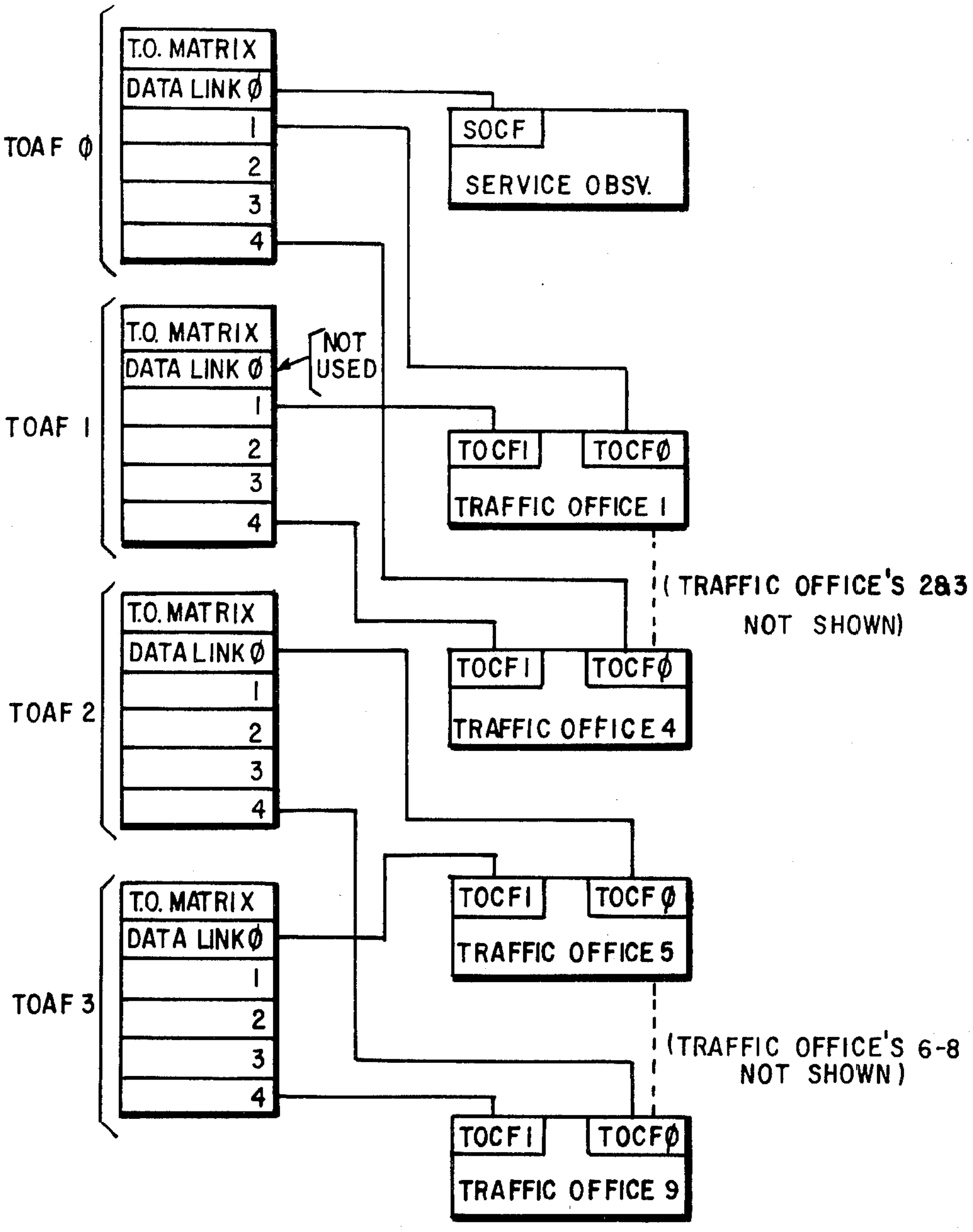
FIG. 2 illustrates the assignment and duplication plan for the equipment of FIG. 1 for a maximum installation of nine traffic offices.

One Traffic Office Matrix (TOM) serves as the program interface for 5 data links, each serving a different Traffic Office. FIG. 2 illustrates the assignment and duplication plan for this equipment for a maximum installation of 9 Traffic Offices.

Note that a non-duplicated link is assigned to Service Observing, which therefore has some of the dimensions of a tenth Traffic Office.

In the organization of the Traffic Office Access Frame, a Bus Interface (mnenonic BIB) provides the connection with the A.C. bus system and hence with the Peripheral Control. Physically, the Traffic Office Matrix is distributed in the various files containing the Local Terminal logic. Electrically, the TOM is a specialized form of Control Matrix broadly classified as a Hybird Matrix (HYM). As is the case with other types of matrices, the TOM consists of 16 words of 32 bits each of which can be addressed by program on a word basis for writing and/or reading. The bistable element is a flip-flop implemented with High Threshold Logic. The TOM bistable is called a Dual Access Matrix Point (DAMP), because it can be set and reset by external hardware as well as under program control. Bits in the matrix are assigned as data registers, hardware/software interface control functions, and various hardware counters, etc. In general, each Local Terminal, its associated portion of the TOM and its data modem are divided into transmit and recieve groupings, indicating data transmission to and from the traffic office.

The data system is essentially a parallel to serial to parallel arrangement. Serial transmission over the facility uses Frequency Shift Keying, Duo-binary encoding and is at the rate of 2400 bits/second. The Remote Terminal includes the data modem and associated logic for receiving and transmitting messages from and to the base location. Principal data originating at a Traffic Office are operator key operations. The Key Scanner sequentially gates each position key bus into detecting logic.

When a valid key operation is noted, the position identity and an appropriate code for the particular key are loaded into a queue register. The latter can store up to seven such messages; this covers the random and asynchronous nature of the source data and establishes the input for the Remote Terminal.

Messages originating in software are received at the Remote Terminal and extended to the Buffer Control Circuit for decoding and (usually) selection of a lamp control function.

(b) Method of Operation

Normally one of the copies of the Traffic Office Control is "active" and the other "standby". Quiescently, the two pairs of modems each transmit an "idle pattern" in each direction. This consists of alternate ones and zeros and serves to maintain receiver synchronism and verify the operability of the link.

At intervals of 20 milliseconds the Traffic Office Control Program (TOCP) loads a message into the DAMP transmit register associated with the active copy, and unloads the data (if any) from the receive register. The message loaded by TOCP is 19 bits long and includes a position address (one of 64), the identity of a single lamp on that position, and the control action to be performed (on, off, flash). Also, each message contains a 3 bit sequence number to ensure that no messages are missed.

If no message is available at the TOCP entry time, a dummy message is loaded with sequence number 000. Thus the active copy is handling a continuous flow of 50 messages per second. Transmit time is approximately 12 milliseconds, so that the remaining 8 milliseconds are occupied with the idling pattern.

At the time a message is loaded, the Local Terminal initiates a "start-of-message" sequence of 4 bits to flag the remote receiver that a message is coming. During transmission a Bose-Chaudhuri check sum of 5 bits is computed; this is appended after the message bits.

When the receiver detects "start-of-message" succeeding data bits are loaded into a register. The sequence number received is verified, and a Bose-Chaudhuri check sum that is computed locally is matched with that received from the transmitter. If all checks pass, the message is extended to the Buffer Control, and a return message is initiated. The latter will be a report of a key operation if such a message is stored in Key Scanner quene; otherwise a dummy message is sent. Messages transmitted from the Traffic Office are similar in form to those from the base location, and also include sequence numbers and check sums.

If something is wrong with a received message a return message asks for a retransmission, and identifies the sequence number at the point of failure. This causes a back-up at the transmitting end, resending all messages from that point. This sequence therefore provides maximum software control of the operation. The Traffic Office transmits a message when and only when a message has been received. Such a stimulus-response characteristic quickly detects a malfunction, permitting appropriate maintenance action to be taken.

The standby copy also operates in the stimulus-response mode. The Call Processing program has no interest in this copy, hence only maintenance routines will access the standby control.

2.2 Display Buffer

Each Display Buffer Circuit Frame (DBCF), serves up to ten positions. Five matrix-size files are provided, each of which mounts relay cards for lamp control on two positions.

Type HQA relays are electrically organized in a coordinate array; a particular relay is operated via coincident activation of a Position Select line and a Function Select line. The active copy of BCC decodes the appropriate bits in the incoming message and turns on Main Battery and Main Ground (electronic) switches to secure the desired operation.

The selected relay may be one of a group, the contacts of which perform the final decoding operation to select one lamp of N in a particular group whose members are mutually exclusive. (In some cases N=1; i.e., only one relay is needed in such a "group"). Other relays are employed to specify a flashing mode of operation for a particular lamp group. A third classification of relay breaks a locking circuit for other relays in a group, and therefore performs the reset function.

Since ten positions are served by one DBCF, six frames are required to implement 60 positions within a Traffic Office. A seventh frame with only file A equipped is necessary when positions 61 and 62 are provided.

The Display Buffer is a simplex unit, controlled by the active copy of BCC. The Switchover System (described later) establishes the association of the DB with BCC.

Certain miscellaneous functions are selected by BCC at position addresses 00 and 63. The relays involved are not strictly a part of Display Buffer and are mounted elsewhere; however, they are logically an extension of the same coordinate array.

2.3 Centralized Supervision

The Centralized Supervision System is a locally controlled switching arrangement for establishing audio paths within the Traffic Office. There are two principal modes of operation:

a. An operator initiates a request for a connection to a supervisor, typically while connected to a suscriber. The supervisor can answer at one of two Call Commander key telephones, or at one of (up to) 10 floor locations.

b. A supervisor initiates a monitoring or talking connection to a position from the Call Commander location.

Miscellaneous key telephone features such as regular Central Office lines are provided as desired by the operating company.

2.4 Traffic Office Transfer Frame

The TOTF is so named because it is the home of the Switchover System SSC. In addition, several unrelated mescellaneous circuits are mounted in this frame, including:

a. Power and Line equipment for the key telephones.

b. Monitoring Amplifiers for the monitoring position and supervisors c. Position 63 and 00 equipment, which includes the control of the Administrative Cabinet, the Maintenance Report Generator, and the Test and Monitor Buffer.

d. Distribution relays for flashing lamp power and for "Call Waiting" lamps.

e. Configuration Control and indicator keys and lamps. The TOTF is located between the two copies of TOCF and therefore is a convenient point for monitoring and selecting certain maintenance functions associated with common control.

2.5 OPEF

Operator's Positions Equipment Frame (OPEF) mounts position dedicated relay equipment which provides interfaces with Centralized Supervision, Monitoring and Test functions, and with the voice facility to the base location.

Reference Trunk hardware (used to check the performance of operator's voice facilities) is also mounted in this frame.

3. Base Location To Traffic Office Inter-Connection Facilities 3.1 Data Link

As mentioned above, the data system employs Duobinary Encoding and Frequency Shift Keying (FSK); data rate is 2400 bits per second. It therefore requires a voice band circuit, and any type of voice facility can be used provided that facility meets applicable standards. Thus, this service might be provided via physical cable pairs, conventional or PCM carrier, or radio links.

Each of the two links for a particular Traffic Office is a 4-wire circuit providing independent transmission in each direction. It is important to note that two links are provided for reasons of security, and that failure of both constitutes a complete outrage of that Traffic Office. It is therefore very desirable that no single fault (as of a carrier group, power supply, or cable route) should affect both links.

3.2 Operators Voice Facilities

Each equipped operator's position requires a dedicated 4-wire facility for voice transmission. As with the data system, physical plant, carrier channels, etc. may be used for these facilities provided applicable transmission specifications are met.

No signalling equipment is used with operator voice channels, as all call handling information other than voice is exchanged via the data system.

Since various types of carrier offer economical means of providing relatively large numbers of voice channels, it is necessary to consider the effects of faults in such equipment that could affect a significant number of positions. The occupancy of a staffed position is high, and a relatively small loss of total capability might seriously degrade the performance of the system. Accordingly, means have been provided to transfer a group of Position Voice Trunks from a failed carrier group to a standby group. The number of groups required per Traffic Office and the number of positions assigned per group are variables to be wired per job requirements. Only one standby group is used, which can then be substituted for any one of the (up to 8) working groups. The "transfer relays" at each end of a working group can be operated to affect the desired transfer. This is a manual procedure, initiated by an entry on the maintenance teletype.

3.3 Teletype Facility

The facility needed for the Traffic Office FADS teletype may be any standard circuit capable of 100 w.p.m. operation. No special security precautions are necessary, as temporary loss of this function is non-service affecting.

3.4 Reference Trunk

A relay switch is provided at the Traffic Office end of each operator's voice facility to connect it to a reference trunk. This provided for one-man testing of these facilities at the base location. The reference trunk is a one-way voice band circuit. Selection and control of the required switch is via the BCC and Test and Monitor Buffer (TMB); the Maintenance Man initiates the message to appropriate programs that in turn cause the above switching action via a data message to the Traffic Office.

KEY SCANNER

General

The Key Scanner Circuit (KSC) detects events within the Traffic Office and constructs appropriate messages for transmission and subsequent reporting to the program. Most of the events of interest are key operations at the (up to) 62 operator's positions; others are key operations at the Controlled Traffic Cabinet, outputs of the Maintenance Report Generator (MRG), and change of status at a position (headset in or out).

The MRG and the Controlled Traffic Cabinet are assigned (position) addresses 00 and 63, respectively. Thus there are effectively 64 addresses or positions within the Traffic Office which can originate signals to KSC.

Position Bus

A separate nine wire bus is dedicated to each position, and appears in multiple at both copies of KSC. This is the only area of commonality between the two copies; in all other respects they function independently and asynchronously. Each copy performs a continuous sequential scan of the 64 busses, except when interrupted by a Position Status Request, as described below.

A basic assumption of this subsystem is that only one key will be operated at a time at a particular position. Such an operation marks three of the nine wires in that position bus. The possible combinations of nine things taken three at a time is 84.

Initial requirements are for 64 codes from the Traffic Service Positions (TSP), as shown in the table 3/9 code assignments, leaving 20 unassigned within the chosen structure. The table also shows the assignment of codes for the Controlled Traffic Cabinet (CTC), and for POS 00, which includes the MRG and the Traffic Office Test Set.

Figure 8:
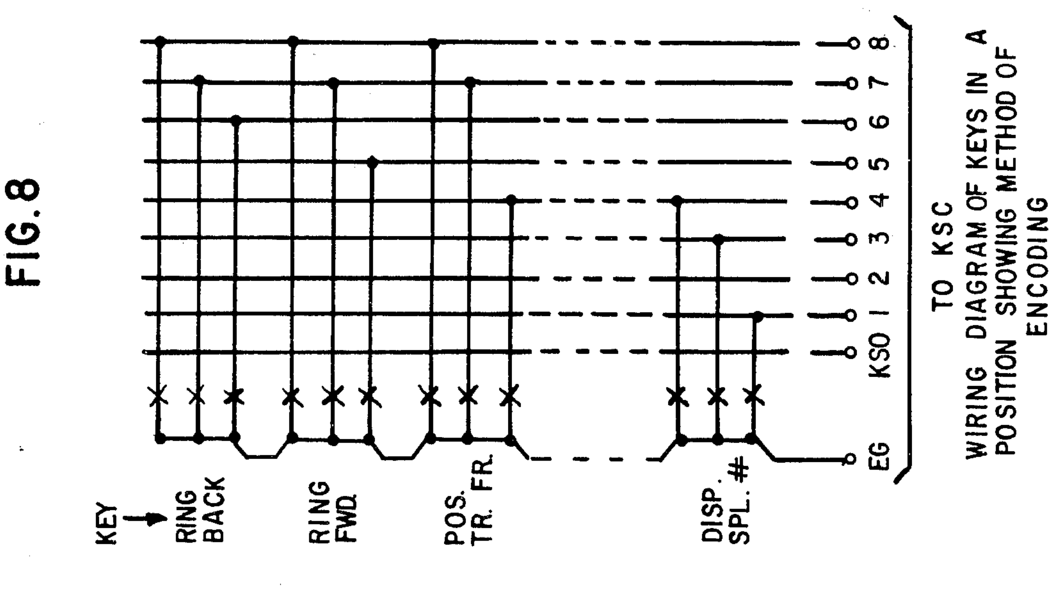
FIG. 8 is an empirical sketch of the key-bus wiring in a position.

Since only one valid message can exist on a position bus, it follows that all keys and other signal sources must be momentary contact in order that the bus will be cleared prior to the next message from that address. Each position key has three contacts which are hard-wired to three leads in the bus in accordance with the assigned code for that key, (See FIG. 8). The MRG is similarly arranged except that relay contacts substitute for the manual key contacts.

marks on the bus, along with one of the memory states in (2) above.

a. If the key was an "ordinary" key, the memory is reset, and the scanner moves on.

b. If the key was in the IOR (Indication On Release) group, the IOR message is loaded into the message store before resetting the memory. The IOR category is reserved for those keys for which some software action is required when the key is restored,

3/9 CODE ASSIGNMENTS

| | INDICATION ←KØ K8→ | TSP KEY (POS. Ø1–62) | ACT KEY (POS. 63) | MRG/TRAFFIC OFFICE TEST SET (POS. ØØ) |
|---|---|---|---|---|
| IOR CODES | 000000111 | RING BACK | | |
| | 000001011 | " FWD | | |
| | 000010011 | POSN. TRFR. | | |
| | 000100011 | COIN COLL. | | |
| | 001000011 | " RET. | | |
| | 010000011 | CNL TMG | | |
| | 100000011 | DISPLAY TIME | | |
| | 000001101 | " CHG. | | |
| | 000010101 | | | |
| | 000100101 | | | |
| | 001000101 | | | |
| | 010000101 | | | |
| | 100000101 | | | |
| | 000011001 | 1 | 1 | MRG, CURRENT SENSOR NO. 1, COPY Ø |
| | 000101001 | 2–ABC | 2 | " " " " 2, " |
| | 001001001 | 3–DEF | 3 | " " " " 3, " |
| | 010001001 | 4–GHI | 4 | " " " " 4, " |
| | 100001001 | 5–JKL | 5 | " " " " 5, " |
| | 000110001 | 6–MNO | 6 | " " " " 1, COPY 1 |
| | 001010001 | 7–PRS | 7 | " " " " 2, " |
| | 010010001 | 8–TUV | 8 | " " " " 3, " |
| | 100010001 | 9–WXY | 9 | " " " " 4, " |
| | 001100001 | Ø | Ø | " " " " 5, " |
| | 010100001 | ST | ST | " INVALID BCC Ø RECONFIGURE MSG. |
| | 100100001 | | KP INCL. | " " " " " |
| | 011000001 | | KP ACV. | " " BCC Ø & 1 " " |
| | 101000001 | | | " TRANSFER RELAY FAIL |
| | 110000001 | KP RATE | | " MOD. FAIL, COPY Ø |
| | 000001110 | " NFY | | " " " " 1 |
| | 000010110 | " SPL | | " DEMOD. FAIL " Ø |
| | 000100110 | KP BACK | | " " " COPY 1 |
| | 001000110 | KP FWD. | | " CENT. SUPV. MAJOR |
| | 010000110 | KP TRBL. | | " " " MINOR |
| | 100000110 | | | " FUSE, MRG. CARD 1 |
| | 000011010 | STATION PAID | | " TOCF Ø FUSE ALM. |
| | 000101010 | " COL. | | " TOCF 1 " " |
| | 001001010 | " SPL.CLG. | | " EQPT. ALM, MAJOR |
| | 010001010 | " SPL.CLD | | " POWER ALM. " |
| | 100001010 | " AUTO.COL | | " EQPT. ALM, MINOR |
| | 000110010 | " DDD | | |
| | 001010010 | | | " REQUEST, TOCF Ø |
| | 010010010 | PERSON PAID | | " " TOCF 1 |
| | 100010010 | " COL | | " POWER ON, TOCF Ø |
| | 001100010 | " SPL.CLG. | | " " OFF, " |
| | 010100010 | " " " | | " " ON, TOCF 1 |

| INDICATION ←KØ K8→ | TSP KEY (POS. Ø1–62) | MRG/T.O. TEST SET (POS. ØØ) |
|---|---|---|
| 100100010 | | MRG. POWER OFF, TOCF 1 |
| 011000010 | | " LOCAL TEST, TOCF |
| 101000010 | NO AMA | " TRANSFER TOCF |
| 110000010 | OGT 1 | " INT. Ø FAIL |
| 000011100 | " 2 | " " 1 " |
| 000101100 | " 3 | |
| 001001100 | " 4 | |
| 010001100 | | |
| 100001100 | T&C | |
| 000110100 | PERSON CALL BK. | " FUSE, MRG. CARD 2 |
| 001010100 | RLS BACK | T.O. TEST 1 |
| 010010100 | RLS FWD | " " 2 |
| 100010100 | SR | " " 3 |
| 001100100 | MAKE BSY | " " 4 |
| 010100100 | GST | " " 5 |
| 100100100 | | " " 6 |
| 011000100 | HOLD 1 | " " 7 |
| 101000100 | " 2 | " " 8 |
| 110000100 | " 3 | " " 9 |
| 000111000 | ASC 1 | " " Ø |
| 001011000 | " 2 | " " ST |
| 010011000 | " 3 | " " KP 1 |
| 100011000 | | " " KP 2 |
| 001101000 | ST. TMG | " " KP 3 |
| 010101000 | CA CALL | |
| 100101000 | REC. MSG | |
| 011001000 | POS. RLS | |
| 101001000 | | |
| 110001000 | DISP. CLG. NO. | |
| 001110000 | " CLD. NO. | |
| 010110000 | " SPL. NO. | |
| 100110000 | | |
| 011010000 | | |
| 101010000 | MONITOR | |
| 110010000 | | |
| 011100000 | | |
| 101100000 | JACK OUT | |
| 110100000 | " IN | |
| 111000000 | IOR PHRASE | |

(IOR PHRASE IS LOADED WHEN IOR IS RELEASED)

Figure 9:
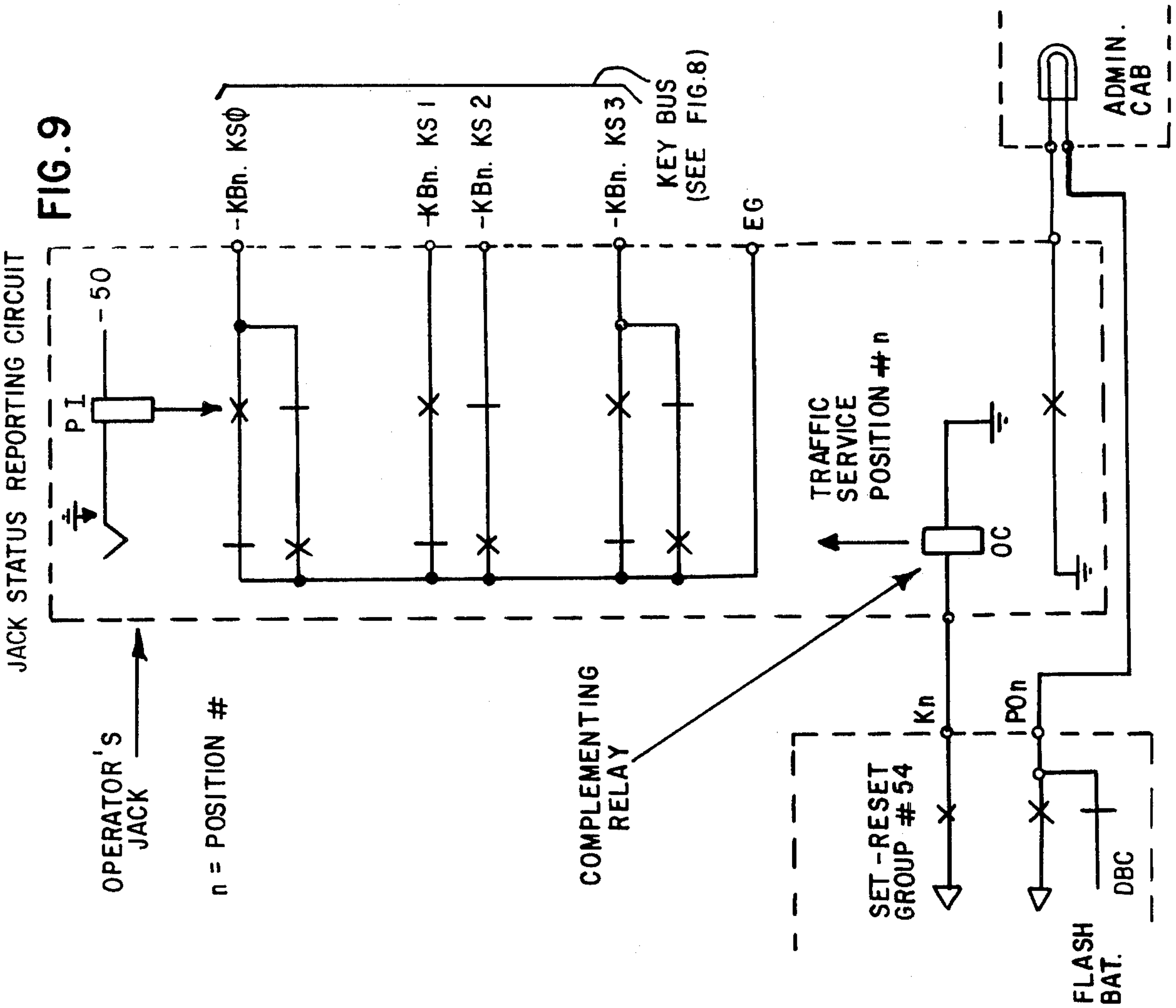
FIG. 9 is a diagram of the circuit for a change of status message (headset plugged or unplugged) of a position.

Relay contacts are also employed for developing change of status messages from the positions (Headset plugged or unplugged) (as shown in FIG. 9). When such a change occurs, the state of relay PI (plug-in) no longer matches that of OC, thus marking three bus wires until a program response changes the state of OC.

Scanner Operation

Associated with each position bus in each copy of KSC is a two bit memory, the reason for which will become apparent in considering the following sequence in the generation of a message:

1. The scanner detects three (or more) marks on a particular bus, and the memory indicates that this condition was not there on the last visit. The memory is updated to indicate "valid indication observed once".

2. On the next visit, assuming there are still three marks at that address, the position identity and key indication are loaded into a message buffer store, for subsequent transmission via the data system. The memory is updated to one of two states, both indicating that a message has been loaded from that position (address). The difference between the two states is described below in (4).

3. As long as the key remains depressed, subsequent visits of the scanner cause no change in the memory; this insures that only one message is generated for each key operation.

4. When the key is released the scanner observes no such as clearing the display when Time (of Day) key is released.

In either case, the position is now initialized and can generate new messages.

The scan rate was chosen using the following criteria:

a. As noted, a key must be "seen" twice before forwarding a report; this is a precaution for minimizing noise problems.

b. A fast keying operator might produce contact closures as short as 30 m.s.

c. The scanner is derived from the clock used by the Data Modem (38.4 KHz), and a sub-multiple of this frequency sets the rate.

A complete scan of the 64 positions requires 13.3 m.s., insuring that a key closure of 26.6 m.s. or more will be detected.

Buffer Store

The message buffer store provides for seven messages. Each transmitted message includes a "sequence number" which is obtained directly from the queue element in which it is stored. Two pointers control loading and unloading of the store, respectively, and jointly control "Buffer full" and "Buffer empty" logic indicators.

When the buffer is full, new key messages are not loaded, and the individual position status memory is not updated. Therefore, if the key remains depressed there is a high probability that a queue location will become vacant and a subsequent scanner visit will cause the message to be loaded. In this sense, additional buffering is implicit, since typical key depressions are of the order of 60 m.s. duration and may be much longer.

The store is unloaded by the data system in response to an incoming message, normally at the rate of one message each 20 m.s. When the buffer is empty a dummy message is sent instead of a message from store.

A special incoming message called the Position Status Request causes the sequential scan to be interrupted and the bus values at the position specified are extended directly to the data system.

Another special incoming message called Retransmission Request causes the out pointer to be set back to an indicated store location, thus repeating messages from that point in the sequence.

The designation of the on-line copy is maintained via a contact in the Switch over System. Normally the inactive copy is inhibited from loading messages in order to prevent the buffer from filling with 7 messages in the absence of any software activity to extract them. Maintenance software can cause the inhibition to be lifted when it is desired to conduct tests of the off-line unit.

Another set of contacts in the TOTF provides a system reset facility for each copy of the TOCF and operates whenever the power is turned on. In the KSC, system reset clears the buffer store, sets the Sequence Number to unity and insures that there are no incorrect records of previous key states.

External Signals and Functions of the KSC a. The Interface with Positions (FIG. 3)

Figure 3:
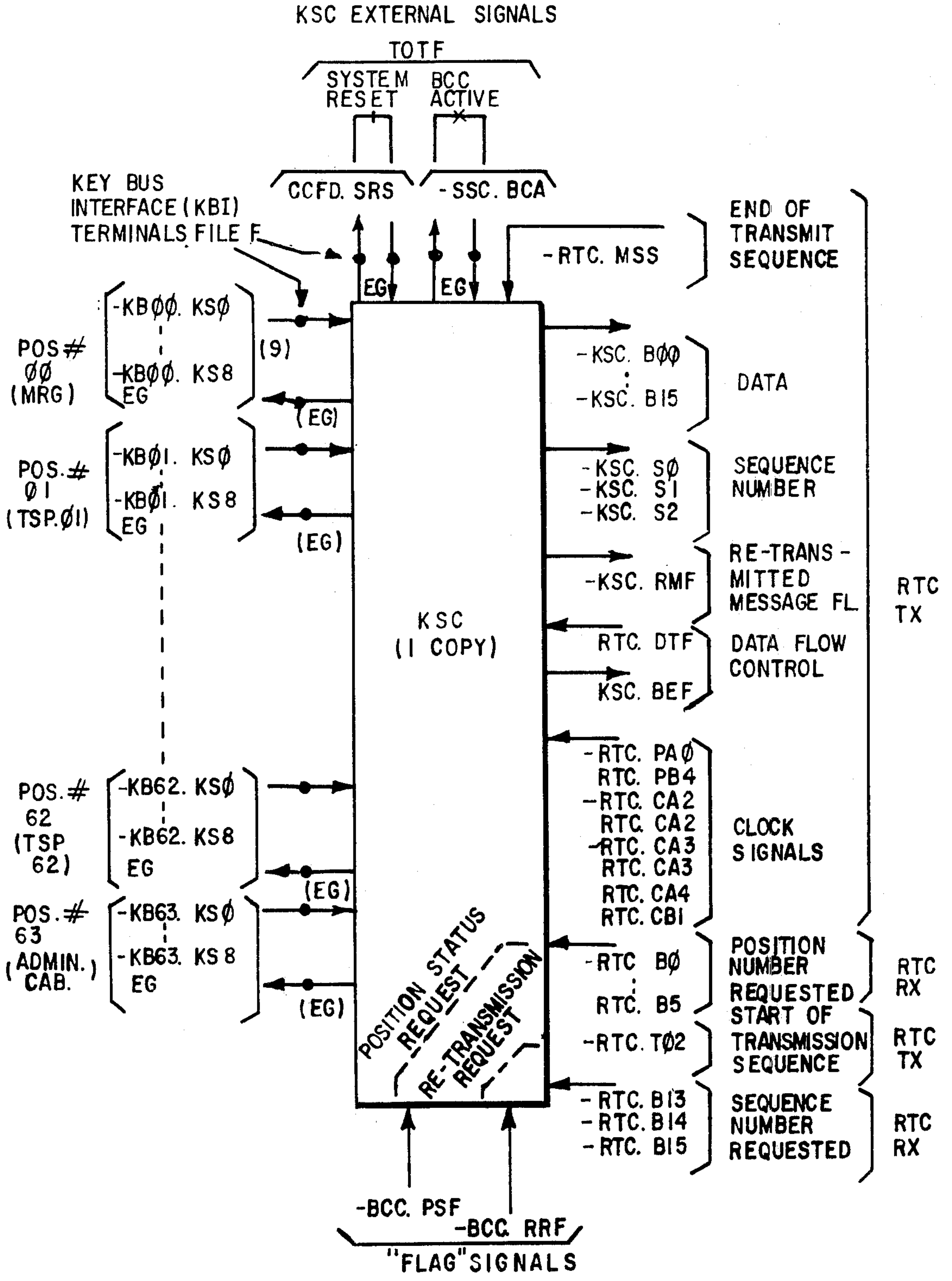
FIG. 3 shows the interface of a key scanner circuit with the remote terminal circuit.

A nine-wire bus from each position conveys the signals −KB*n*.KS0 through −KB*n*.KS8 (where *n* =Positions No.) to the KSC as shown on FIG. 3. When no keys are pressed, the signal on each line is positive corresponding to logic ZERO In the final data as received by the CPU. When a key is pressed, three uniquely assigned lines are grounded in accordance with the 3/9 code assignment. An empirical sketch of the Key-bus wiring in a Position is given on FIG. 8.

b. The Interface with RTC (See FIG. 3)

Messages to be read by the RTC are presented at the interface as shown (DATA on FIG. 3) together with the Sequence Number. Each time a message has been transmitted by the RTC, the Data Taken Flag (RTC. DTF) is made true. This causes the KSC to present the next message and to increase the sequence number by one. The Sequence Number can have any value in the range 1 through 7 only.

When, on receipt of RTC.DTF, there are no more messages in the buffer store, the Buffer Empty Flag (KSC.BEF) is made true and remains so until another message is available. Until the buffer ceases to be empty, the RTC suppresses RTC.DTF.

All timing in the KSC is derived from the clock signals which are generated in the RTC. Therefore, the signals between the KSC and RTC transmit logic are synchronous.

c. Re-Transmission Request (See FIG. 3)

The signal −BCC.RRF (Re-transmission Request Flag) is made false when a request for a re-transmission has been received at the TOC. When −BCC.RRF goes false, the KSC back-steps to the sequence number requested (−RTC.B13, B14 and B15) and changes the data accordingly.

Also, the Re-Transmitted Message Flag (−KSC.RMF) is set until the first repeated message has been transmitted.

Ensuing messages follow as normal, starting from the revised sequence number.

d. Position Status Request (See FIG. 3)

The signal −BCC.PSF (Position Status Request Flag) is made false by the BCC when a Position Status Request is received. The signals −RTC.B0 through B5 convey the number of the Position to be interrogated.

e. Signals From TOTF (See FIG. 3)

The signal −SSC.BCA is derived via relay contacts in the System Switchover Circuit and is true when the copy is active.

The system reset signal, CCFD.SRS is derived via relay contacts in the configuration Control and Flash Distribution Circuit. The contacts are open when resetting is required.

Figure 4:
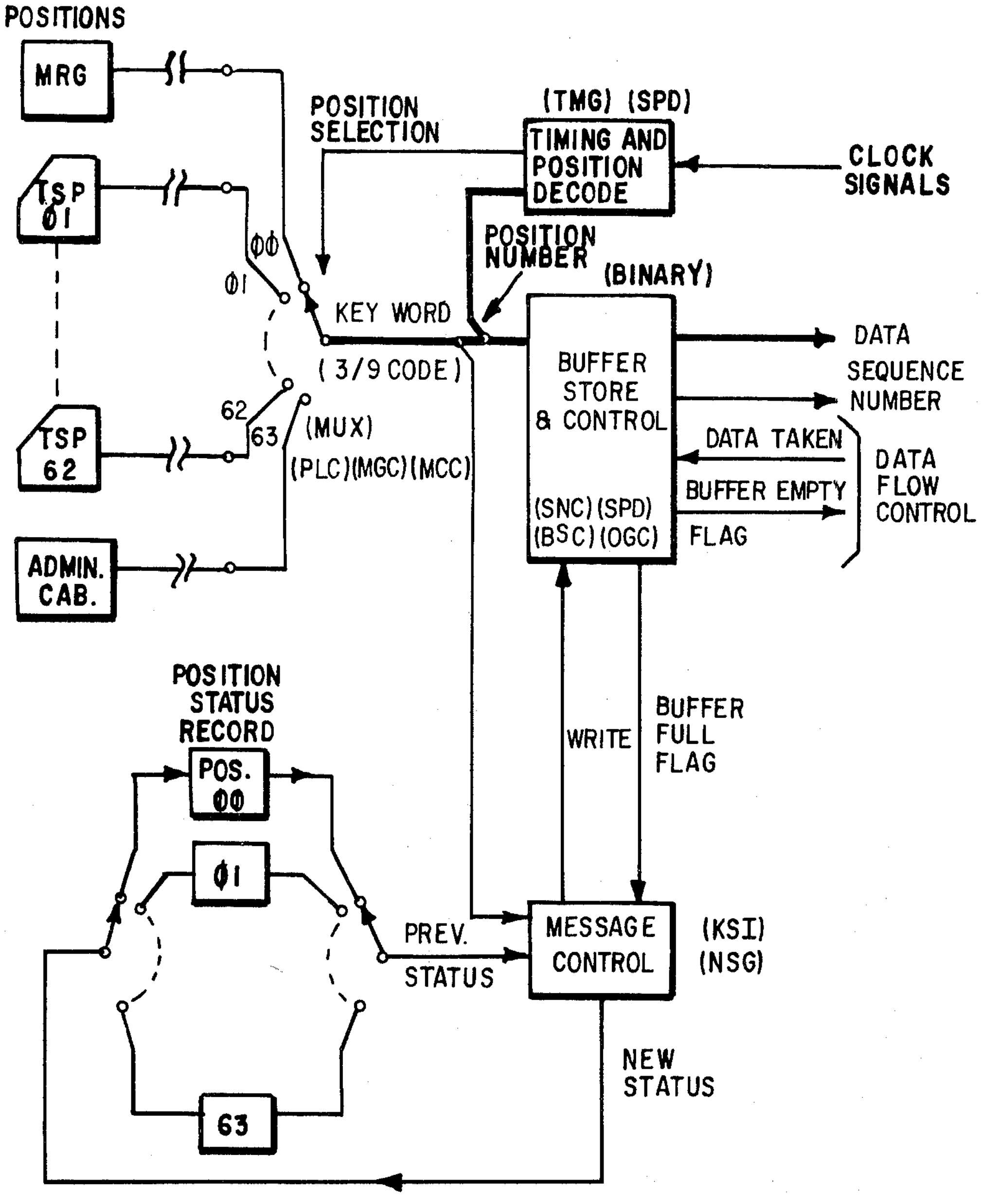
FIG. 4 is an overview diagram of the key scanner.

Internal Functions Of The KSC a. Overview (See FIG. 4)

The Overview Diagram illustrates the principal functions of the KSC. The Positions are scanned in numerical sequence continuously, each scan consisting of 64 frames of 208.3 $\mu$s duration each. During each frame period, the key-bus signals from the currently selected position are examined together with a status record (Position Status Record) for that Position. The Message Control hardware then determines whether or not a message is to be written in the buffer and up-dates the status record accordingly. If a message is required and the buffer is not full (i.e., Buffer-Full Flag is false) the Key Word and Current Position number (in binary) are gated in to the next available buffer register.

Figure 5:
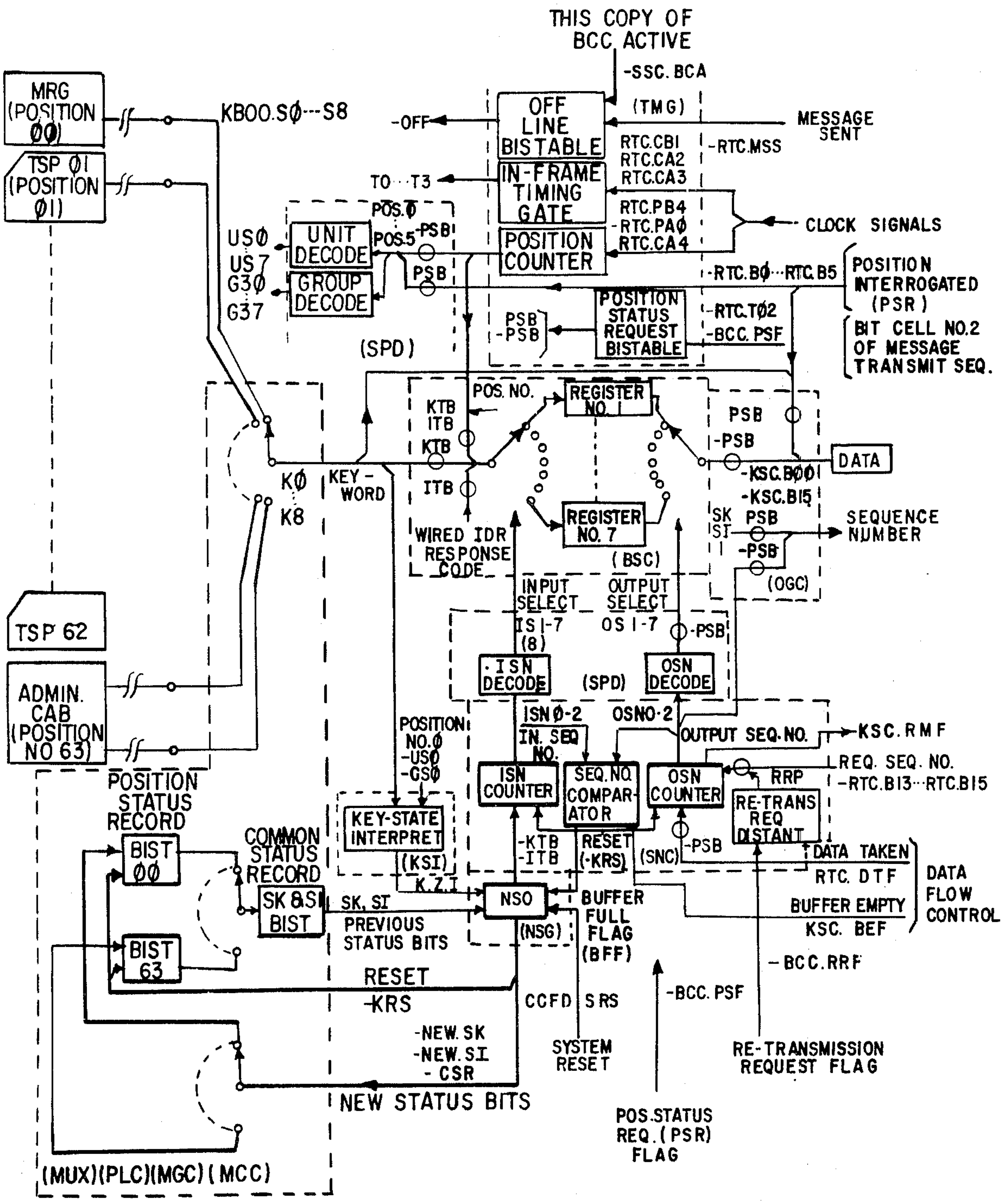
FIG. 5 is an overall block diagram of the key scanner.

Messages are read by the RTC from the buffer synchronously but independently of the rate at which they are written, the function of the buffer being to accommodate the varying rate of operation of keys.

b. Block Diagram (See FIG. 5)

The Overall Block Diagram shows the functions of the KSC in detail including maintenance functions.

1. Timing and Position Decode ([TMG] and [SPD]):

The Position Counter is a six stage binary counter and counts continuously upward (00 to 63) in steps of 208.3 $\mu$s (ie 1 frame interval). The outputs are decoded by the Position Decode logic into Position Group and Unit Select signals (GS$p$ and US$q$ where Position Group and Unit Select signals (GS$p$ and US$q$ where Position Number = $8p+q$). Pair combinations of group and unit determine which Position is currently being examined.

The four outputs of the in-frame timing gates are repeated during each frame and provide the four discrete intervals which time all events in the KSC.

2. Status Record and Message Control Hardware (MUX, KSI and NSG):

The Position Status Record consists of 2 bistables SK and SI per position. The combined values of SK and SI serve as a record primarity to insure that a particular operation is reported only once. When a given position is accessed, the associated Position Status Record is transferred to the Common Status Record bistables. Simultaneously, the KSI examines the nine-bit Key Word to ascertain the current state as follows:

When three or more of the nine bits are true (i.e. a key is depressed) the signal K (key) is made true.

When all bits are false, Z (zero) is made true.

When one of the IOR codes (see table 3/9 code assignments) is detected, I is made true.

It should be noted that this applies whether the IOR code is due to a single IOR key or a combination of keys.

The status bits and Z, K and I are compared by the NSG which determines whether or not a message is to be written in the buffer and determines the new values of the status bits. The flow chart of FIG. 6 describes the effects of all combinations. The effects of signals –KTB and –ITB (Key Word to Buffer and IOR pattern to Buffer) are also implied on the flow chart. However, if the buffer store is full (i.e. BFF is true), –ITB and –KTB are inhibited and the status bits are written back unchanged in the Position Status Record bistables. The Reset signal (–KRS) is distributed to all Position Status Record bistables, by-passing the selection signals. When –KRS goes false, all SK and SI bits are set to zero.

3. Buffer Store (BSC):

The buffer store consists of seven 15-bit registers with independent output and input selection.

The input selector is stepped on immediately after data have been written in the store. I.e. in the interval between messages, the selected register is the next register to be written in. Similarly, the output selector accesses the next register to be read from and is stepped on immediately after each word has been read.

For normal messages, RTB gates data from the Key and Position buses to the currently selected register. In the case of IOR messages, the internally wired IOR code is admitted instead of the Key Word.

4. Sequence Numbers Counters, Decoders and Comparator (SNC SPD):

The Input Sequence Number (ISN) counter is a three stage binary counter which counts upwards from 1 through 7. When the count reaches 7 the next step returns the count to 1, by-passing zero which is not used. The count is stepped on (after each –ITB or –KTB pulse) each time a message has been written in the buffer.

The Output Sequence Number (OSN) counter is identical with the ISN counter except for the addition of the Re-Transmission Request facility. The count is increased (after RTC.DTF goes true) every time a message has been read from the buffer.

When the Re-Transmission Request signal is active, the Requested Sequence Number is gated to the OSN counter, thereby overwriting the current value. As RRF commences at the end of a receive sequence in the RTC, the next message transmitted will be that having the Sequence Number just requested. The Re-Transmitted Message Flag (–RSC.RMF) is made false when RRF commences and goes true (on receipt of RTC.DTF) after the RTC has transmitted the first repeated message.

ISN and OSN are decoded by separate three-bit binary decoders to give the seven input and the seven output select signals Is1–7 and OS1–7 respectively. These signals open the gates of the correspondingly selected registers.

ISN and OSN are compared by the comparator and if found to be equal following a "write" instruction, the buffer is declared to be full and BFF is set. Similarly if ISN equals OSN following a "read" sequence, the buffer is declared empty and KSC.BEF is set.

The reset signal, when activated, sets the sequence numbers to unity and sets the Buffer Empty bistable.

5. Off-Line Bistable ([TMG]):

Each copy of the KSC has two modes of operation, namely active and inactive (off-line), depending on which copy of the TOCF and data link is handling normal data. The inactive copy of KSC inhibits the writing of messages in the buffer. Otherwise both copies function normally, including the normal updating of the status record.

When the signal –SSC.BCA goes false, the KSC goes active at the start of the next complete frame and writing is again permitted. When the signal goes true, the KSC delays until the end of the next RTC transmit sequence (ie about 13 ms later) and then goes off-line. This results in an overlap period of approximately 1 full Position scan during which both copies of KSC are active. The overlap is provided to allow for maximum stagger between the Position scanners in the two copies of KSC.

6. Position Status Request Bistable ([TMG]):

The Position Status Request permits the maintenance software to examine the 9-wire bus from any requested Position together with the associated status bits (SK and SI).

When –BCC.PSF has gone false, the Position Status Request bistable is set at the start of bit cell T02 early during the RTC transmit sequence (ie before the RTC has started to read data). The bistable is reset in the same way during the next RTC transmit sequence. The signals from the bistable are PSB and –PSB and they produce several effects.

In the [SPD], PSB (and –PSB) substitutes the Position number of the Position to be interrogated in place of the normal Position number. This forces the Position scanner to the required Position, admitting the Key-Word to main data highway and to the secondary highway which by-passes the buffer. In the [OGC], the Key-Word and the requested Position number are then allowed (via the PSB gate) on the main data lines to the RTC. These lines now remain steady for the duration of the PSR.

In a similar fashion, SK and SI are admitted (via the [OGC]) to the Sequence Number lines in place of the normal sequence number.

As the RTC does not distinguish between the PSR and other data messages, RTC.DTF will occur as normal at the end of the transmit sequence. Therefore in the [SNC]–PSB prevents DTF from stepping the OSN counter.

PSB also inhibits up-dating of the status word and writing of messages in the buffer.

Detailed Logic Description a. Multiplexer (MUX)

Figure 10:
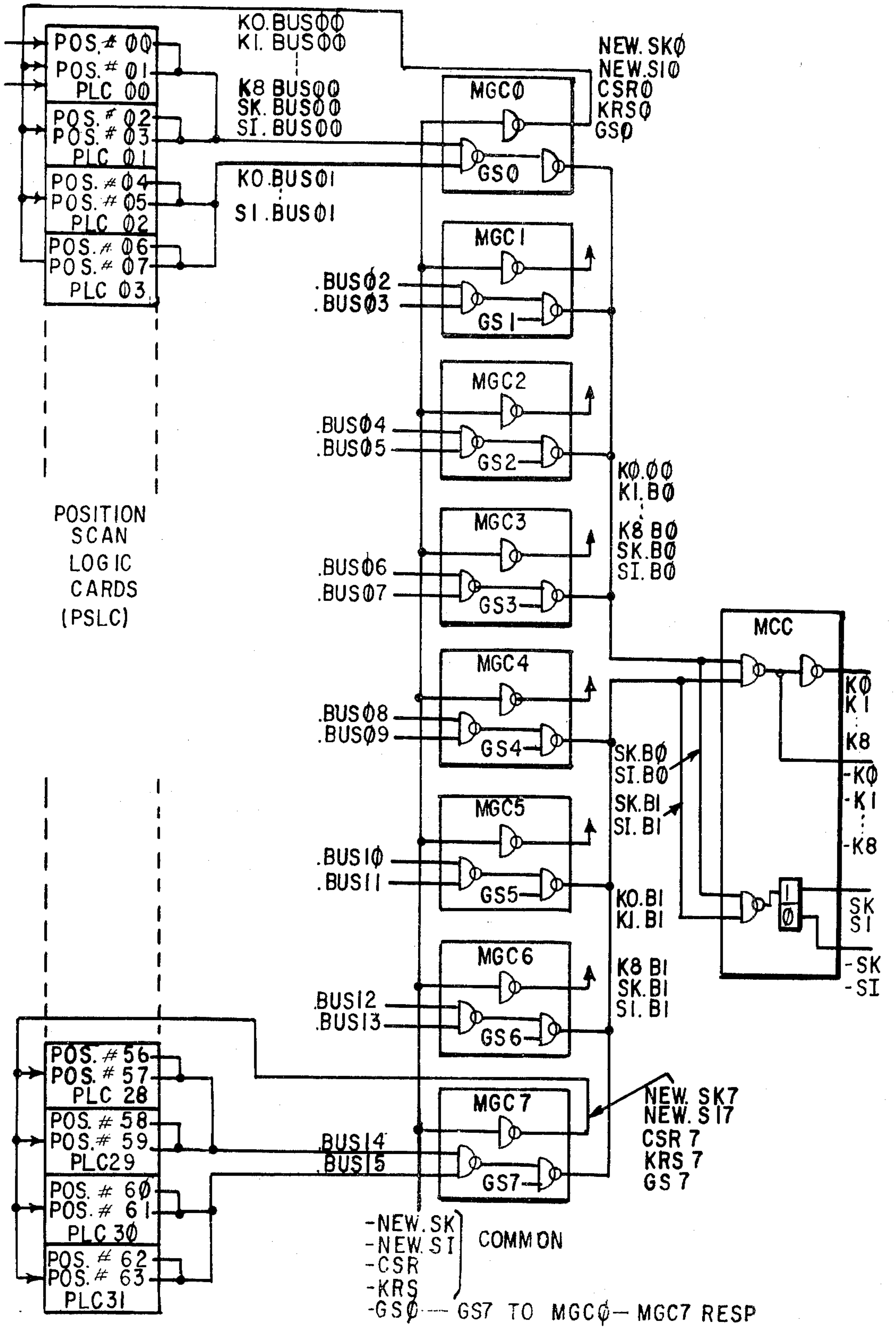
FIG. 10 is a block diagram of a position multiplexer.

The block diagram of FIG. 10 (MUX) shows the arrangement of the Position multiplexer. The bracketed mnemonics refer to the circuits on FIG. 11. As can be seen the Positions are multiplexed in groups of eight, each group being accommodated by four Position Logic Cards, (PLC) each having circuits for two positions and one Multiplexer Group Circuit (MGC). The associated Group Select signals, GS0–7, are each fed to a group of PLC and again to the associated MGC, thereby providing isolation under certain fault conditions. Signals from the MGC to the PLC are, likewise, distributed in groups of eight, thus providing further isolation between groups.

The eight sets of outputs from the MGC are combined in logic OR gates feeding the main data highway to the common logic.

Figure 11:
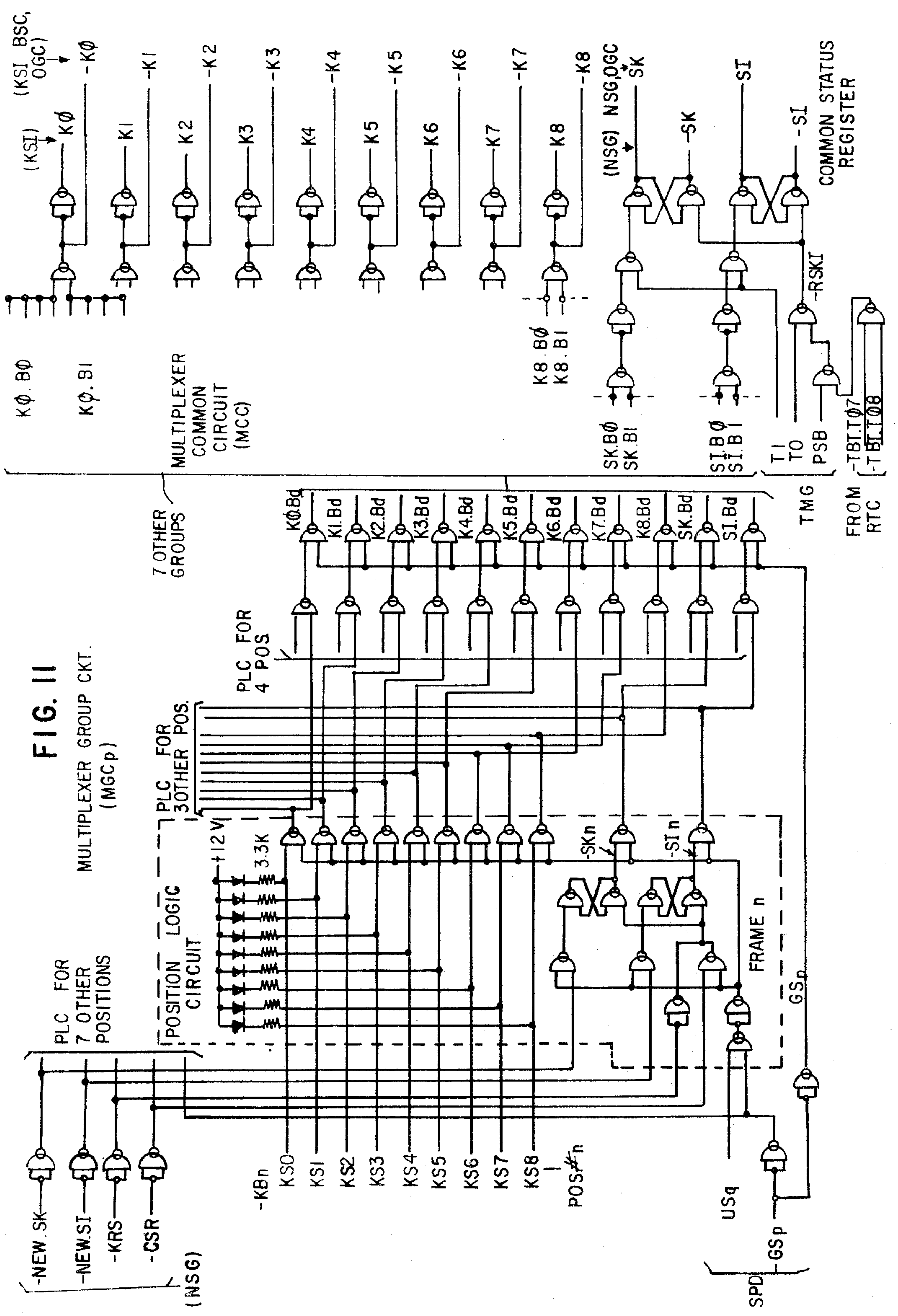
FIG. 11 is a more detailed functional block diagram of a position multiplexer.
Figure 19:
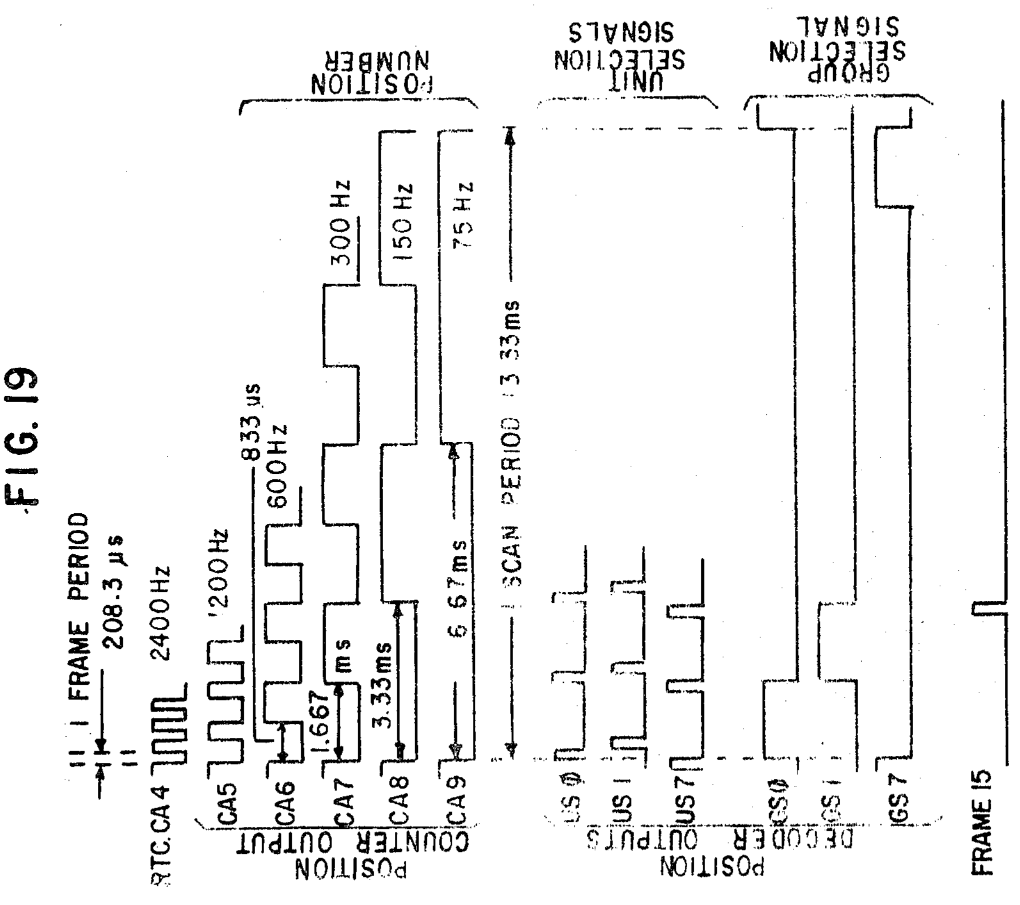

1. Position Logic Circuit (PLC 00 –31):

One of the two circuits of a Positions Logic Card PLC is shown on FIG. 11, left. Each card accomodates two Positions, the signals from which are prefixed. –KB*n* and —KB*n*+1. All other signals are internal to the KSC. Each Key-Bus lead is referenced to the +12 -V supply via a resistor and diode. The diodes are provided to prevent interaction between the two copies when power to one copy is off. The signals (NEW.SK*p*, NEW.SI*p*, KRS*p*, CSR*p* and GS*p*) bearing the suffix *p*, are group signals distributed by the group circuits (MGC*p*) and are common to each group of four PLC. (8 positions) Signals (US*q* and US*q*+1) bearing the suffix *q* are Unit Select signals. The signal Frame *n* is true when the group and unit select signals GS*p* and US*q* are true. The timing diagram of FIG. 19 illustrates the case where GS1 and US7 are gated together to give the signal Frame 15 which occurs once during each complete scan as do all 64 frame signals. In general, *n*=8*p*+*q* and all permutations of *p* and *q* are used to uniquely select all Positions sequentially during each scan. The signal FRAME *n* gates the Key-bus signals from Position *n* and the signals from Position Status bistables to the output bus lines. FRAME *n* also opens the input gates to the Position Status bistables. Thus, the gates are open for one frame period. The signals CSR, NEW.SK and NEW.SI to the input gate of the bistables remain false until the In-frame Time interval T2 thus leaving the bistable contents unchanged. Meanwhile, the contents are copied in the Common Status bistables in the MCC. In time T2, CSR (Clear Status Register) goes true and resets the bistables (SK=SI=0). Then in time T3, the signals NEW.SK and NEW.SI are allowed to assume their respective states which are then copied in the bistables and stored until time T2 of frame *n*, one scan period later. The reset signal KRS*p*, although distributed on a group basis by the MGC is independent of the frame signals and reset all Position Status bistables unconditionally in time T0 when the System Reset contacts are open.

2. Multiplexer Group Circuit (MGC0–7):

The multiplexer group circuit is shown on FIG. 11, center.

Each of the input gates provides busing for the respective group of four PLC (8 Positions). The group Select signal to the second rank of gates is repeated here to provide some isolation under fault conditions, i.e., to give better resolution of faults affecting particular busing levels.

The signals –NEW.SK, –NEW.SI, –CSR and –KRS are common to all eight MGC and the gates fed from these signals provide the group distribution.

3. Multiplexer Common Circuit (MCC):

The MCC is shown on FIG. 11, right. The nine identical pairs of gates provide the final stage of multiplexing and the outputs are Key Word lines to the Report field inputs of the buffer.

The Common Status bistables are reset in time T0 and loaded in time T1 with the status bits from the currently selected Position.

Figure 22:
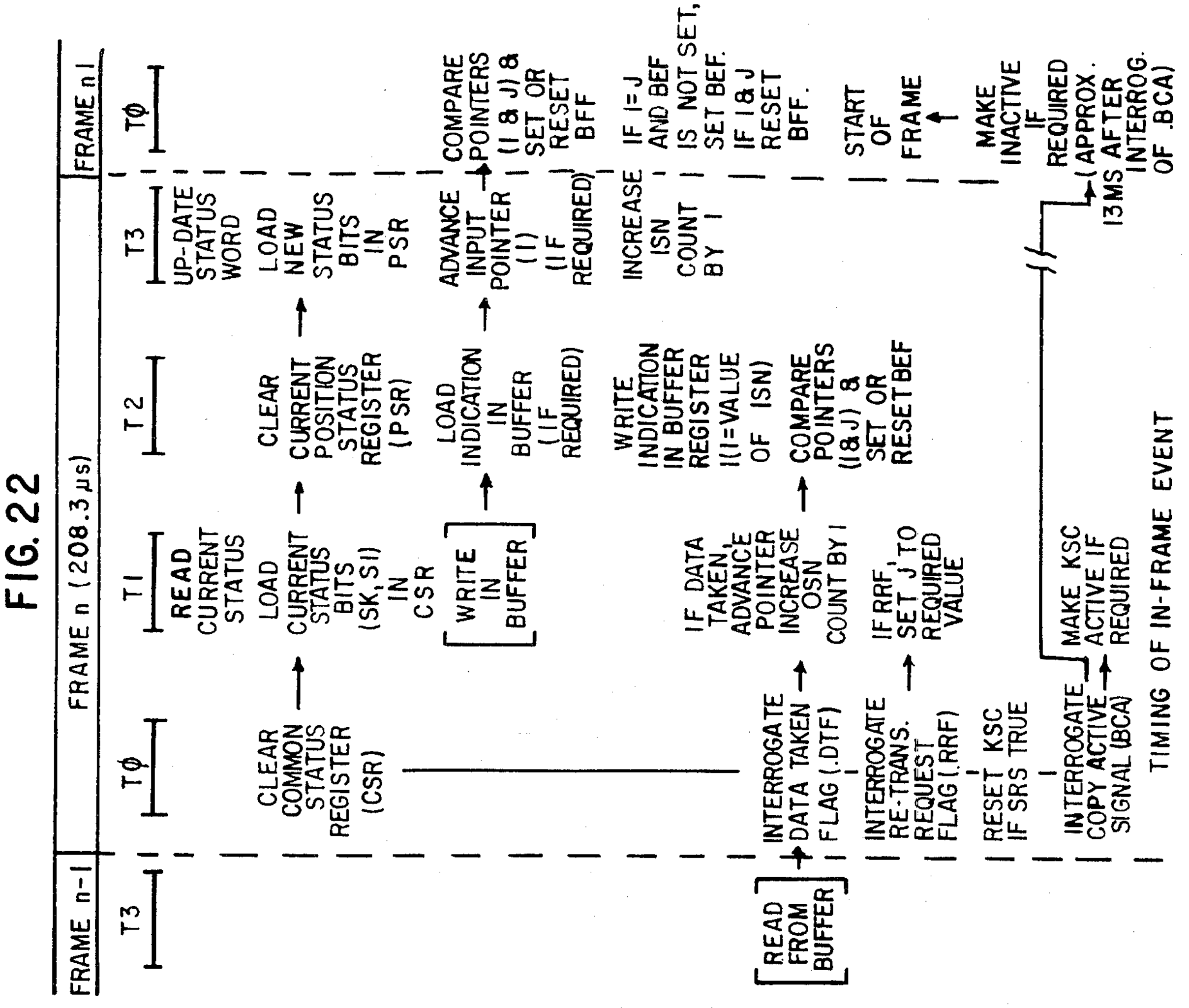

The four-beat transfer of data from the Position Status bistables to the Current Status bistables and from the NSG back to the Position Status bistables is described pictorially on FIG. 22.

b. Key State Interpreter (KSI)

Figure 12:
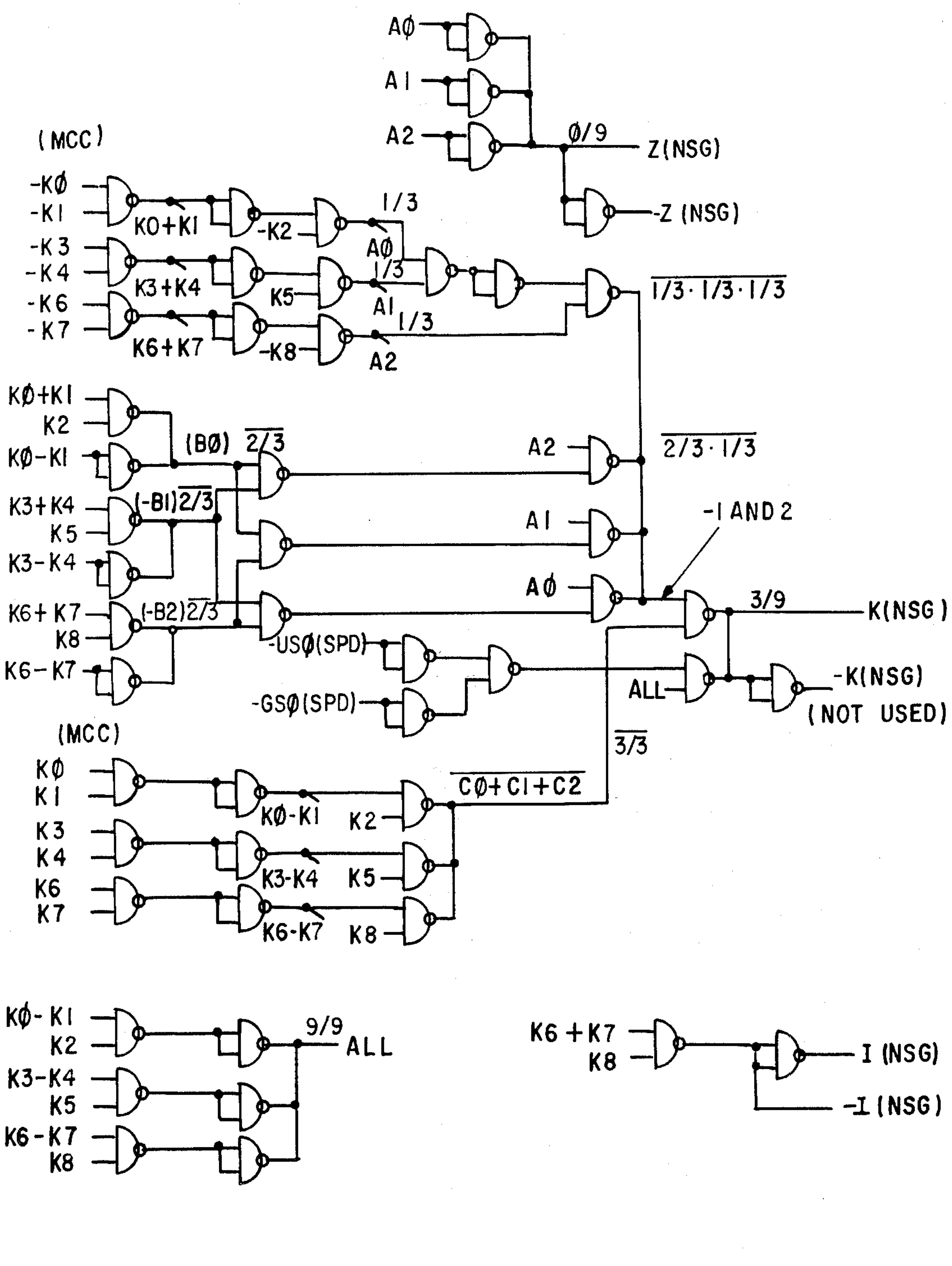

The KSI is shown on FIG. 12.

The KSI examines the 9-bit Key-word and determines one or more of three categories for the states of the bits. These categories are as follows:

1. all bits are zeros.
2. three or more bits are ones.
3. The bits from an IOR code (see table 3/9 code assignments).

The states of the output signals Z, K and I (zero key and IOR key) correspond to the truth or falsity of categories (1), (2) and (3) respectively.

The logic for determining the signal K is based on the following method.

If the Key Word signals (K0–K8) are considered in three groups of three bits, then K is true when:

1. One bit is true in each of the three groups.

or

2. One bit is true in one group and two bits are true in one of the other groups.

or

3. All three bits are true in one group.

Thus, putting:

A0=K0+K1+K2,A1=K3+K4+K5,A2=K6+K7+K8
B0=K0.K1+K0.K2+K1.K2
B1=K3.K4+K3.K5+K4.K5
B2=K6.K7+K6.K8+K7.K8
C0=K0,K1.K2,C1=K3.K4.K5,C2=K6.K7.K8
K0.K1.K2,C1= and putting

P=A0.Al.A2—(i.e. case (1) above)
Q=A0(B1+B2)+A1(B0+B3)+A2(B2+B3)—(-case(2))

and

R=C0+Cl+C2—(case (3))

Then K=P+Q+R

The signals A0, B0, etc. are indicated on the diagram. The signal Z is true when A0, A1 and A2 are false, i.e. when all Key-bus bits are zero.

By referring to the 3/9 code assignments table it can be seen that all the codes in which bits K8 and K6 are true or bits K8 and K7 are true are IOR codes. Thus, I=K8(K6+K7).

In a given Traffic Office there may be fewer than 62 TSP's. Therefore, provision is made so that only the requisite number of PLC and MGC cards need be supplied. When the scanner selects a Position number for which there are no cards, all the Key-Word bits are unity. The signal ALL is true only when all nine bits are true. All is used to inhibit K, thereby preventing messages from non-existent Positions. However, in the case of Position 00 (the MRG), indications are permitted even when all nine bits are true. This is achieved by the gating of –US0 and –GS0.

The need for distinguishing between the case when three or more Key-bus bits are true and the case when fewer than three bits are ture arises from the stagger between successive contact closures when a key is being depressed. This stagger could otherwise result in reports containing only one or two ONES instead of the requisite three.

c. New Status Word and Message Gating (NSG)

Figure 6:
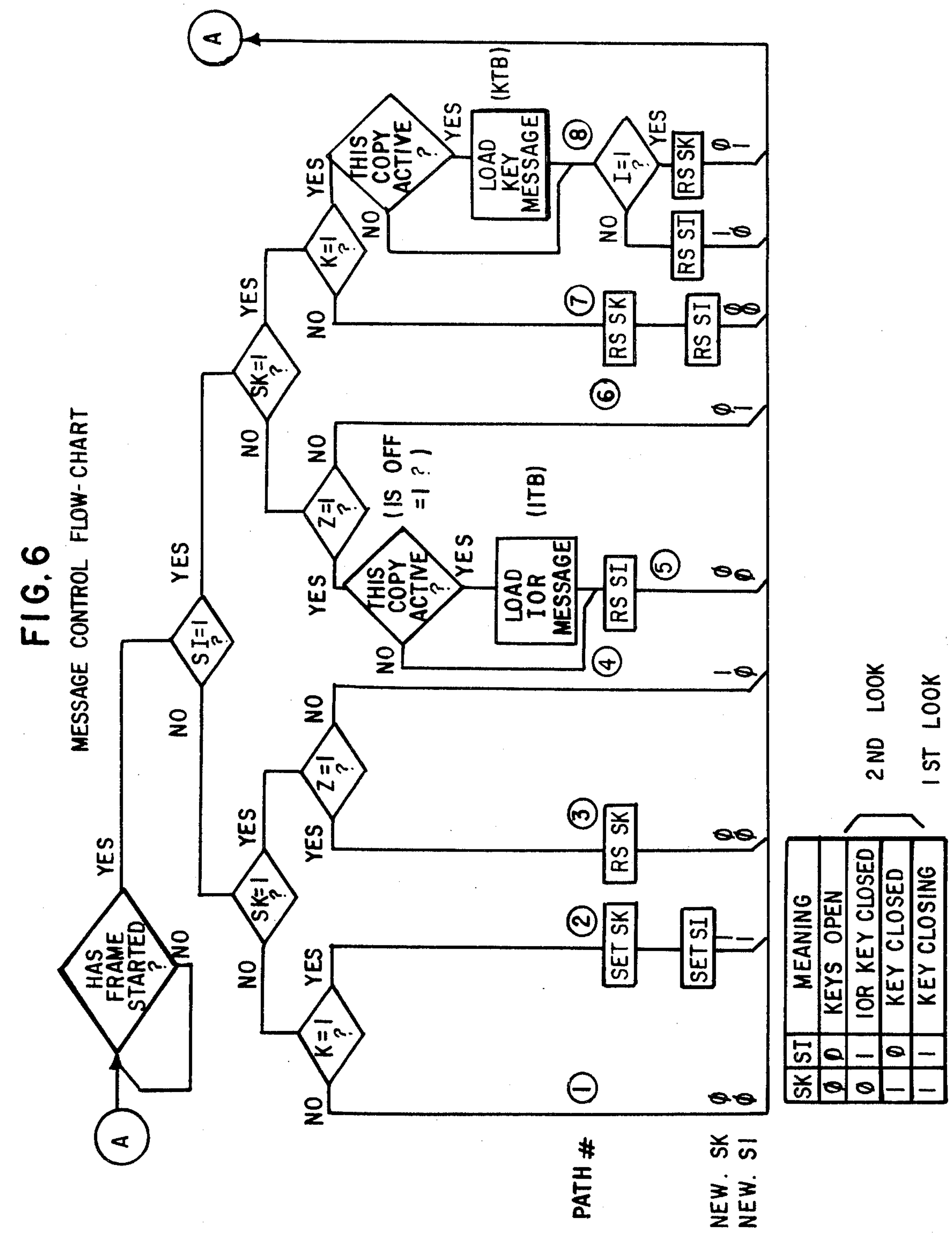
FIGS. 6 and 7 are flowcharts of hardware logic in the key scanner.

The NSG is shown on FIG. 13 and the associated Message Control Flow-chart is shown on FIG. 6. The Flow-chart defines the meanings of the Status bits and the conditions for loading messages in the buffer store. For convenience, eight principal paths in the flow chart have been numbered. The Position Status Record (bits SK and SI) is provided for the following three purposes:

1. To insure only one message per key depression
2. To permit a key action to be seen twice before it is reported (thus giving some noise immunity).
3. To permit IOR keys to be reported when they cease to be depressed.

The letters K and I of the status bits (SK and SI) loosely correspond to "Key" and "IOR Key" respectively. Beneath the flow-chart is a table which gives simplified meanings of the four permutations mutations of SK and SI. In the table, the term KEY CLOSING means that the key depression has been seen once and has not yet been reported. KEY CLOSED means that the key has been seen two or more times and has been reported.

In the flow-chart, path No. 1 applies to the case when SK, SI and K are zero, i.e., the case when no keys were depressed during the preceding scan and no keys are depressed during the current scan. When, during a subsequent scan, a key depression is detected (i.e. path No. 2 on the flow-chart) then SK and SI are set. Therefore, during the next scan either path No. 7 or path No. 8 is applicable depending on whether or not K is still true. If K is true, then the message is loaded in the buffer and the status record is modified accordingly depending on whether or not the key was an IOR key (i.e., depending on the value of I).

While the key remains depressed, the path followed is either No. 4 or No. 6. When the key is released and all contacts have opened either path No. 3 or path No. 5 is applicable and followed during the next scan by path No. 1.

On the Flow-chart, the values of the new status bits at the end of a frame are shown at the lower end of each branch. The logic equations for the new status bits and the message gating signals (KTB and ITB) are shown on FIG. 13.

In time T2, the signal −CSR (Clear Status Register) goes false (and clears the currently selected Position Status Register). In time T3 the new status bits are gated out (to the PS Register). However, both −CSR and the new status bits are inhibited if the buffer is full (i.e. −BFF is false) or if a Position Status Request is being serviced (i.e. −PSB is false). The Message gating signals (−KTB and −ITB) occur in time T2 and are similarly inhibited by −PSB and −BFF. Also, −KTB and −ITB are inhibited in the inactive copy of KSC by the signal −OFF. Thus, in the inactive copy of KSC the updating of the status word continues as normal while no messages are written in the buffer.

The KSC reset signal −KRS goes false only during time T0 SRS is referenced to logic ONE via the collector resistor of gate R when the relay contacts are open and is connected to ground when the contacts are closed.

d. Timing and Control Circuits (TMG)

The Position Counter (see FIG. 14) is a five-stage free-running binary counter. The L.S. bit of the Position number is derived directly from the signal RTC.CA4. The phase A bistables (outputs −CA4 through −CA9) are clocked by −PRT.PA0 (clock Phase A counter stage 0) while the phase B clock signals are derived from RTC.PB4. The principal waveforms are shown on FIG. 19.

Figure 20:
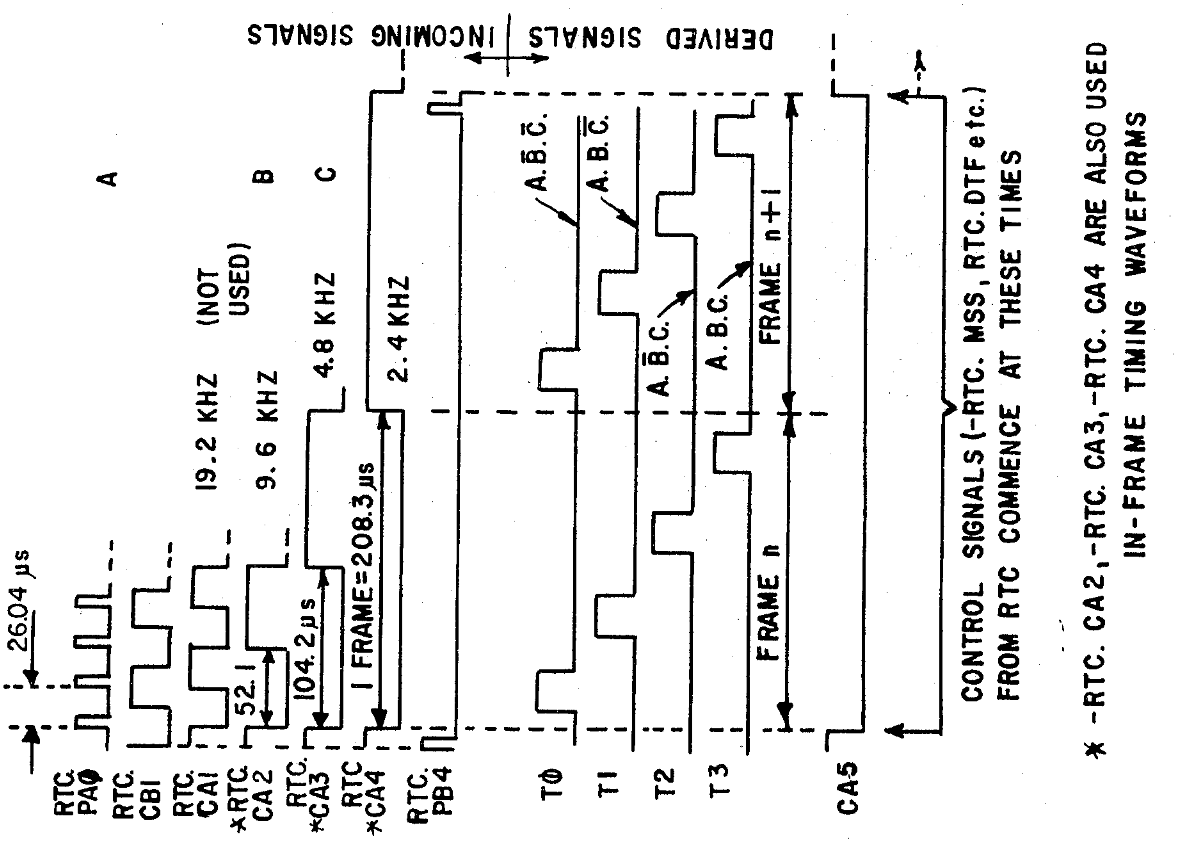

The In-frame timing logic comprises four AND gates which provide the four combinations of RTC.CA2 and RTC.CA3 and which are strobed by RTC.CB1. The waveforms are shown on FIG. 20.

The off-line detection responds to changes in the state of the signal −SSC.BCA. The relay contacts from which −SSC.BCA originates are closed, grounding the signal, in the active copy of the TOC and are open in the off-line copy. When the contacts are open, the signal is referenced to +12V via the load resistor of gate Y.

Figure 21:
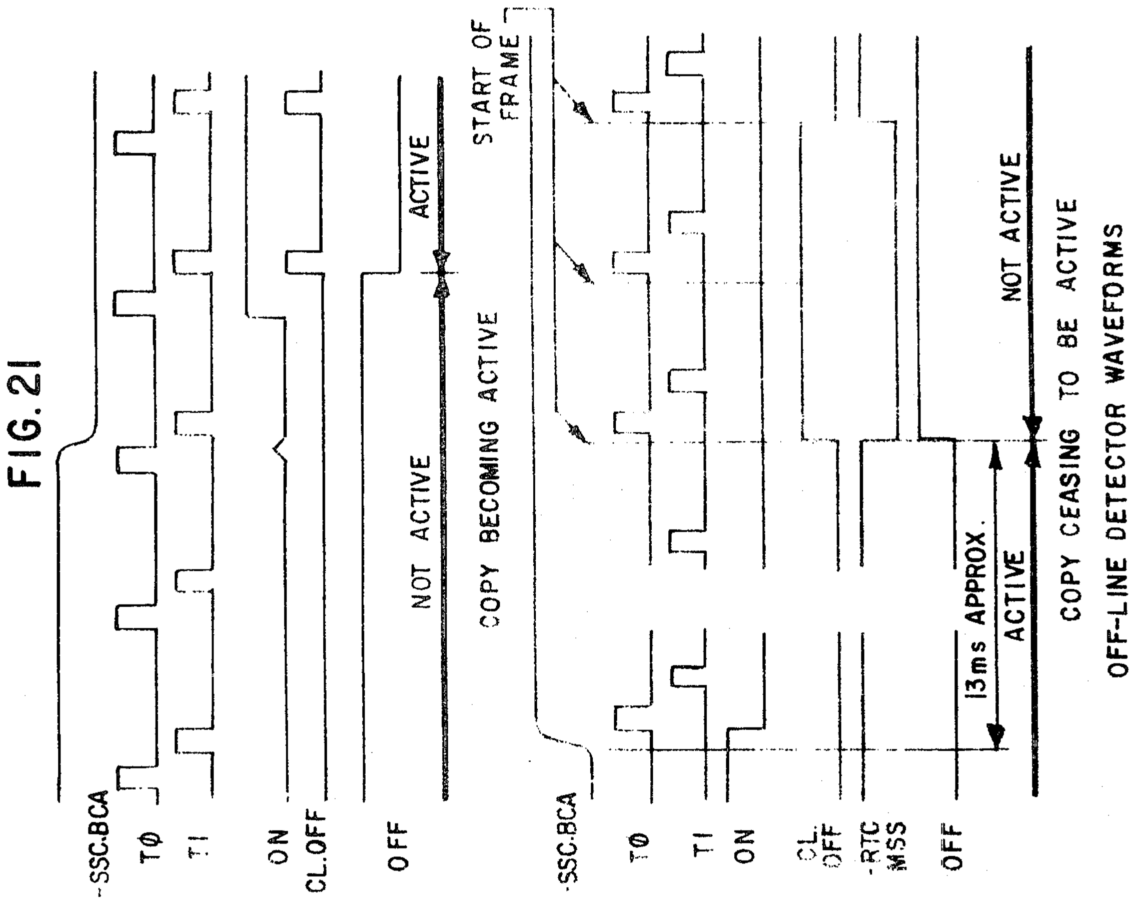
FIGS. 19–22 are timing diagrams of the operation of the key scanner.

The waveforms for the Off-line Detection are shown on FIG. 21. As can be seen, in a copy of the KSC which is becoming active, the signal OFF goes false within one frame interval after −SSC.BCA goes false. Meanwhile, in a copy which is ceasing to be active, OFF goes true approximately 13 ms after −SSC.BCA goes true. As a result, there is an overlap of up to 13 ms during which, both copies of KSC allow messages to be written in the buffer. This is to allow for the stagger that may exist between the two copies of the Position scanner.

The Position Status Request bistable is clocked at the start of the second bit-cell (−RTC.T02) or the RTC transmission sequence. When −RTC.T02 goes false, the bistable is set or reset depending on the sate of the Position Status Flag (−BCC.PSF). The flag signal can change stage only at the end of a receive sequence which is over 400μs before the start of bit-cell T02. Thus, when a Position Status Request message is received by the BCC, PSB goes true early during the next transmit sequence and is reset early during the following sequence.

e. Sequence Number Counters (SNC)

Figure 15:
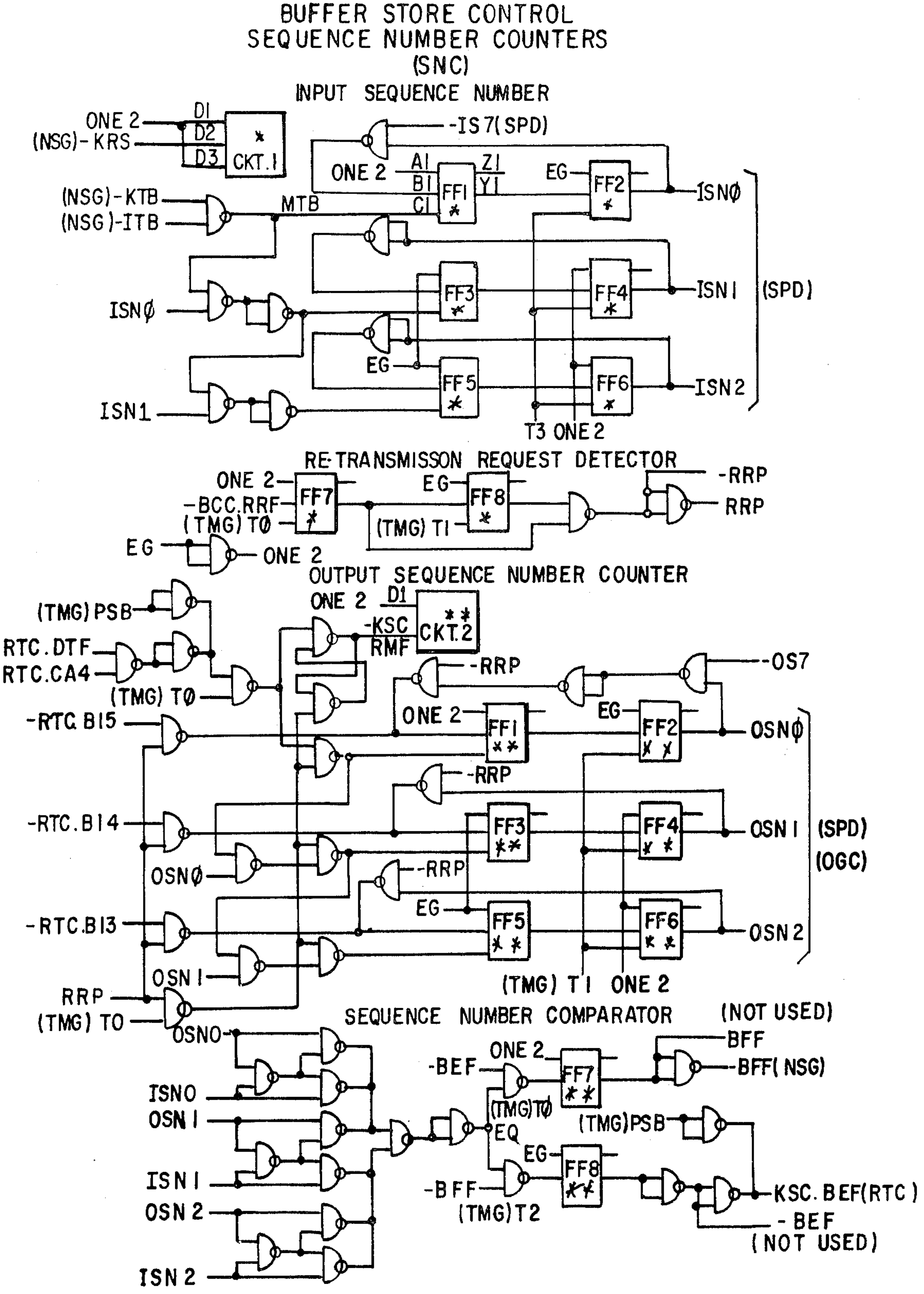

The Sequence Number counters, comparator and Retransmission Request detector are shown on FIG. 15. The Input Sequence Number counter is similar to the Position counter with the exception that the count skips throug zero. The A phase (bistables FF 2, 4 and 6) of the counter is clocked in time T3 while the B phase is clocked by −KTB or −ITB whenever a message is written in the buffer. When the count reaches the binary value of seven (i.e. ISN0, 1 and 2 all true), −IS7 (Input Select line 7) goes false thereby preventing FF1 from changing state when the next message is written in the buffer. This in turn causes ISN0 to remain true when next T3 resets ISN1 and ISN2.

The Output Sequence Number counter is identical with the ISN counter except for the additional Re-Transmission Request facility.

The phase of the OSN counter is clocked in time T1. The B phase is clocked at the end of a RTC transmit sequence by the Data Taken Flag, RTC.DTF which is strobed by T0. However, as RTC.DTF persists for two frame periods, it is gated with RTC.CA4 which is true for only one frame period. Otherwise, the count would be increased by two every time RTC.DTF went true. It should be noted that during a Position Status Request, PSB prevents RTC.DTF from increasing the count. This is necessary since the RTC does not distinguish between a Position Status Request and a normal data transfer. In the Re- Transmission Request Detector, FF7 is set in time T0 at the start of a Re-Transmission Request, causing RRP (RR Pulse) to go true. The in time T1, FF8 is reset, terminating RRP. When −BCC.RRF again goes true FF7 is reset in time T0 and FF8 is set in time T1. Thus, RRP is true from the start of T0 until the start of T1 at the beginning of the Re- Transmission Request and is not repeated until –BCC.RRF has gone true and then false again. While RRP is true, the Sequence number (signals –RTC.B15 through B13) of the message to be repeated, is gated to the B phase inputs (to FF1, 3 and 5), while the recirculated A phase signals OSN0 through 2 are blocked by –RRP. The Sequence number is gated to the bistables in time T0 and, at the same time, the Re- Transmitted Message Flag bistable is set, i.e. –KSC.RMF goes false. At the end of the next RTC transmit sequence, RTC.DTF resets the bistable, Thus, the RMF bit is set during only the first message transfer following a Re-Transmission Request.

The Sequence Number Comparator comprises the Comparator itself and the Buffer Empty and Buffer Full bistables. If the Sequence Numbers do not match, then neither bistable is set. If, now, a message is written in the last available register of the buffer, ISN will be increased in time T3 to the same value as OSN. Therefore, in time T0, FF7 will be set making the Buffer Full Flag true.

In the same way, when the Sequence Numbers become equal following a transfer of data to the RTC, and since OSN changes in time T1, then FF8 will be set in time T2. I.e. the Buffer Empty Flag (KSC.BEF) will go true.

Figure 7:
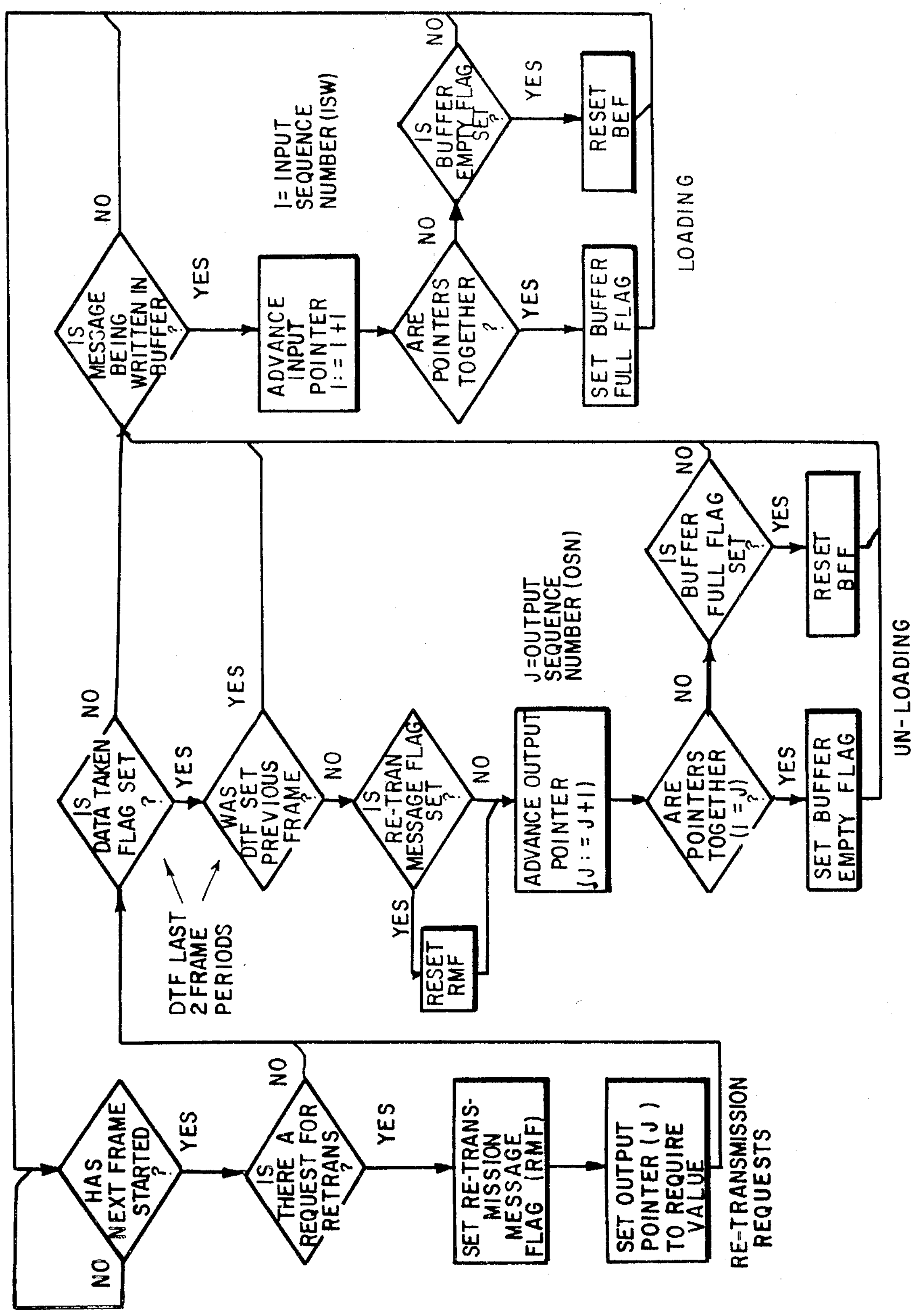

If a Position Status Request is received when the Buffer is empty, PSB inhibits KSC.BEF, thereby insuring that the RTC will read from the KSC. The sequence and timing of buffer store control events are shown (WRITE and READ) on FIG. 22, while the Flow Chart of FIG. 7 defines the automous functions of the buffer.

f. The Sequence and Position Number Decoder (SPD)

Figure 16:
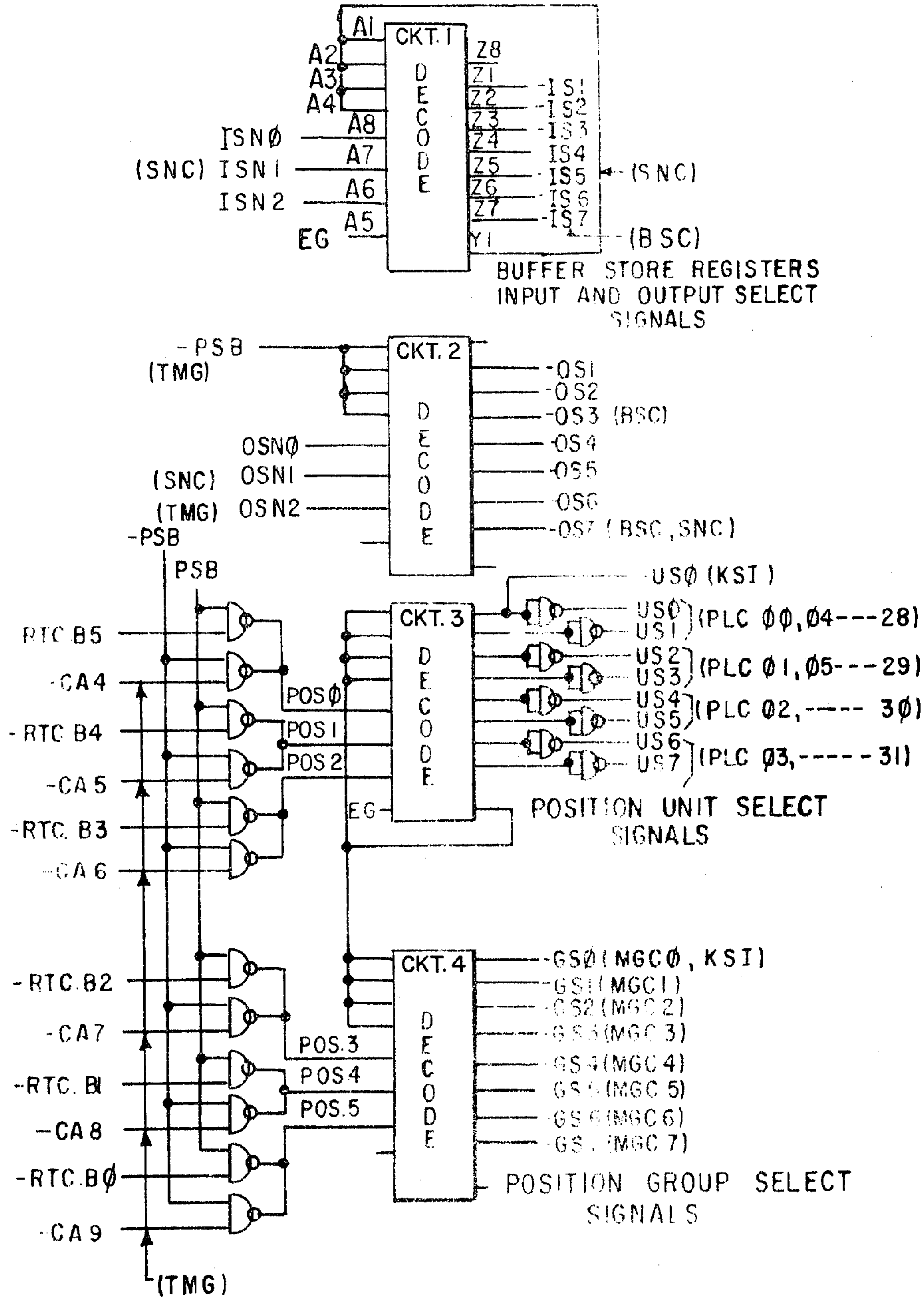

The SPD is shown on FIG. 16. CKT1 through 4 are three-bit binary decoders.

The ISN (Bits ISN0 through 2) is decoded by CKT1. ISN (buffer Input Selection signal No. *n*) is false when the binary value is ISN=*n*.

OSN is decoded in exactly the same way by CKT2 with the exception that the output signals are inhibited by –PSB. The reason for this is covered in the description of the OGC.

CKT3 and CKT4 decode the Position number to give the Unit and Group Select signals. The position bits, POS0 through 5 are numbered in order of bit significance. Normally, i.e., with PSB false and –PSB true, the Position number is grated to the decoders from the Position counter, (i.e. signals –RTC.CA4 through –CA9). However, during a Position Status Request (PSB true), the number (signals –RTC.B5 through B0) of the Position to be interrogated is substituted for the normal number and forces the selection of the required Position.

g. Buffer Store Circuit (BSC)

One register of the buffer store and the associated selection gates are shown on FIG. 17. Normal key messages are conveyed to the A inputs A1, A2, etc.) of all seven registers, while IOR messages are conveyed to the B inputs. The signals (–CA4 through –CA9) for the Position field are the same in both cases. The report field in the former case is conveyed by the Key-bus signals (–K5 through –K8); whereas, in the latter case, the IOR phase is permanently wired to the B inputs.

The signal –ISr (Input Select lines 1 through 7) is false for the register currently selected for wiring. When a key message is to be written, –KTB (common to all seven registers) goes false for the duration of time T2. Thus, the inputs to D3 and D2 are true and false respectively and the current Key Word and Position number are gated in from the A inputs. In the Same way, when an IOR message is to be written, –ITB goes false and all the C (individual clock) inputs go true gating in the message via the B inputs.

The data outputs (B00*g* through B15*g*) are bused in two groups. B00A through B15A form the common outputs of register 1 through 4. B00B through B15B are common for registers 5, 6 and 7 and are bused with the outputs of a set of gates in the OGC (described in the next sub-section). When the Output Select signal (–OSN) to a given register is false, the content of that register only is admitted to the associated bus.

h. The Output Gating Circuit (OGC)

Figure 18:
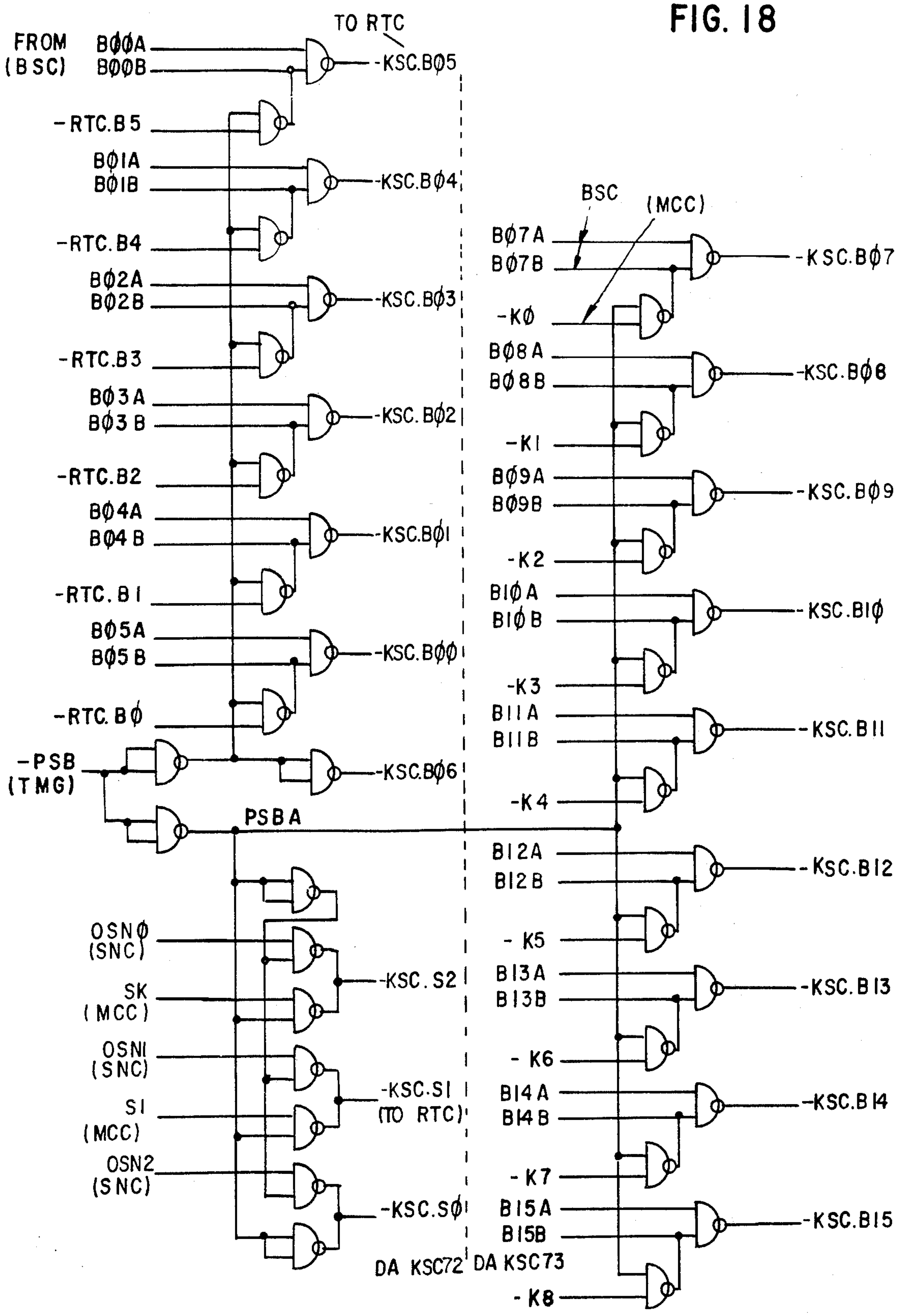

The OGC is shown on FIG. 18. This circuit provides the final gating for the buffer store output buses and presents the current message and its sequence number to interface. In addition, the OGC provides the required data substitution in response to a Position Status Request.

It was mentioned in the description of the SPD that when PSB is true, the Output Select signals –OS1 through 7 are all true. Therefore, the buffer store output gates (internal to the register cards) are all closed. At the same time, the Position Number (–RTC.B5 through B0) of the Position to be interrogated, together with the Key-word signals (–K0 through –K8) and current status bits are admitted to the interface.

CONTROL REGISTER CARDS

Figure 23:
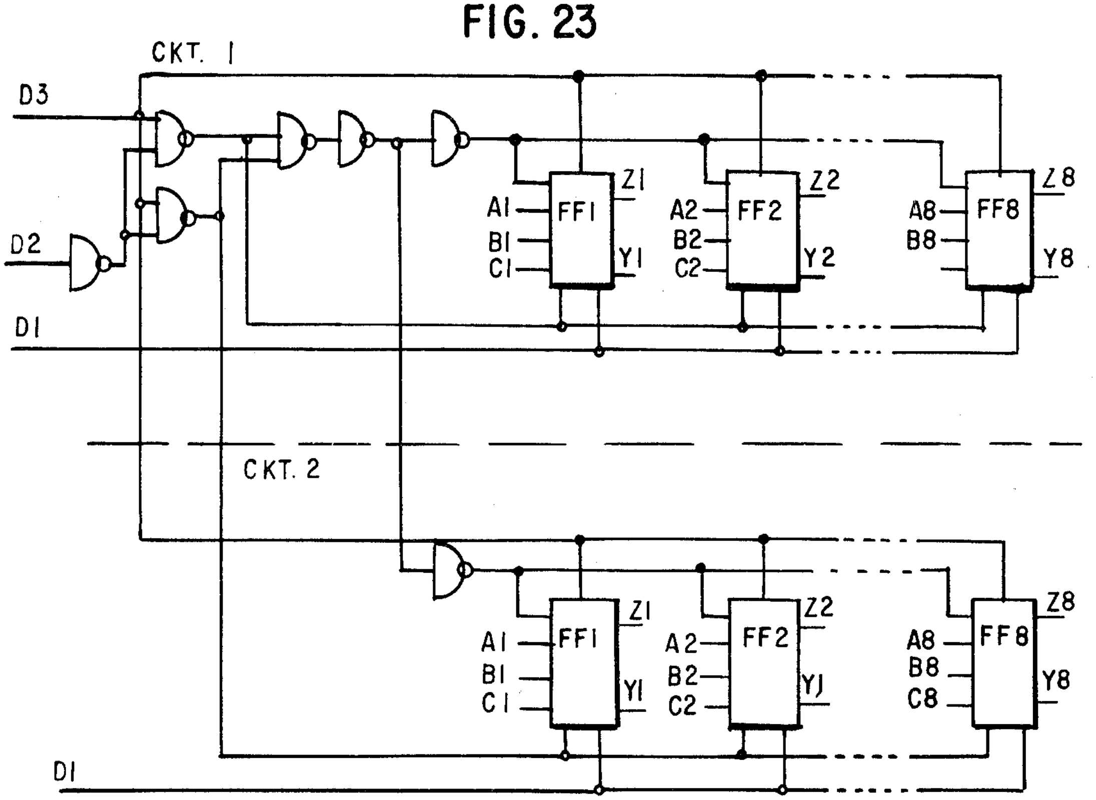
FIGS. 23 and 23*A* are functional block diagrams of a control register used as a building block in the other circuits.
Figure 23A:
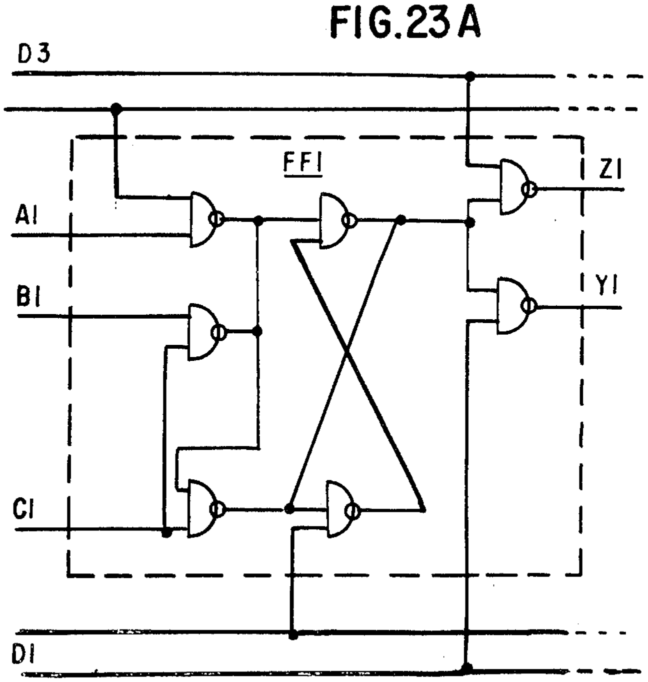
Figure 34:
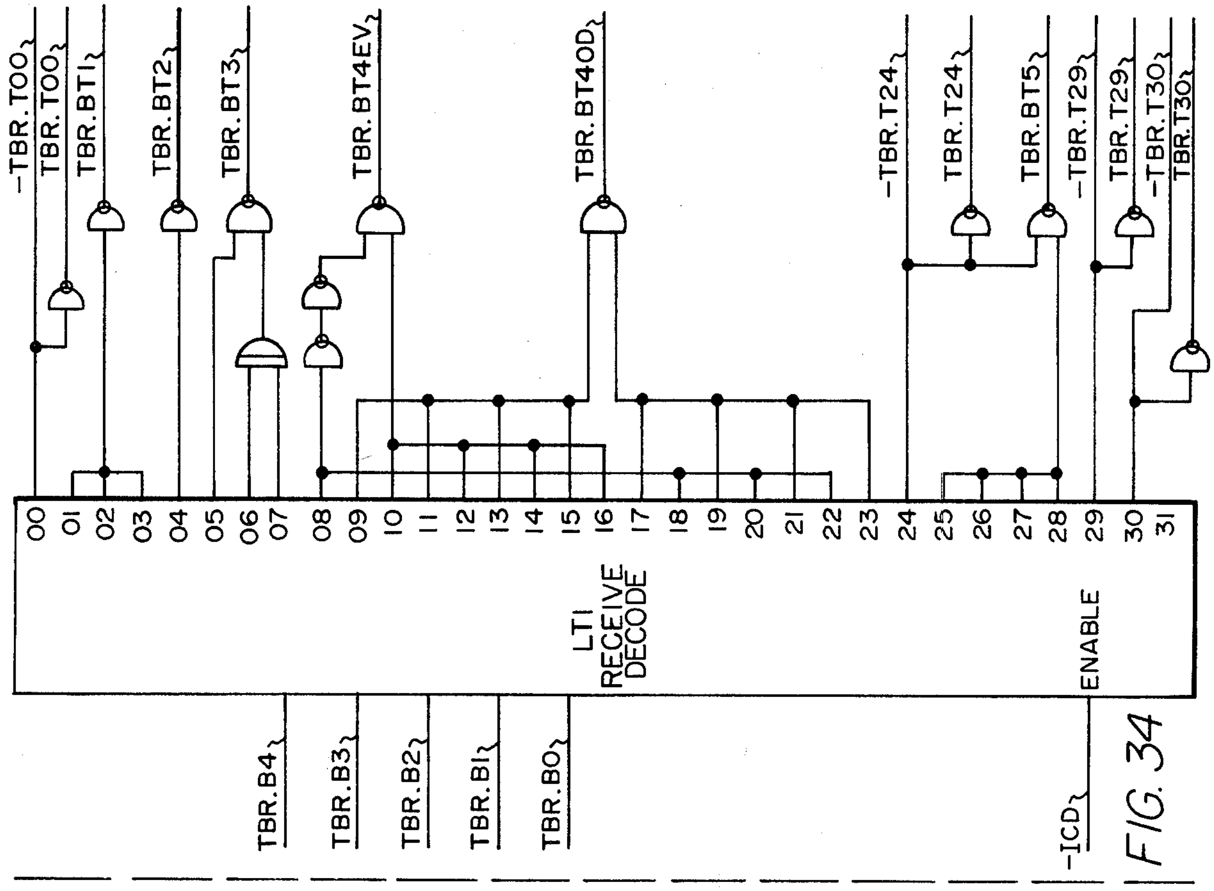
FIGS. 33–36 are functional block diagrams of the local terminal receiver.

The building block standard cards for use in the system include a control register made up of two-input NAND gates as shown in FIGS. 23 and 23A. There are two interconnected circuits on a card, each of which comprises eight bistable latch type devices designated as flip flops FF1–FF8. The circuit for one of these devices is shown in FIG. 23A. The inputs A*i*, B*i*, C*i*, and outputs Y*i* and Z*i* are individual to each bistable device where *i* has values 1 to 8, the input D1 is individual to each of the two circuits on a card but common to all eight bits of a circuit, and inputs D2 and D3 control both the circuits on the card.

The data A*i* are gated in by the coincidence of D2, D3, and are latched in at the trailing edge of D2, D3. The data B*i*, and clock C*i* provide control to individual bits. Data B*i* are gated in by the leading edge of clock C*i* and are latched in at the trailing edge of C*i*. The outputs Z*i* are activated by D3 and are fanning out to logic gates. The outputs Y*i* are activated by D1 and they also fan out to logic gates.

Figure 14:
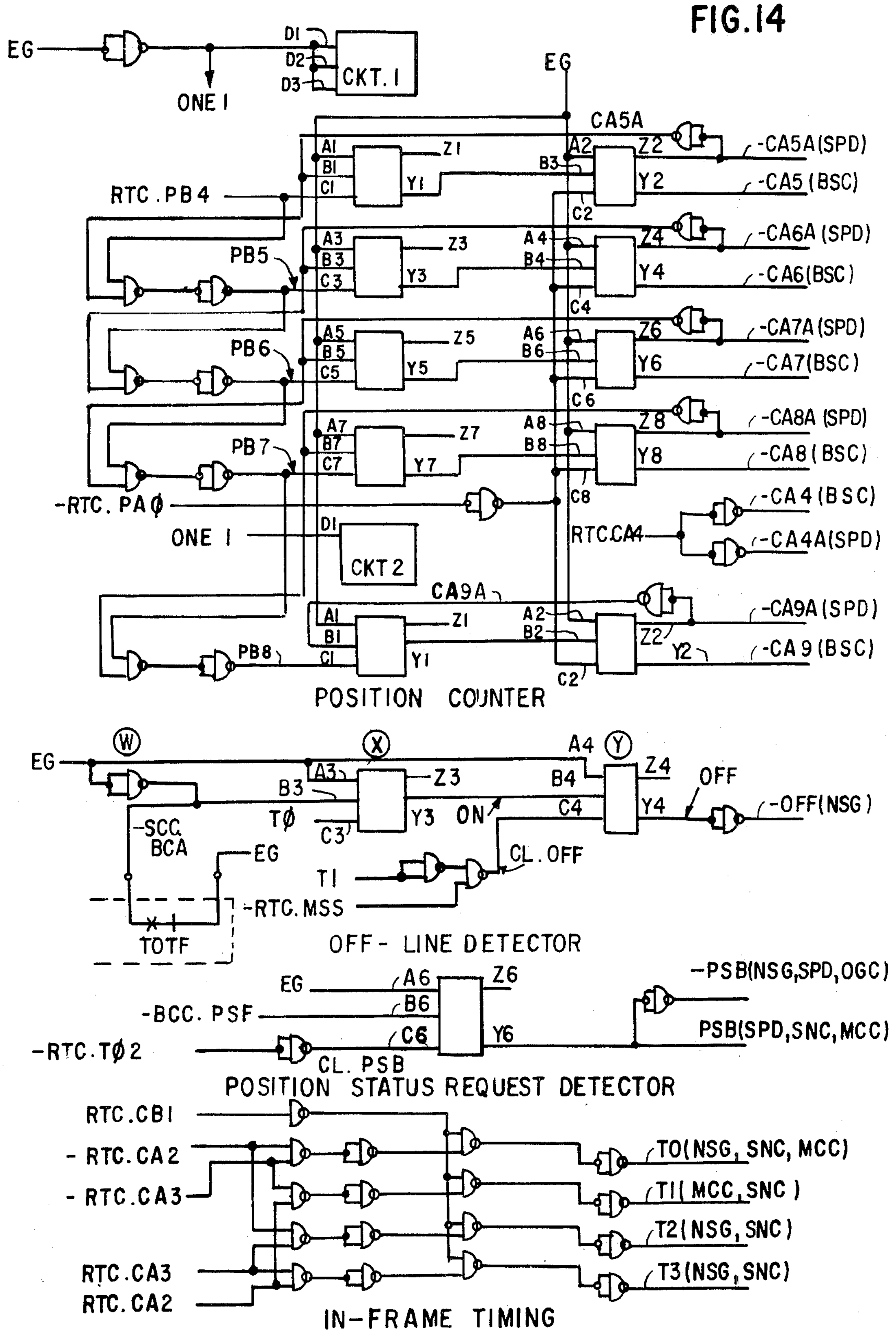

The registers shown in FIGS. 14, 15 and 17 use the circuits of FIG. 23.

HIGH THRESHOLD LOGIC

The logical portions of the sub-systems make use of either a selected group of high speed TTL integrated circuits, which may be from the Sylvania SUHL family; or a group of high threshold integrated circuits.

MESSAGE FORMAT

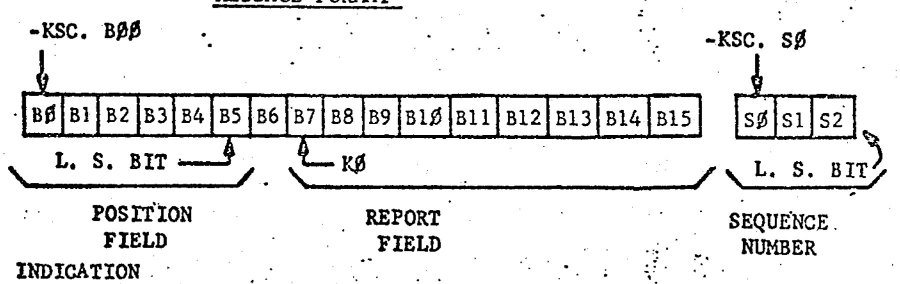

INDICATION
MESSAGE:
BØ-B5= POSITION NUMBER IN BINARY
B6 = Ø
B7-B15= KEY WORD OR IOR PHRASE IN 3/9 CODE
SØ-S2 = SEQUENCE NUMBER IN BINARY (1-7 ONLY)
POSITION
STATUS RESPONSE:
BØ-B5 = POSITION REQUESTED
B6 = 1
B7-B15= KEY WORD OF POSITION INTERROGATED
S2,S1 = STATUS BITS SK & S1 RESP.
SØ = 1

The circuits of the Key Scanner, including the control registers of FIG. 23, make use of the high threshold logic.

The high threshold logic integrated circuits are designed for use in high electromechanical noise environments and in the implementation of electronic-to-electromechanical interface circuits. The high noise immunity is the result of the large signal amplitude and the input hysteresis characteristic of the gate circuit. The positive or negative noise margins are a minimum of 6 volts. The family is designed to operate over the temperature range of 0°C to 75°C with a nominal propagation delay of 100 nanoseconds. Only one power supply of +12 volts is required.

The circuit comprises four transistors. The inputs comprise a diode AND gate (for positive logic in which 1 is a positive voltage and a 0 is ground potential), and the transistors provide an inverting amplifier so that the complete circuit is a NAND gate. The first transistor has its emitter connected to the diode gate and its collector coupled via a Zener diode to the base of the second transistor. The second and third transistors each have their emitter connected to the base of the next stage, and the last transistor has its emitter connected to a ground and the output at the collector has a pull up resistor. Resistors and diodes provide bias connections to a +12 volts and ground.

The circuits may be connected together at the output to perform the OR function for 0's. Thus, as shown in FIG. 11 in the group circuit, the outputs from four positions are connected together as an output bus, and the two busses from the eight positions of a group are connected as respective inputs of a group gate, so that when the output from the NAND gate of any position goes to 0 the output of the group gate goes to 1.

Figures 24, 24A:
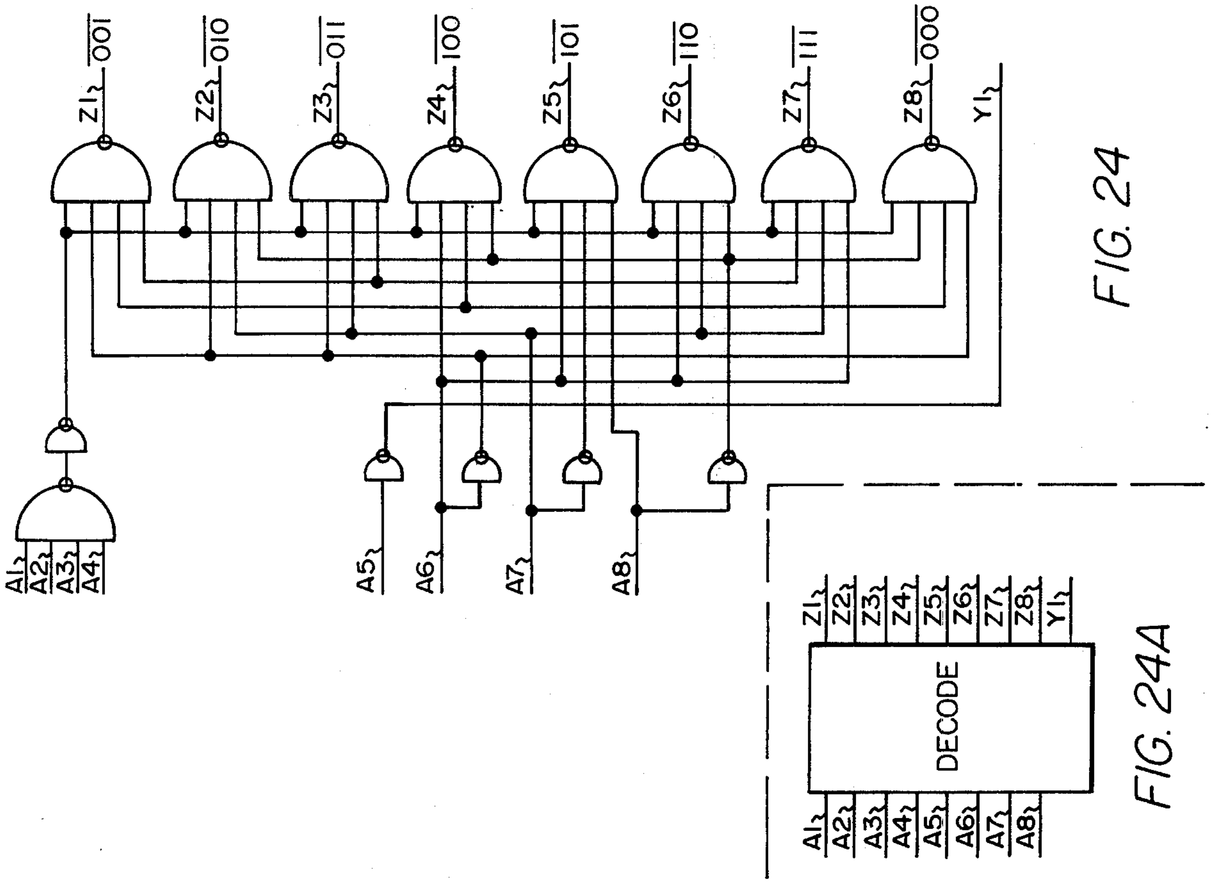
FIGS. 24 and 24*A* are diagrams of a decoding block.

The decode logic shown as blocks designated "decode" in FIG. 16, is shown in FIG. 24, with the symbol in FIG. 24A. The same logic is used to make up the timing decoders shown in FIGS. 32, 34, 37 and 45.

In some of the drawings AND gates are shown as semicircles with a line across them parallel to the base, and OR gates are shown with a diagonal line across them. These symbols each represent a group of NAND gates providing the AND or OR functions. Many of the buffering gates are omitted from the drawings to simplify them.

In Boolean equations in the following description, since the elements may include a period, the symbol & is used for the AND function, while the usual symbol + is used for the OR function.

DATA LINK

Figure 25:
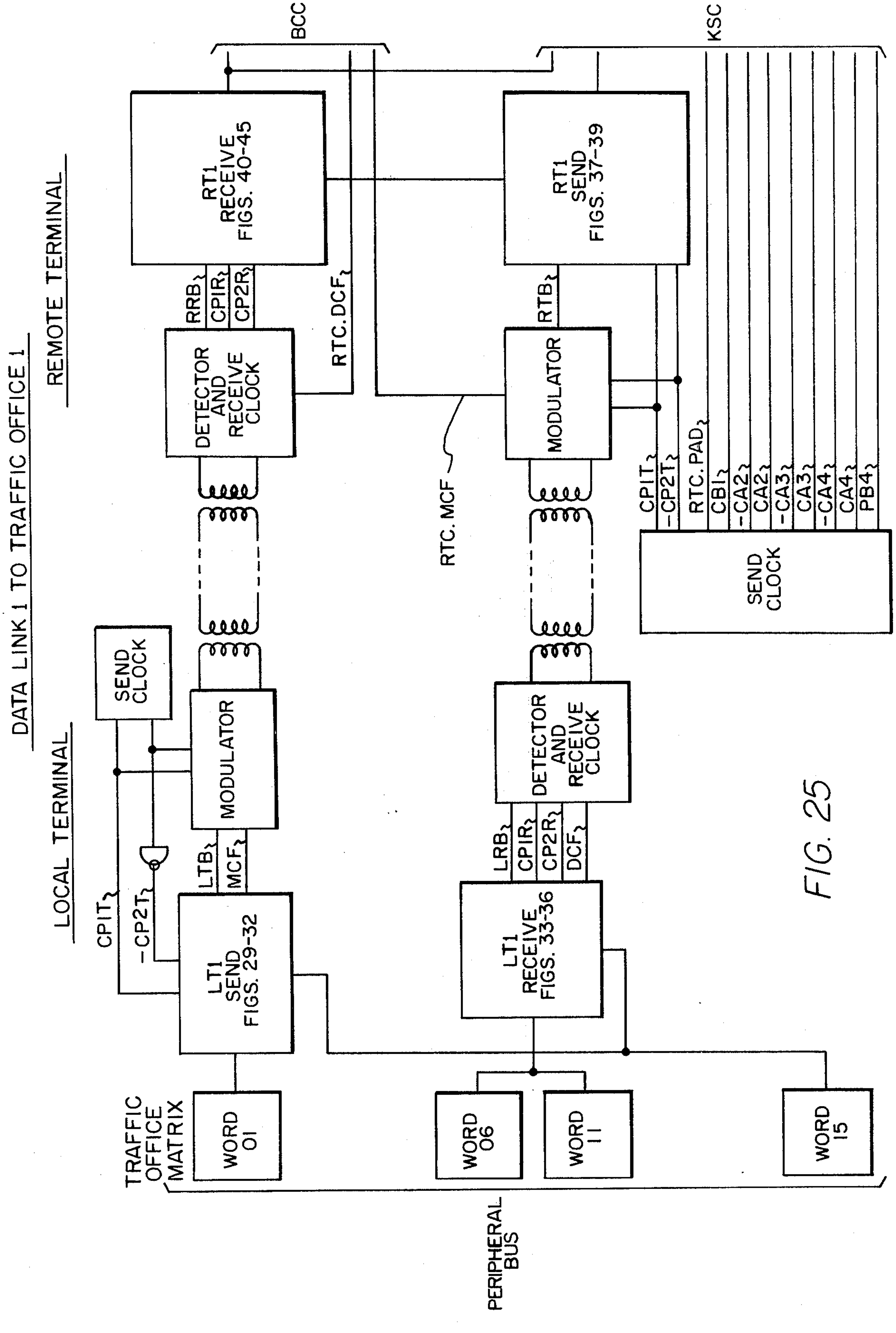
FIG. 25 is a block diagram of one data link with a local terminal and a remote terminal.
Figures 26, 32:
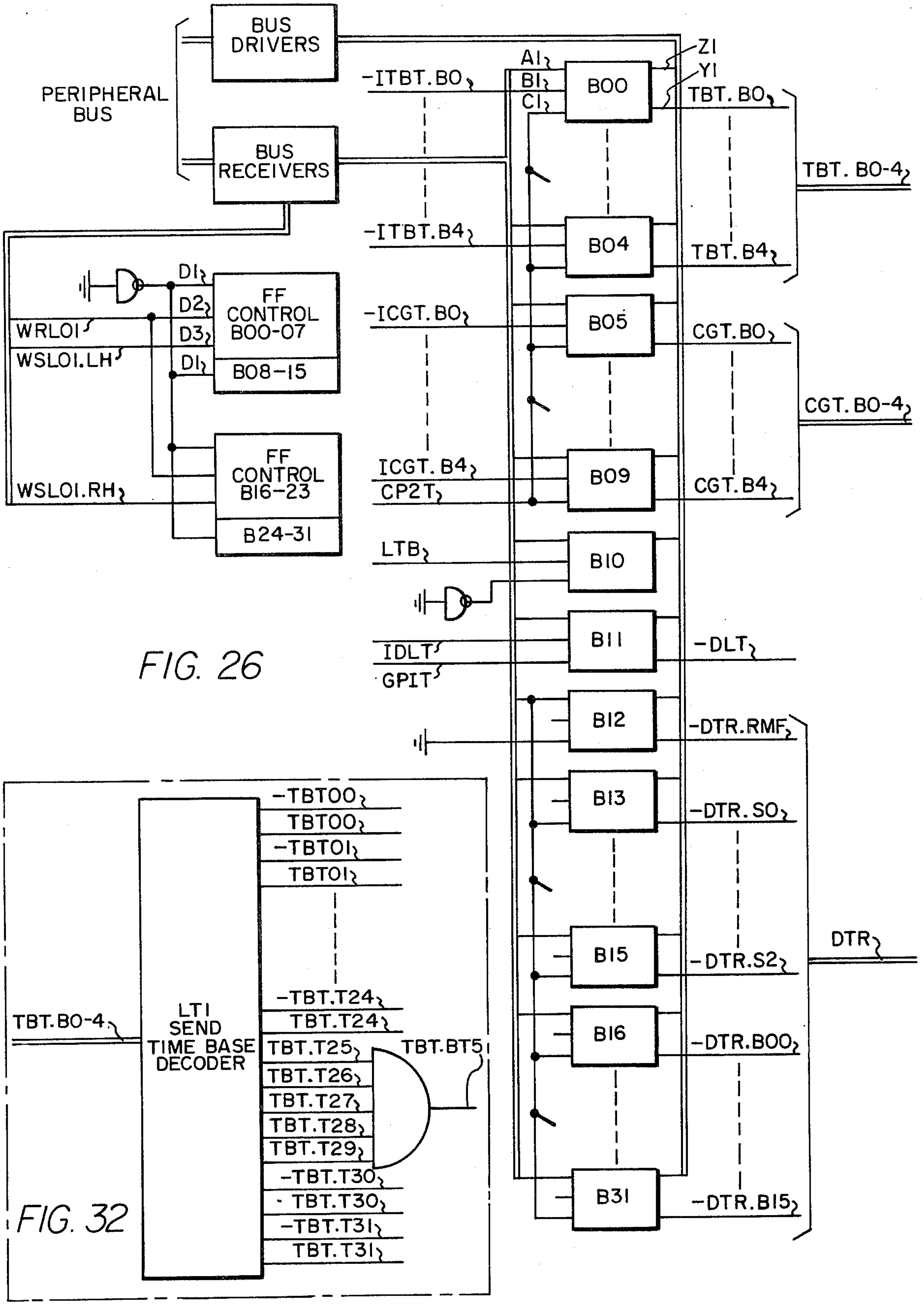
FIGS. 26–28 are functional block diagrams of the traffic office matrix words used with the data link of FIG. 25.
FIGS. 29–32 are functional block diagrams of the local terminal transmitter.

One of the data links to traffic office 1 is shown by a block diagram in FIG. 25. As shown in FIGS. 1 and 2, the base location includes the local terminals for the data links, along with the traffic office matrices. The central processor is the principal unit of the control and maintenance complex CMC, the latter mnemonic being used in the description and on some of the drawings to designate the base location. The traffice offices, designated as TO or TOC, contain the remote terminals. The block diagram of FIG. 25 shows data link 1 comprising local terminal LT1 and remote terminal RT1; and associated with the local terminal LT1 are traffic office matrix words 1, 6, 11 and part of 15. FIG. 2 shows that the frame TOAF1 includes data links 0–4 (data link 0 not used). FIG. 46 shows the assignment of the words to these data links.

The communication between the traffic office matrices via the peripheral bus to the central processor is described in said CENTRAL PROCESSOR patent application.

The registers of the traffic office matrices, as well as many in the local and remote terminals, in FIGS. 26, 27, 28, 29, 33, 37 and 40, are of the type shown in FIG. 23. Each flip-flop is shown with A, B and C inputs on the left, and the Z and Y outputs on the right, while the common inputs D1, D2 and D3 are shown with an extra control block. The D2 and D3 inputs are common to 16 flip-flops, while the D1 inputs are each common to eight flip-flops.

When used in the traffic office matrix frames, these flip-flops are designated as dual access matrix points (DAMP). Each word contains 32 flip-flops. The A inputs are used for software input data from the peripheral bus clocked by the D2 and D3 inputs, and the Z outputs are software data to the bus gated by D3. The B inputs are used for hardware data input clocked at the C inputs, and the Y outputs are used for hardware output gated by D1.

TRAFFIC OFFICE ACCESS FRAME

1. General

Purpose Of Frame 1.1 The Traffic Office Access Frame may be considered as an interface frame between the CMC and (up to) five voice band facilities leading the same number of Traffice Offices. Each facility is used exclusively for the exchange of information (data between a T.O., which may be remote, and the CMC at the base location).

A principal function of the TOAF hardware is the parallel to serial conversion of data from the CMC to the T.O., and serial to parallel conversion of data received from the T.O. and presented to the CMC.

Also, since the data are usually related to some call handling situation, errors are likely to lead to mishandling. Various error check and data recovery procedures are built into the system; within the TOAF there is hardware to generate and to check redundancy bits which form a part of each transmission between locations.

Hardware Organization 1.2 The hardware is generally divided into five equal parts reflecting the capability for serving five T.O.'s. Within each of the five sections, the hardware is functionally subdivided into transmit and receive groupings which are essentially independent of each other, since each data system operates "full duplex" over a dedicated four-wire facility.

Three words of the TOM are assigned to each of the Traffic Office sections, two within the "receive" subdivision and one within the "transmit". A few key bits for each T.O. are assigned in the sixteenth word as a software convenience. Physically, the TOM is distributed with the other per - T.O. hardware, so that portions may also be omitted in a TOAF serving fewer than five T.O.'s.

The Data Modulator-Demodulator (MODEM)

1.3 The MODEM consists of a Transmitter or modulator 2501, Transmit or Send Clock 2502, Receive Limiter and Detector/Clock 2503. The Transmit Clock is crystal controlled for frequency stability; and provides synchronous control of the Modulator and the transmit logic. Data rate is 2400 bits per second; the modulation technique is known as frequency shift keying (FSK).

The Receiver Clock is synchronized by the received data and thus is essentially based on the distant transmitter. synchronizing occurs when the data changes from 0 to 1 or 1 to 0; a long continuous sequence of all 1's or all 0's could eventually cause loss of sync. The logic associated with the receive function is clocked by this pulse source.

Message Format and Matrix Layout 1.4 Quiescently, each transmitter sends a continuous stream of alternating 1's and 0's, called the "idling" pattern. This serves to maintain the far end receiver in synchronism and also monitors the integrity of the system, as loss of signal will be detected and cause an alarm.

Figure 47:
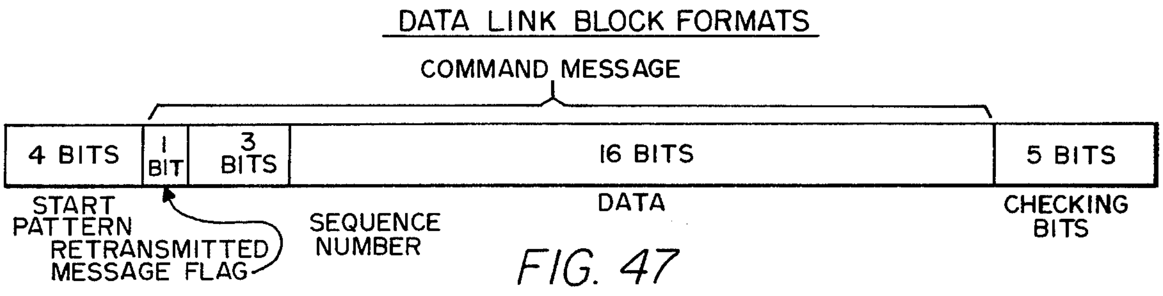
FIG. 47 is a diagram showing the format of messages as transmitted.

When a message is to be transmitted, the idling pattern is interrupted by a fourth bit "start" pattern, followed by the data. (FIG. 47). A message originated by the CMC is called a "Command". and one originating at the T.O. is called an "Indication"; in either event the data fields total 20 bits. Following the data, the transmit hardware appends five check bits (known as a "Bose-Chaudhuri" check sum) which have been computed over the preceding 24 bits. Thus, total message length is 29 bits, following which the idling pattern is resumed.

Figure 48:
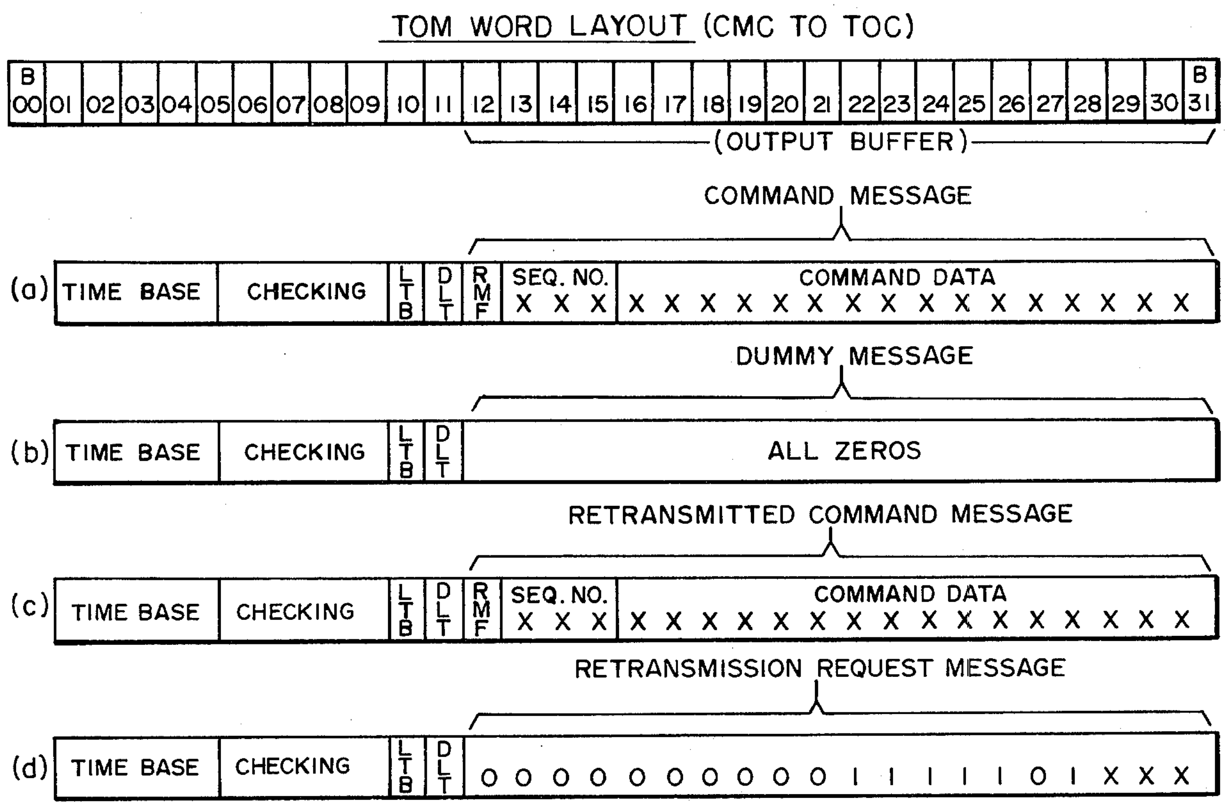
FIGS. 48 and 49 are diagrams of the traffic office matrix word formats.

The word in the TOM assigned for transmitting commands (FIG. 48) provides 20 data bits right adjusted, and a "load" bit, DLT. When the data have been written into this word by software, DLT is set which causes the transmit hardware to initiate the 29 bit message sequence. DLT is reset by hardware when the sequence is completed. The remaining bits in this word are used for internal hardware function; maintenance/diagnosis of these key functions is facilitated by thus providing software access.

Figure 49:
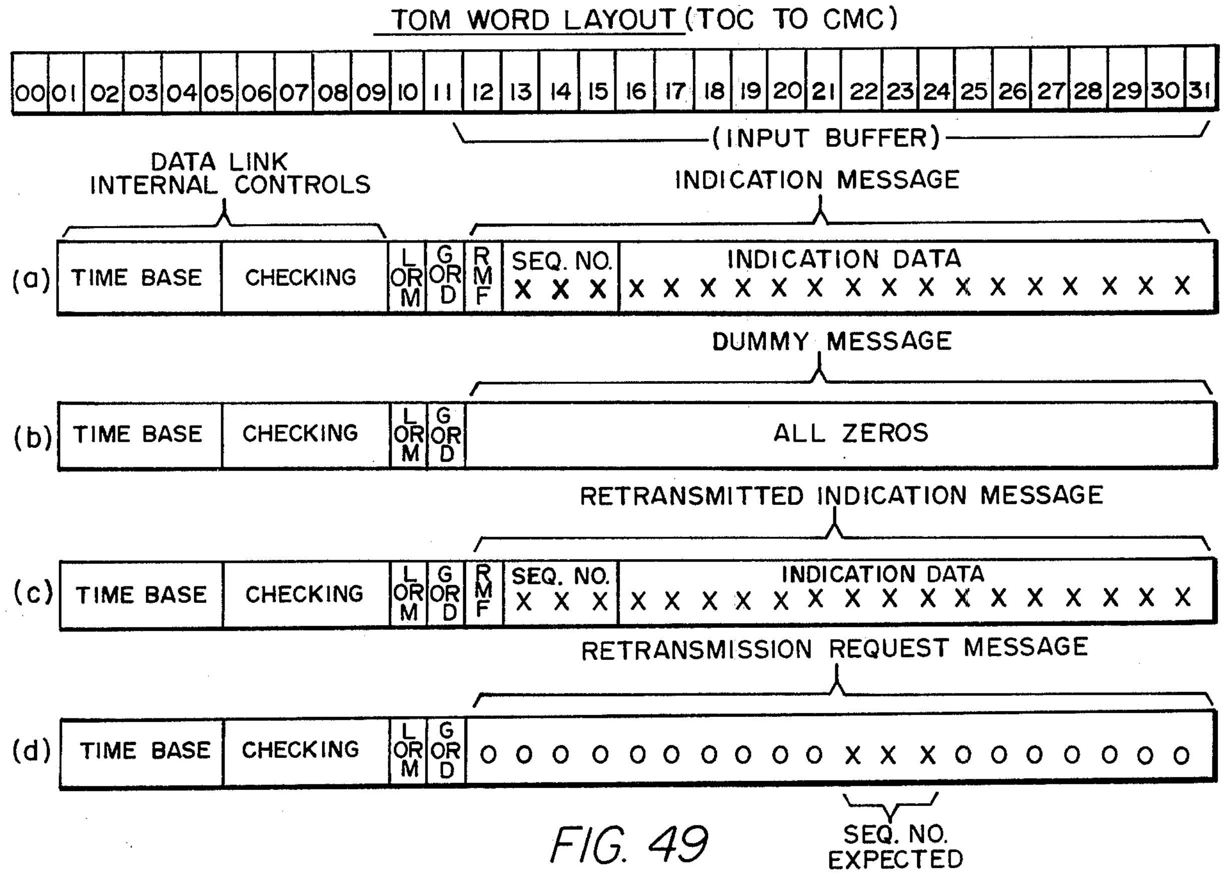
Figure 51:
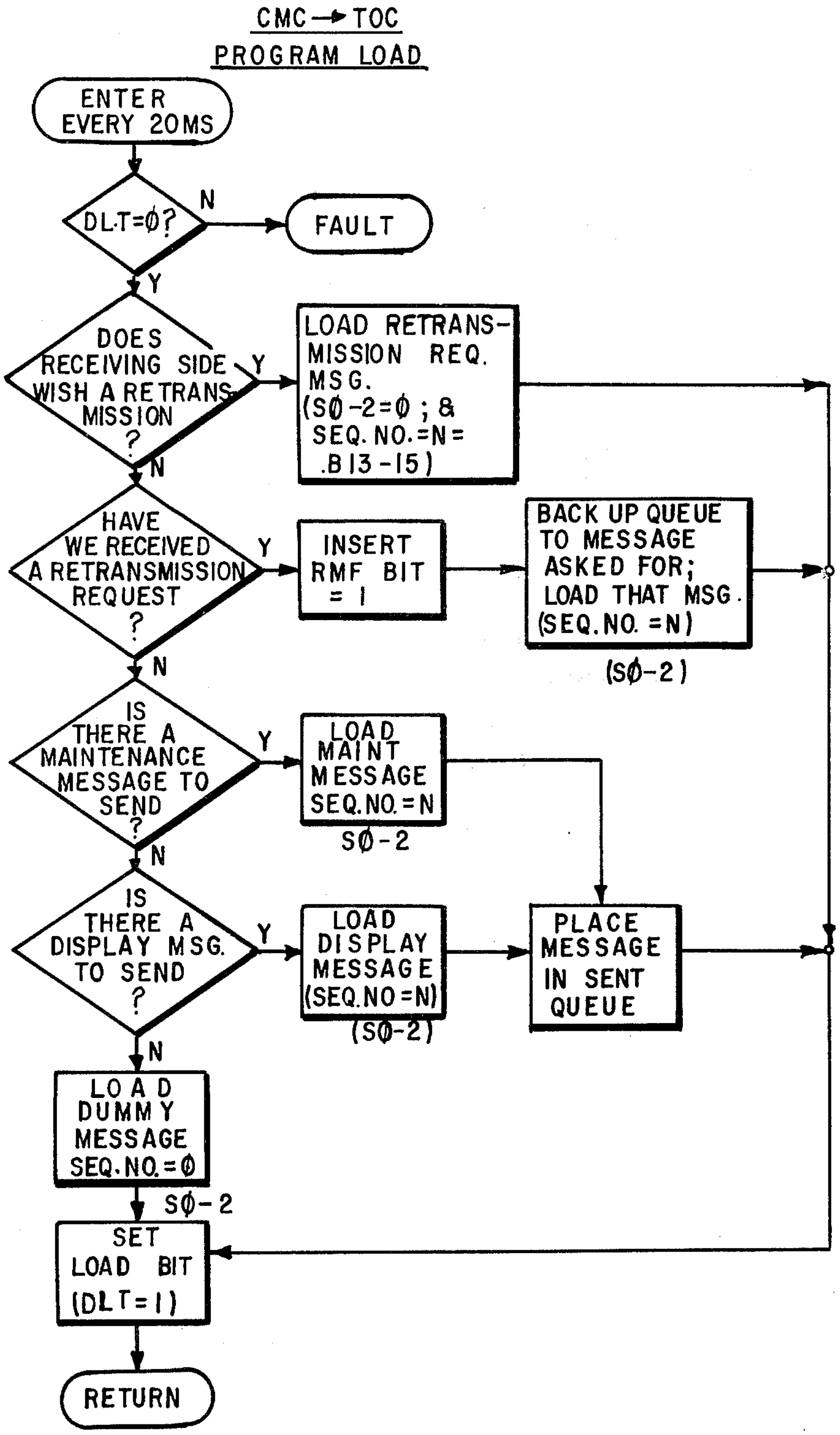
FIGS. 51–56 are flow charts for hardware and software.
Figure 52:
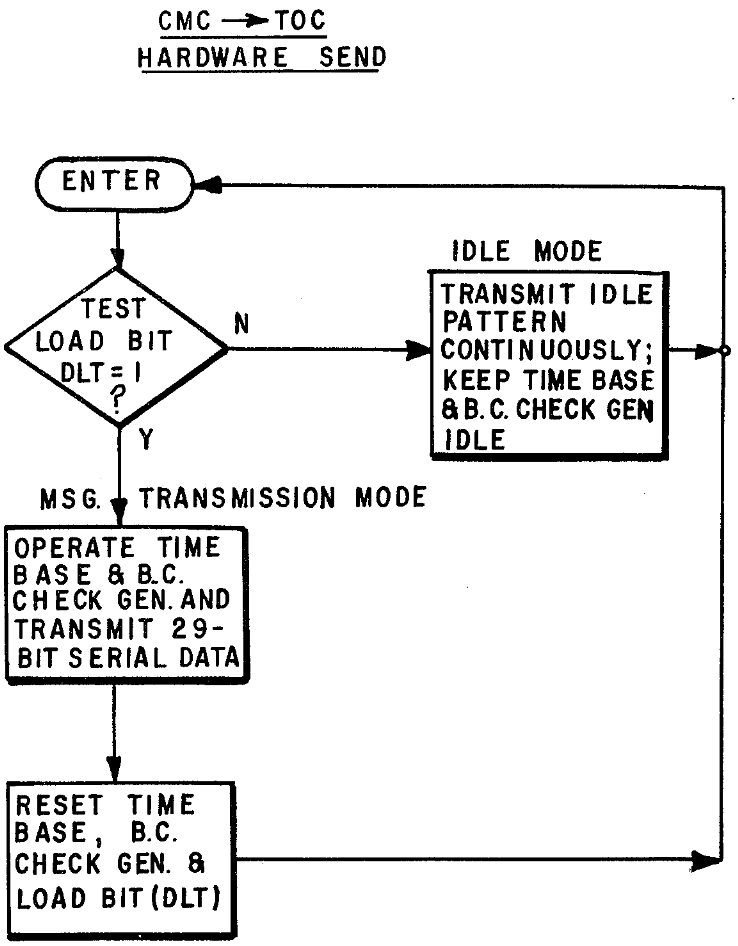
Figure 53:
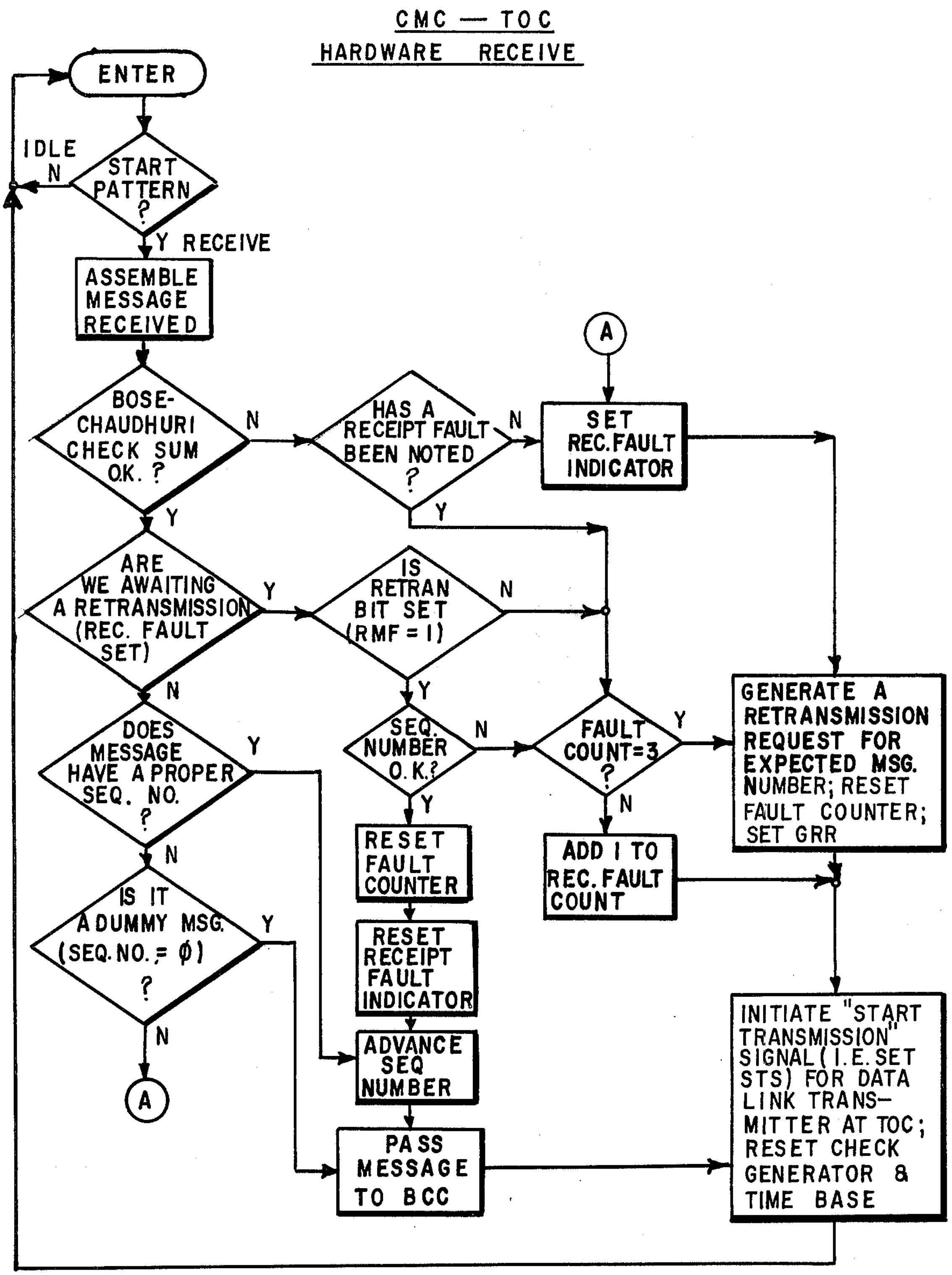
Figure 54:
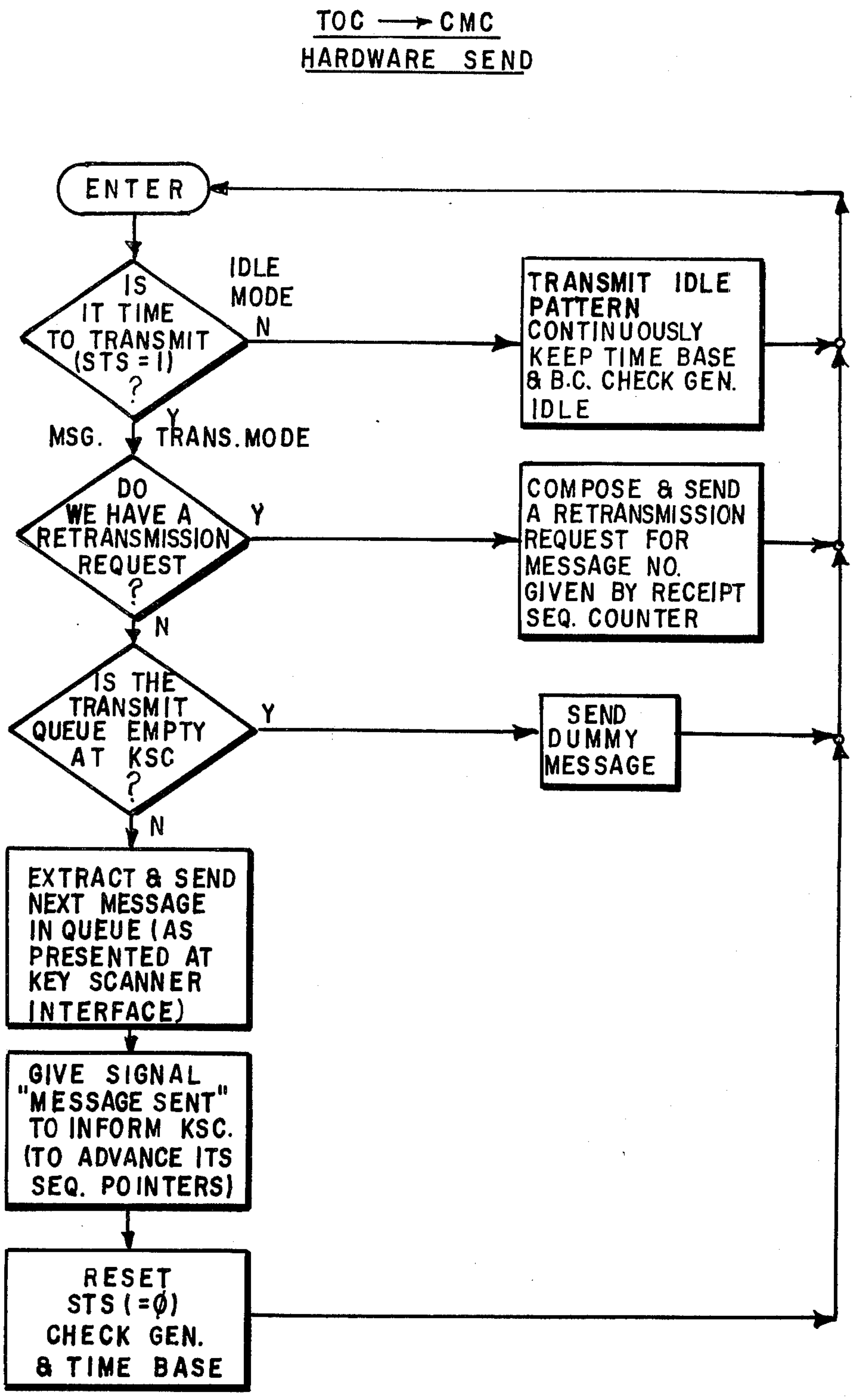
Figure 55:
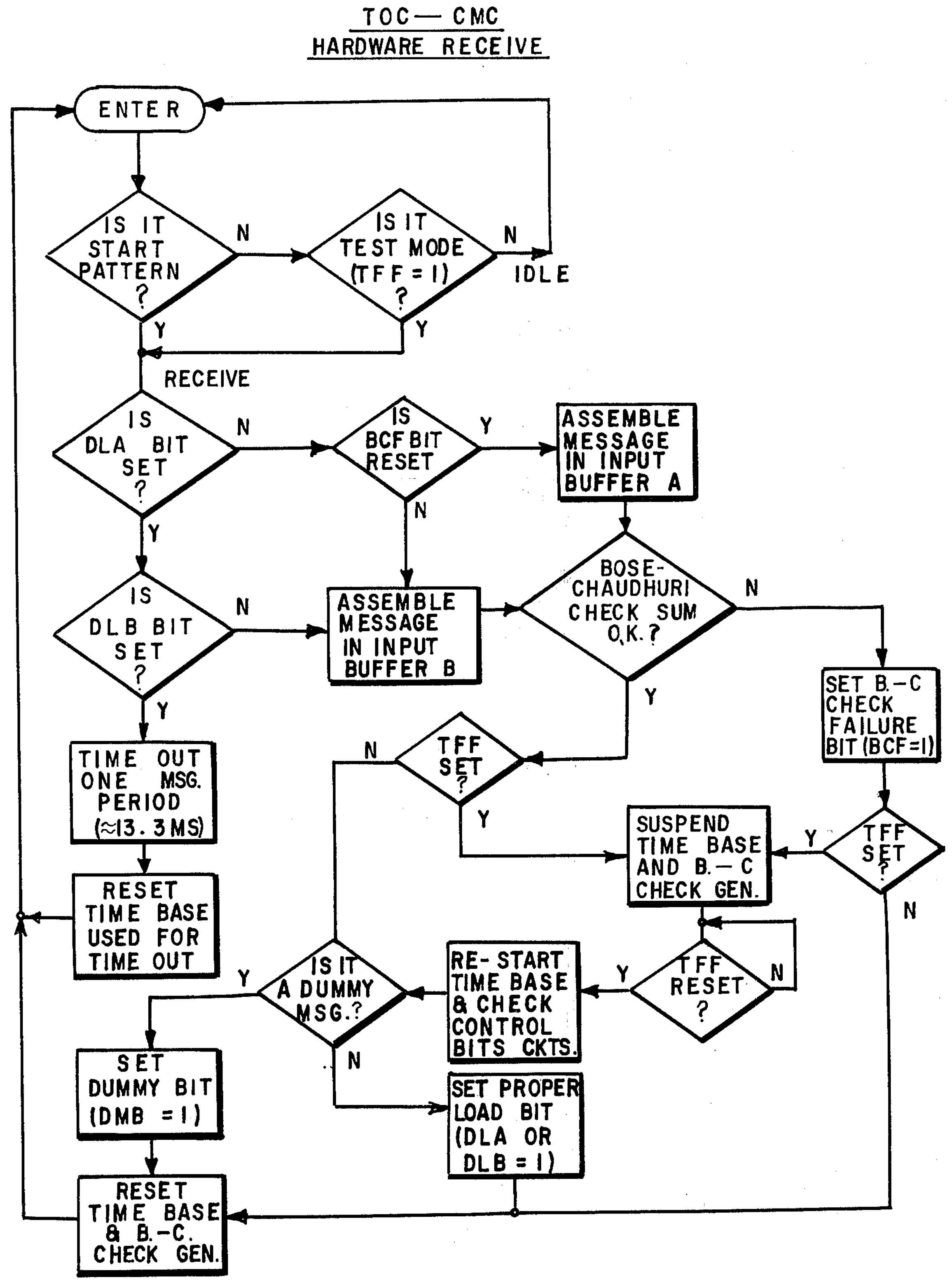
Figure 56:
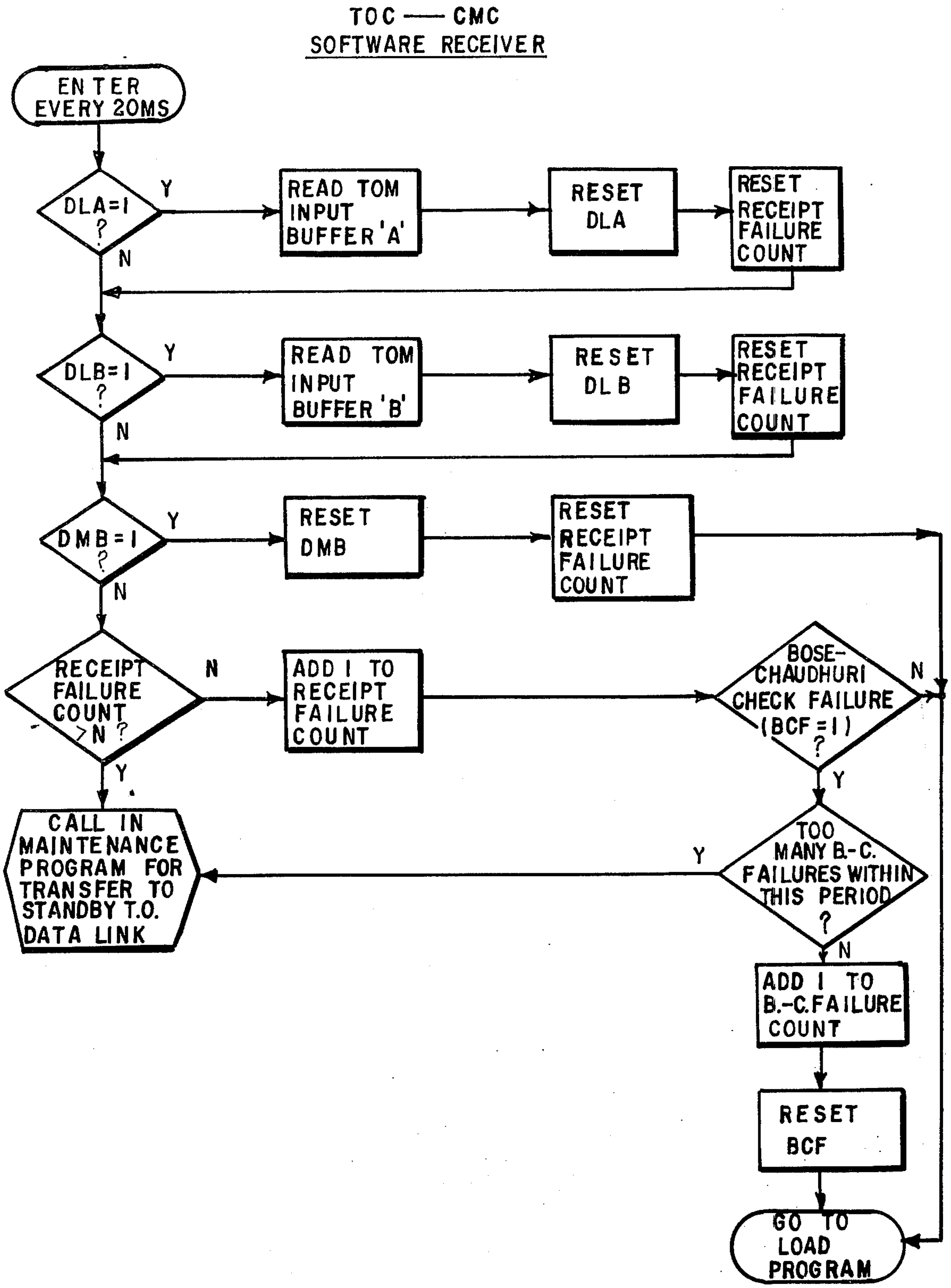
Figure 57:
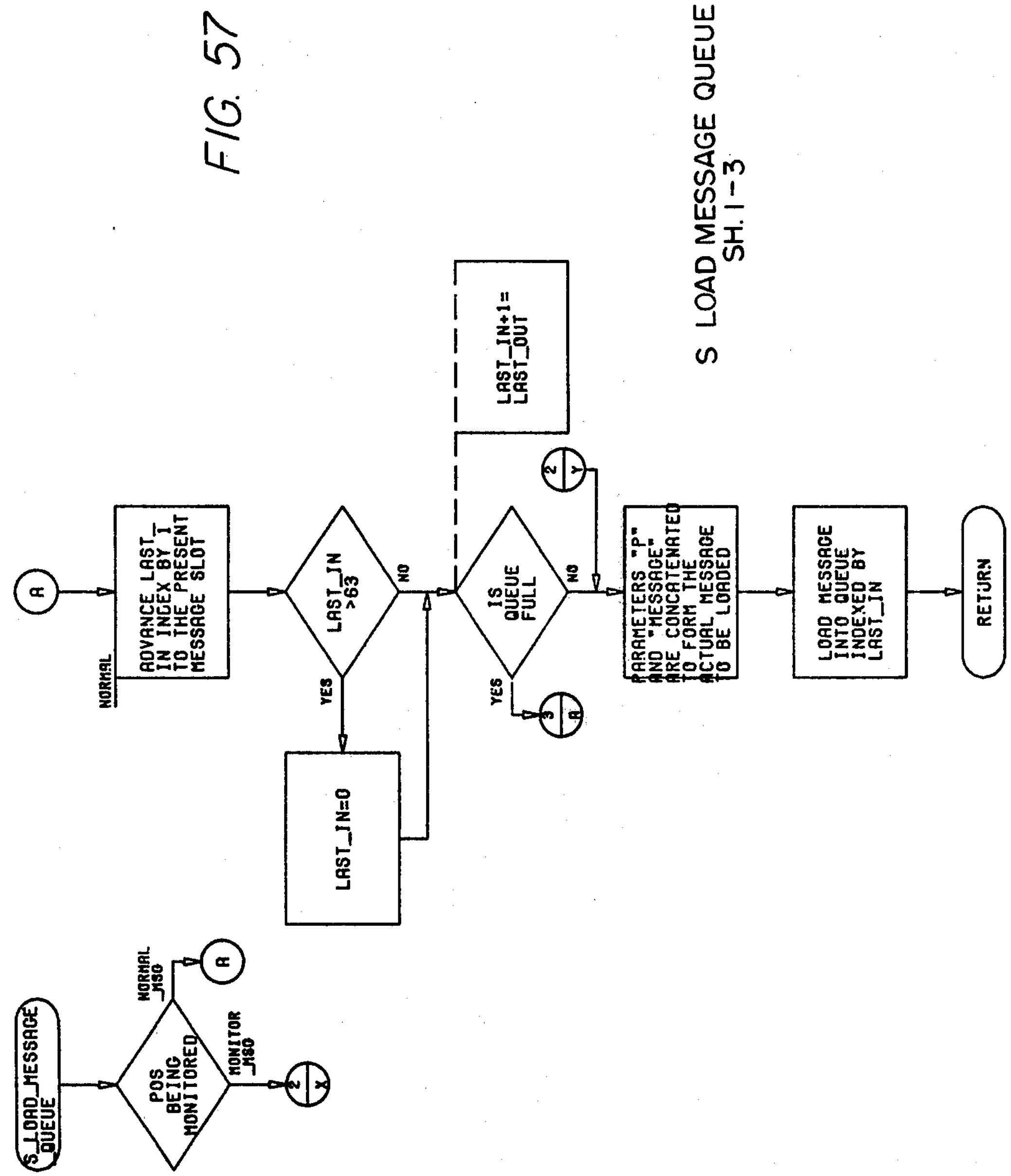
FIGS. 57–68 are flow charts of a specific embodiment of the software for data link control.
Figure 58:
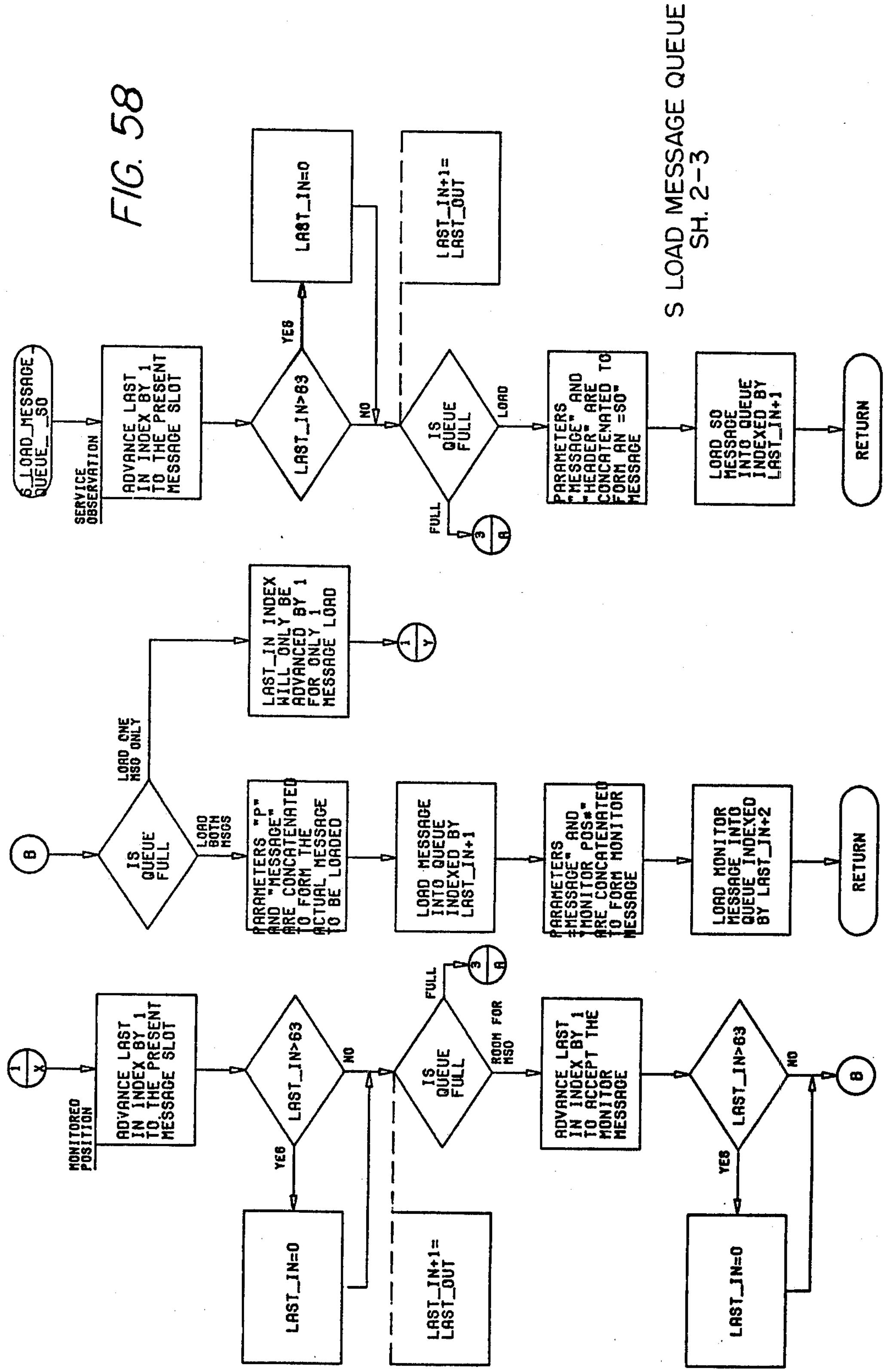
Figure 59:
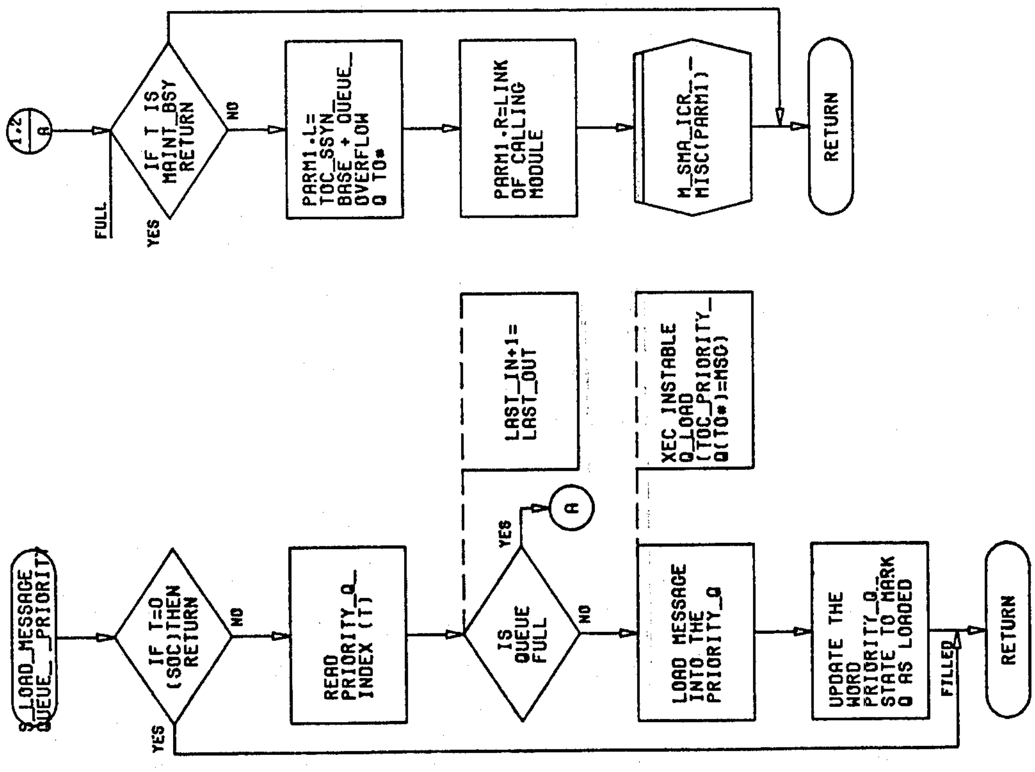
Figure 60:
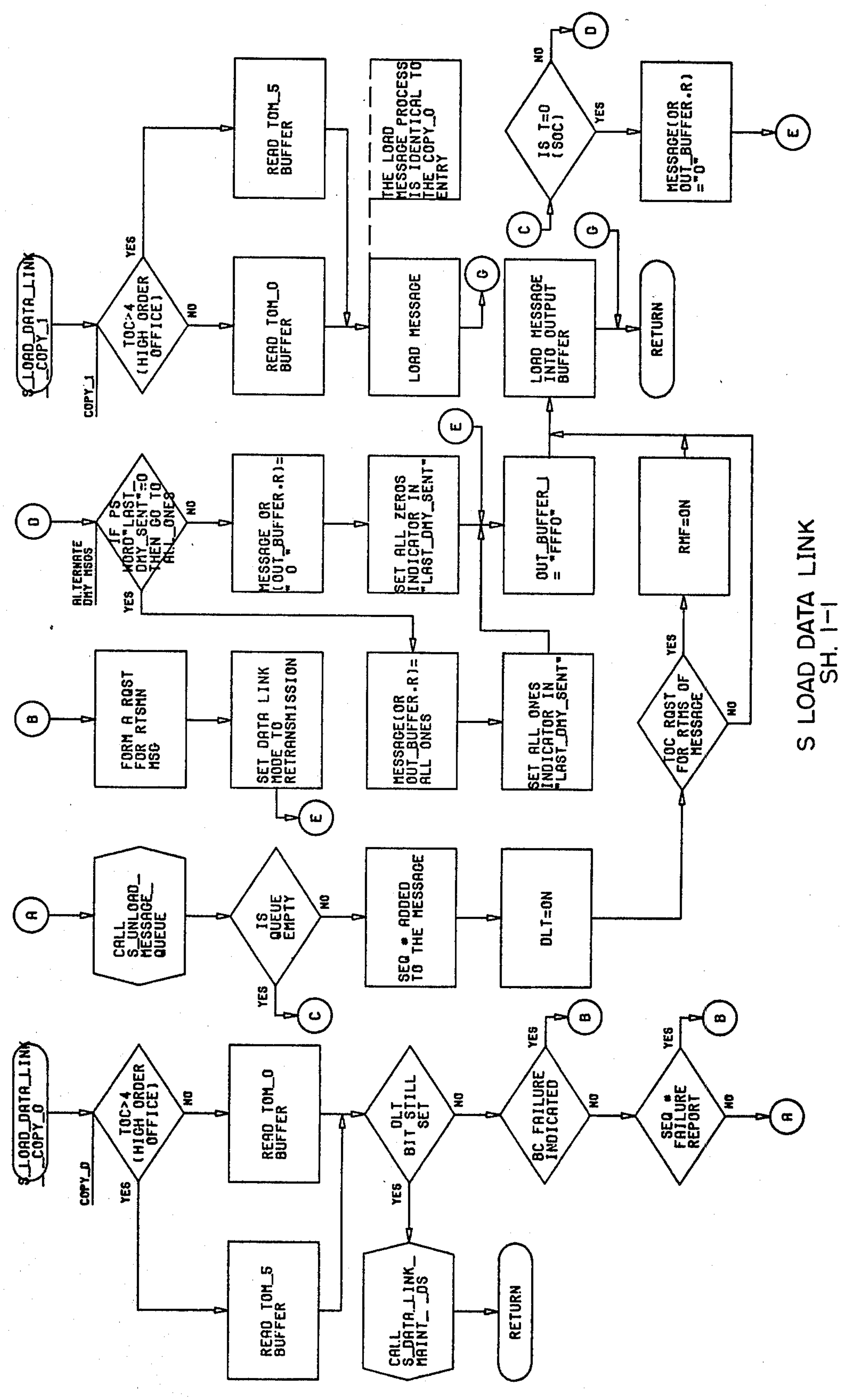
Figure 61:
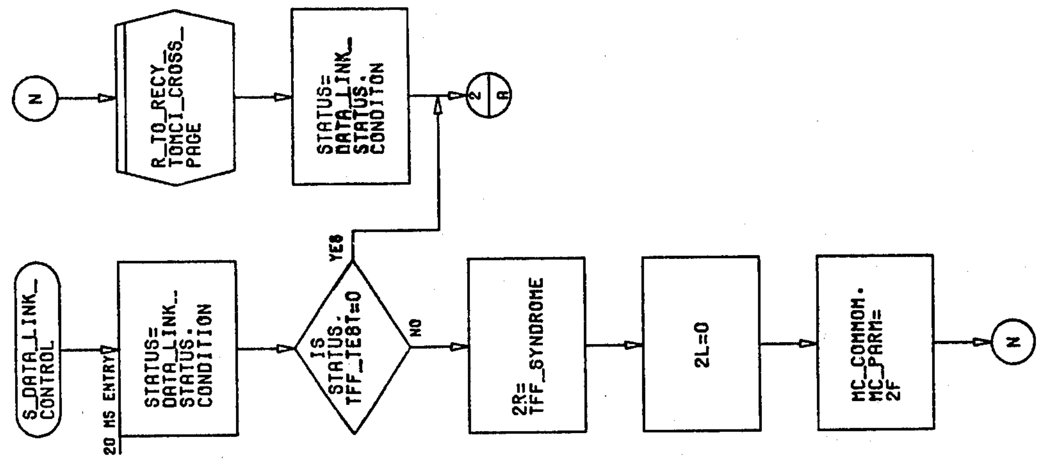
Figure 62:
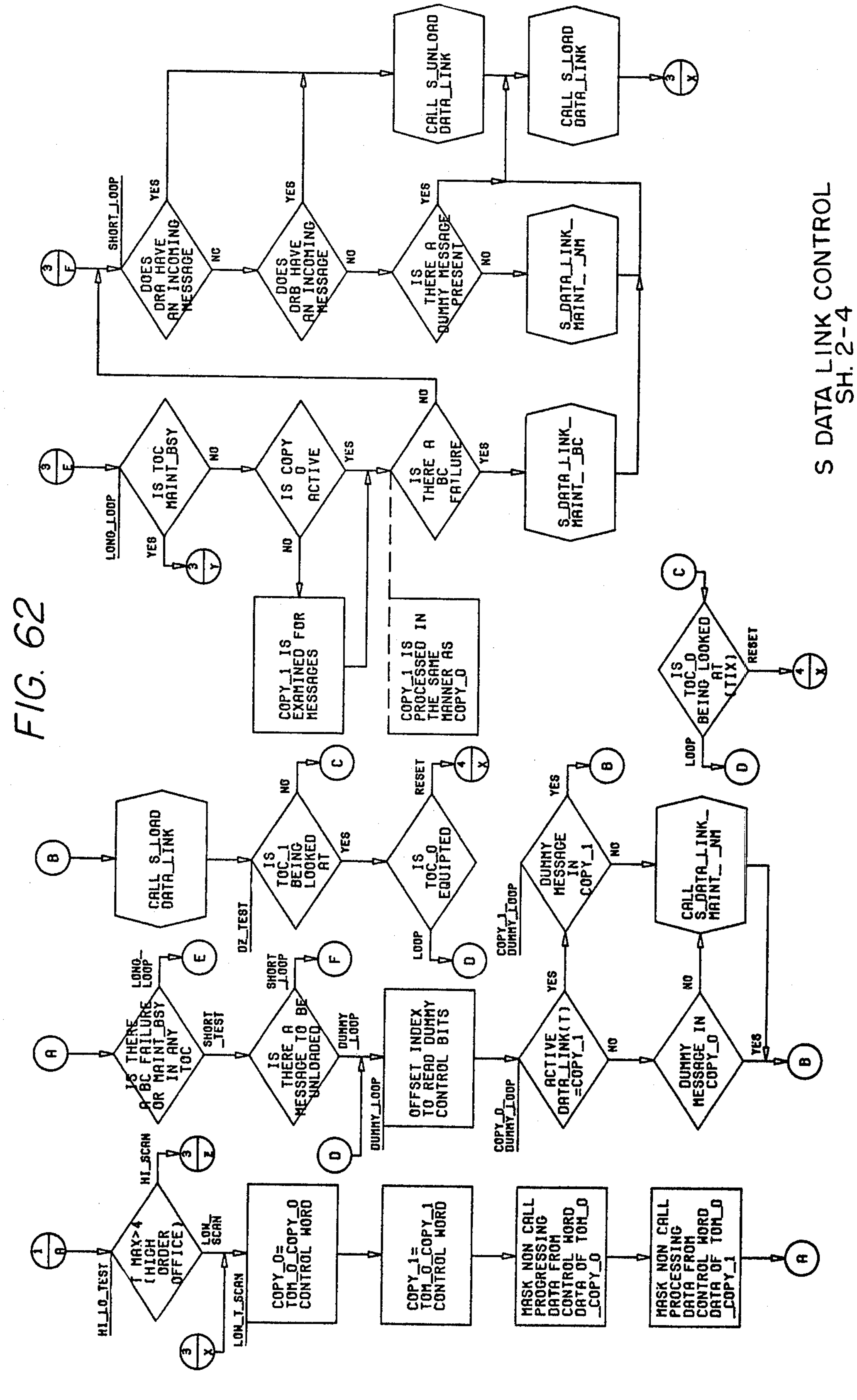
Figure 63:
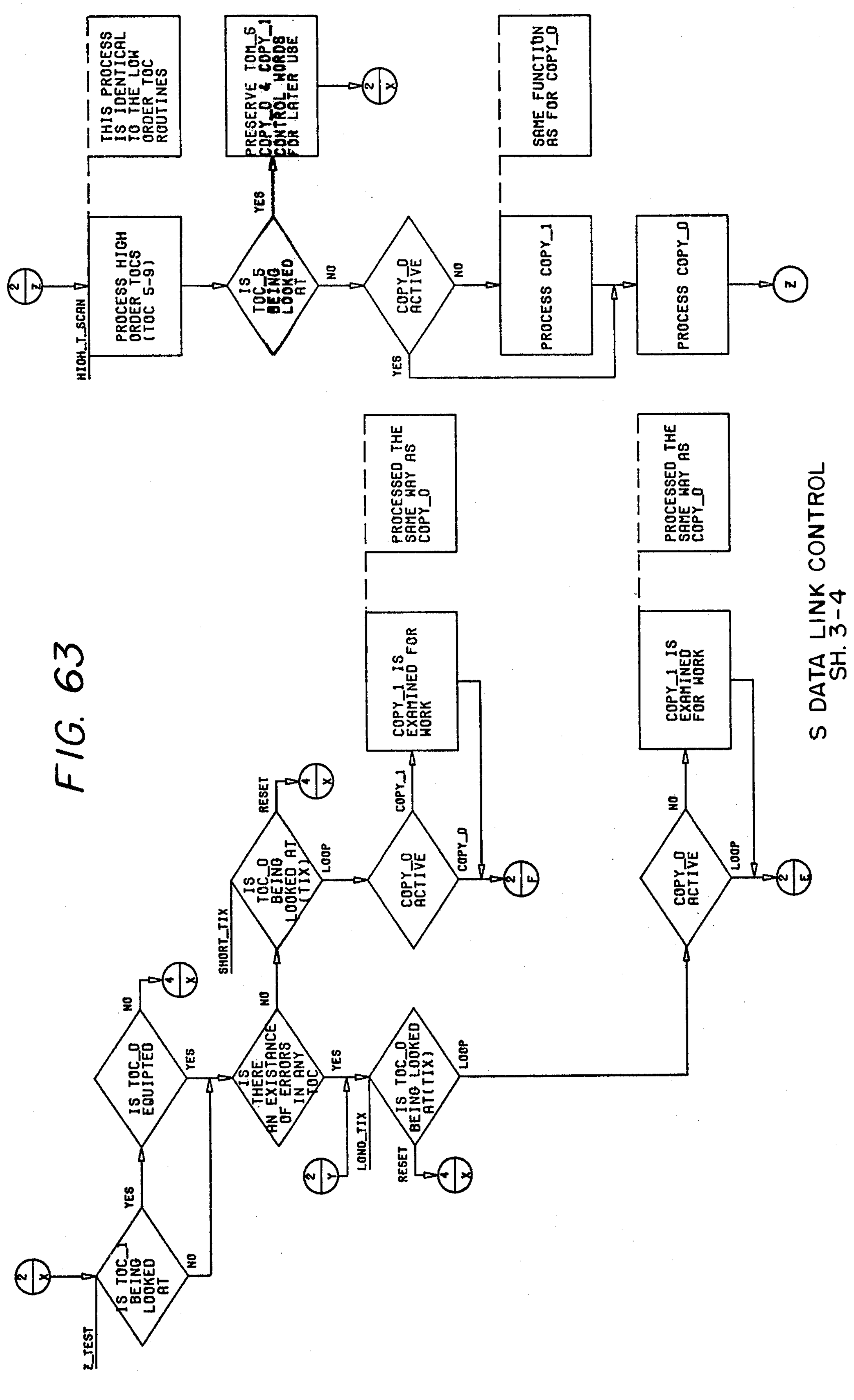
Figure 64:
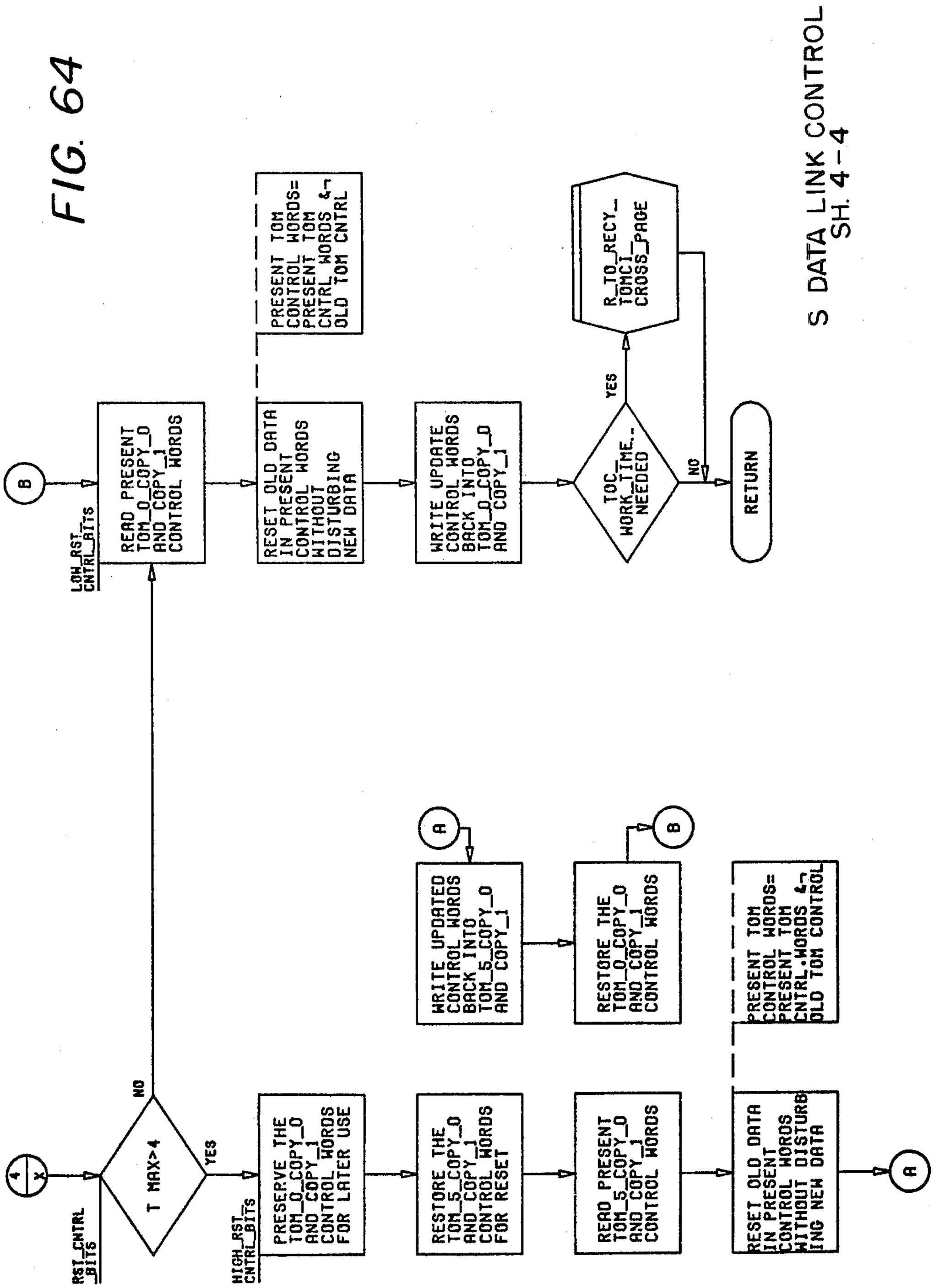
Figure 65:
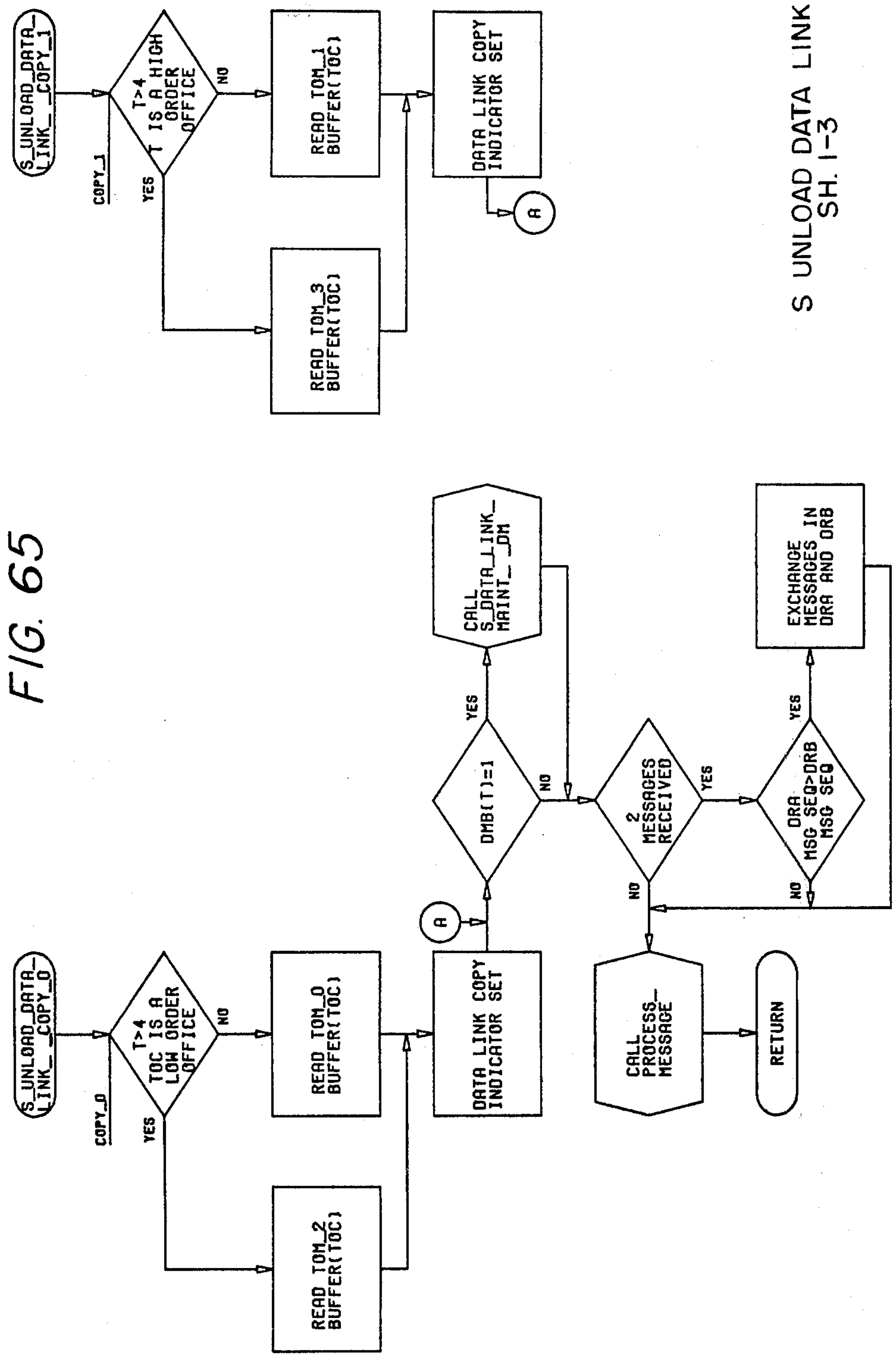
Figure 66:
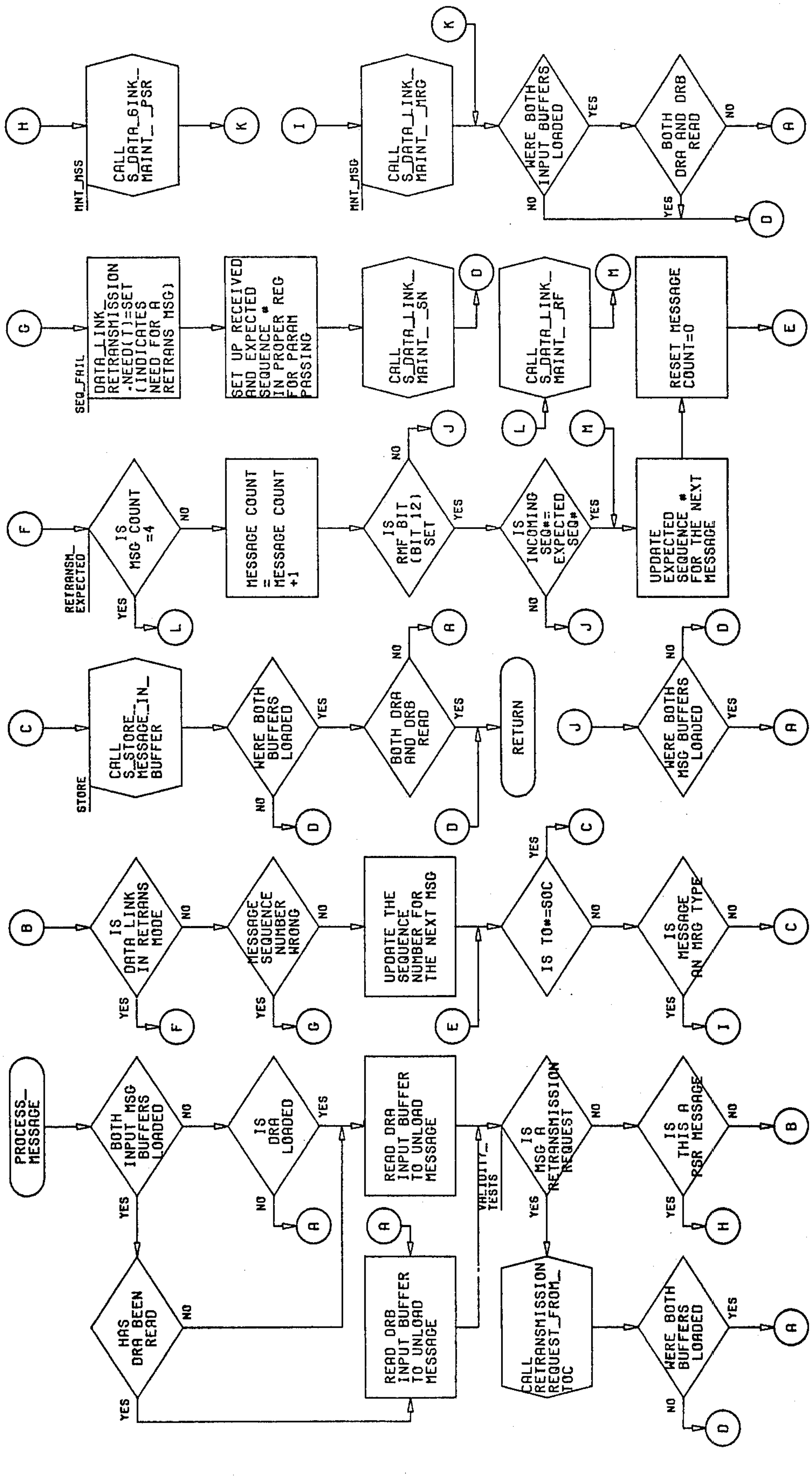
Figure 67:
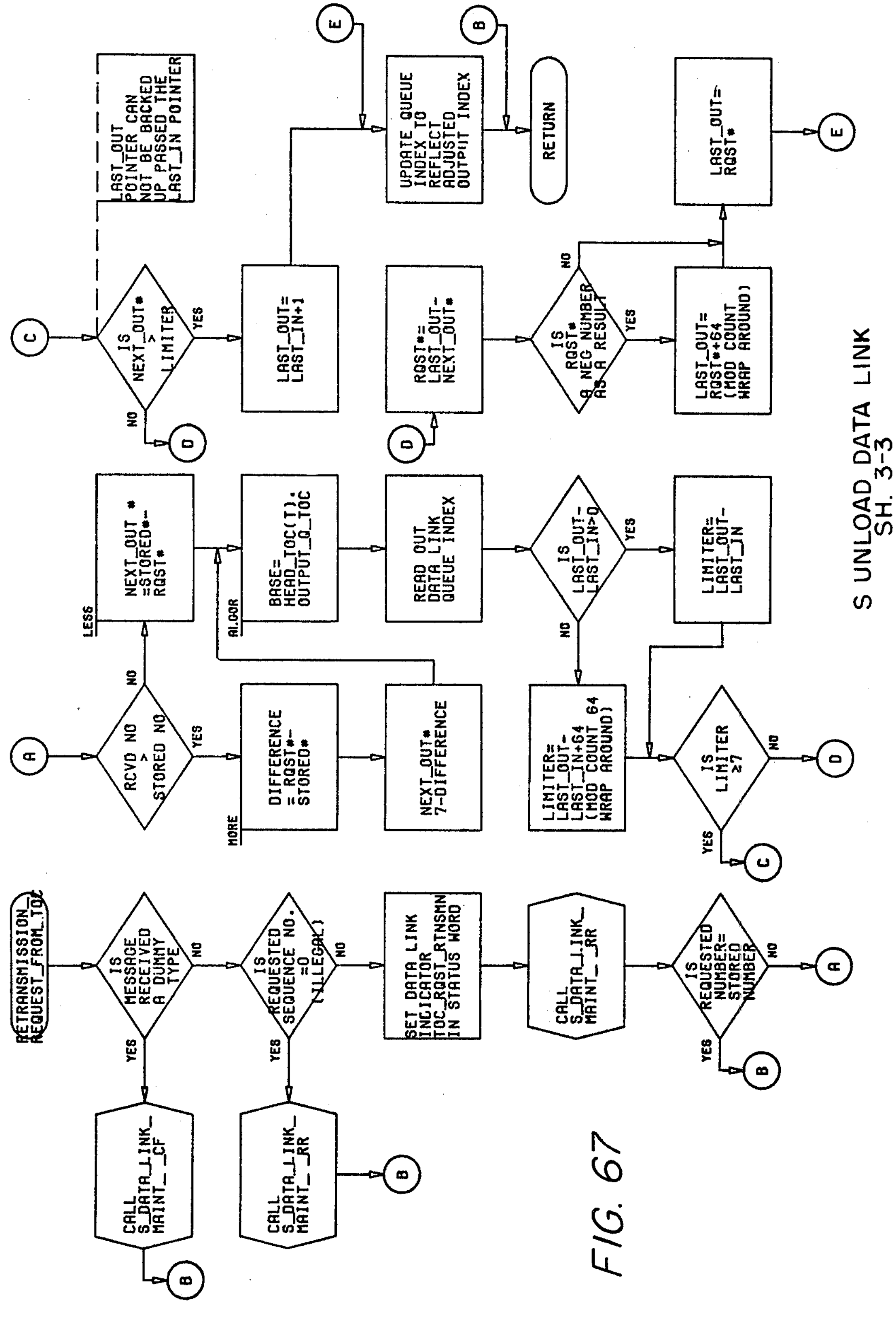
Figure 68:
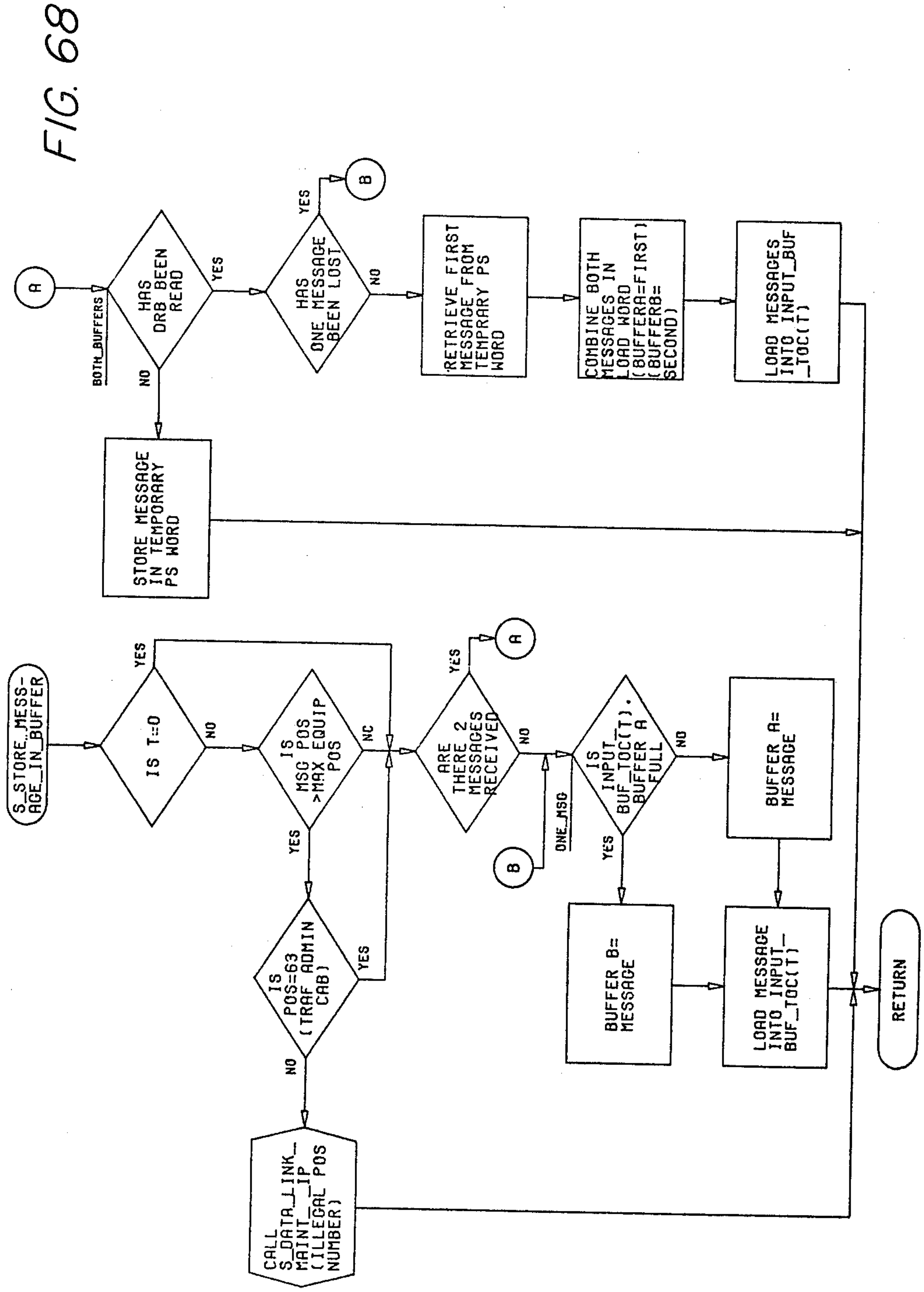

TOM words used for the receive function (FIG. 49) are similarly arranged, except that the "Load Bit" functions for all five T.O.'s are in word 15 (FIG. 46) so that software scanning for incoming messages does not require a matrix search. Two registers (words) are provided because one message may not have been "unloaded" by software before a second message starts to arrive.

The RMF bit in each message indicates whether this is a retransmitted message in response to a previous request.

The SEQ. NO. field is provided for both commands and indications as a check that no messages were missed; this is a security feature in addition to the check sum. Thus, of the 29 message bits, 16 only are useful data.

Normally, the active copy of a TOAF transmit section serving a particular T.O. is accessed each 20 m.s. for loading a message. If no valid command is available, a dummy message is loaded instead, which provides a continuous operational check on the system. Also, the T.O. hardware is arranged to await the receipt of a message before initiating its own transmit sequence.

When a dummy message is received the associated load bit (DLA or DLB) in word 15 is not set; instead the DMB bit for this T.O. notifies software that no additional processing time should be spent on this message.

If a received message fails the Bose-Chaudhuri check, bit BCF in word 15 is set; software then asks for a retransmission.

Flowcharts in FIGS. 50 to 55 illustrate the essential operational features of the system.

There are various possible timing relationships of messages in the two directions, assuming three values of propagation delay over the facility:

CASE A: (With 8 ms. delay)

Suppose CMC transmits at time = 0 ms. ($t$0) a command message with sequence number N which is received completely at TOC at time =20 ms. ($t_{20}$). After a time delay $d$ for internal logic operations, TOC may transmit a reply message to CMC at time $t_{20} + d$ and this in turn may be received at CMC at time $t_{40} + d$.

If the message N received at TOC fails acceptance, N(F) then TOC requests a retransmission of message N (i.e. (R)N). This is received at the TOM at time $t_{40} + d$. By this time transmission is starting of message N + 2. Therefore, CMC responds to (R)N from TOC by sending Retransmitted Command Message N(RT) at time $t_{60}$.

A similar relationship exists if a retransmission is required in the other direction (of an indication message). Thus there are two intervening messages before retransmission of a command message is carried out.

Case B: (Min. Delay)

In this case the number of intervening messages between an original message and its retransmission is one in either direction.

Case C: (Nominal Delay)

Assuming an average delay of 4 ms., the number of intervening messages between an original command message and its retransmission is one, whereas that of intervening messages between an original indication message and its retransmission is two.

2. Specification and Circuit Names

Naming Conventions 2.1 All interface signals, whether inputs or outputs of the data transmission system are at the logic levels of the High Threshold Logic Family. The drive capability is that of the Logic Gate of the family.

The signal names in this part of the specification appear in two forms, full name and short name.

The full name may have a length of up to 15 characters and takes the form:

XXX.LMN . . . Z(N)

The symbols in the full name are interpreted as follows: XXX is the subsystem mnemonic code. The following codes are used: BIB Bus Interface for TOAF LTA Logic Terminal Circuit — A in TOAF;

LTB Logic Terminal Circuit — B (LTA+LTB=LTC)

LTC Local Terminal Circuit of the Data Link (i.e. the terminal near the CMC)

TOM Traffic Office Matrix in the CMC (=LTA in TOAF effectively)

These codes are also used alone in the text as abbreviations for the subsystems. (N) is the number of the Traffic Office (0 through 4) which is dropped when referring to a signal TO internal control only. LMN . . . Z is a signal lead name of variable length (3 letters nominal) consisting of letters alone or mixture of letters and decimal digits. It may possibly contain a period (.) or a dash (-) within itself. A minus sign (−) prefix to a signal indicates its inverse function (i.e. complement).

The bits of a Command or an Indication data are distinguished by including in the signal name the appendage .B0 for bit 0 of the data message, .B1 for bit 1, .B2 etc. for each of the bits of the data message. Similarly S0–S2 for Seq. No. of message. .B0–B4 are also used in the Data Link Time Bases and check generators (internal controls).

Omitting the symbols XXX. from the full name leaves the short name. This is used normally where the text makes clear what the omitted symbols should be (i.e. within a mnemonic group XXX of a subsystem). However, full names for interface signals between separate mnemonic groups.

Mnemonic Circuit Groups within the TOAF include the Bus Interface (BIB), and LTA, LTB which together comprise a Local Terminal Circuit (LTC). Within the circuit documents, LTA covers hardware related to the Matrix (TOM) and LTB cover the balance. Thus one LTB group is provided to T.O.

The BIB circuit contains AC bus receivers (for receiving signals from the CMC to TOAF), AC bus drivers (for returning signals from TOAF to the CMC), a write control circuit (all circuits in HTL) and terminal blocks.

3. Detailed Logic Description

LTC Transmitter

The LT1 transmitter, consists of one word WWO1 of TOM (FIG. 26 containing DTR, TBT, CGT, DLT, LTB), one 38.4 KHZ crystal oscillator clock 2502, one duobinary modulator 2503 and the remaining significant parts such as IPG, STP, MUX and other controls, shown in FIG. 29–32.

a. Multiplexer Time Base (TBT.B0-4)

The timer TBT is a 5-bit, 32-state binary counter which counts up from T01 through T31 (each frame period = 416μs) for each transmission of a message and then rests at zero state T00 until time to transmit another message (as determined by the Program). It comprises the first five flip-flops on FIG. 29 with outputs − ITBT. BO to −ITBT.B4 as a first phase, the first five flip-flops B00–B04 of word W01 of FIG. 26 as a second phase, and a decoder shown in FIG. 32.

When DLT is set by the Program after the command message bits have been loaded into DTR, this in turn sets GDC, and TBT is stepped up from T00 to T01, etc, by the action of 32 gated clock pulses (GP1T) and ungated clock pulses (CP2T). DLT and GDC are reset at the end of T31 with resultant operation of the Time Base resetting itself to idling state T00.

The two-phase clock pulses CP1T and CP2T are obtained from package type 70 (DSTCK) clock card containing a 38.4 KHZ crystal oscillator. Each clock pulse has a pulse width = 26μs approximately and a period = 416 μs. Time lag between the two clock pulse trains is 208 μs.

General control input equations to successive bit stages of the Time Base are:

| Data | Clock (1st phase) | Stage |
|---|---|---|
| −TBT.Bφ | GP1T = CP1T & GDC | Bφ |
| −TBT.B1 | GP1T.B1 = GP1T & TBT.Bφ | B1 |
| −TBT.B2 | GP1T.B2 = GP1T.B1 & TBT.B1 | B2 |
| −TBT.B3 | GP1T.B3 = GP1T.B2 & TBT.B2 | B3 |
| −TBT.B4 | GP1T.B4 = GP1T.B3 & TBT.B3 | B4 |

Note: 2nd phase clock (CP2T)) simply gates in outputs of the first phase (−ITBT.Bφ, etc.) into 2nd phase of the time Base.

Clock Pulses Distributor Equations:

3 System Reset signal inputs for Time Base and Check Generator are:

Data = −RS0 = −IRS and −TBT.T31 where −IRS = −SRS

Clock = −CP1T.RS = −(CP1T and RSO )

Select = RSO = IRS + TBT.T31

IDLT Input = LIDLT = −DLT + TBT.T31

Set GDC = IDLT and CP2T

Set GCGT = GDC and TBT.TO1

Reset GCGT − TBT.BT5 where

TBT.BT5 = TBT.T25 + TBT.T26 + TBT.T27 + TBT.T28 + TBT.T29

GPlT = CP1T and GDC

IP1 = CP1T and −GDC

PCGT = GP1T and (GCGT + TBT.BT5)

b. Start Pattern Generator (STP)

Start Pattern chosen here is 0011 since it would take two bit errors for an idling pattern of alternate ones and zeros to imitate the start pattern. Timing periods TBT.T01 and T02 are used to generate the first two zero bits of the start pattern to appear at LTB (See FIG. 30) after passing through Send Data Multiplexer (MUX). Logic Equation is STP1–2 = −(TBT.T01 + TBT.T02).

c. Send Data Multiplexer (MUX)

This is a control gating arrangement to multiplex command message data from DTR along with STP and Bose-Chaudhuri checking bits for the normal transmission mode, and then idle patterns (1) or (2) for the idling mode-all in accordance with TBT timing sequence. STP, DTR bits. .RMF through .S2 and odd data bits .B01 through .B15 are multiplexed in the normal manner. However, even data bits DTR-B00–.B14 are passed through an "Inversion Generator" which passes true values of the even data bits if they along to normal Command Messages (a) or (c) and inverts these bits if they belong to Dummy or Retransmission Request Messages (See FIG. 48). For example, bits B00–B15 of a Dummy message will be modified to appear at the LTB in the order, thus, 1010101010101010.

This special "Inversion Generator" feature is provided to break up a chain of consecutive Zeros (or Ones) in order to avoid loss of receiver synchronism. These inverted even data bits will be re-inverted to true values at the receiver.

Following the last bit .B15 of the data message are the five checking bits CGT.B4–B0 in this sequence. These bits are transmitted from LTB as inverted bits $\overline{R(X)}$. Inversion of the checking bits is carried out before transmission (to be re-inverted to true values at the receiving end) in order to give added error detection capability for "slipped sync" (i.e. a displacement between word framing at receiver and transmitter).

After transmission of the last checking bit the MUX again transmits the idling pattern of alternate Ones and Zeros in synchronism with IPG.

MUX Logic Equations:

1. Data Bits in general (i.e. RMF, sequence No. and odd bits B01–15 of Command data) are:

DB$n$ = –(Σ –D$n$ & T$n$)

where D$n$ = Output Buffer (DTR) data at time T$n$ of Time Base (TBT.T$n$)

Σ = Summation (i.e. OR Function of terms;

RMF.S0–2 = –[–DTR.RMF & TBT.T05 + — + –DTR.S2 and TBT.T08]

ODB01 - 15 = –[DTR.B01 & TBT.T10 + . . . . + –DTR.B15 TBT.T24; $n$ = even = 10, 12, . . . , 24.

2. Even Bits B00 - 14 of Command Data at "Inversion Generator" input are:

DEV = Σ –D$no$ and T$no$ where Tno = TBT.T0=19 . . . , TBT.T23 and

DEV = Inversion data at Odd Timing. = –DTR.B00 and TBT.T09 or . . . or –DTR.B14 and TBT.T23

"Inversion Generator" output bits are:

DBno = (DEV and T.DRROD) or (–DEV and –T.DRROD) [≅Data if T.DRR = 0 i.e. normal message ≅ Inverse Data if T.DRR = 1 i.e. Dummy or Retransmission Request message]

Set T.DRR = –DTR.S0 and –DTR.S1 and –DTR.S2 and TBT.T05

Reset T.DRR = TBT.T01 or IRS1

Dummy or Retransmission Request Odd Timing = T.DRROD = T.DRR and TBT.BT40D

TBT.BT40D = TBT.T09 or TBT.T11 or . . . or TBT.T23

3. Bose-Chaudhuri Checking Bits as transmitted from Transmit Bus are:

$\overline{R(X)}$ = –(Σ Cn and T$nc$)

where C$n$ = CGT.B4 at time T$nc$

T$nc$ = TBT.BT5 ≅ TBT.T25 + TBT.T26 + — + TBT.T29 d. Bose-Chaudhuri Check Generator (CGT B0–4)

The Bose-Chaudhuri check generator in use here is a cyclic shift-register for code generation using the generator Polynominal P(X) = X+ $^{X2}$ + 1 ≅ 100101. This is a polynominal for a (31, 26) code i.e., a code in which the full maximum word length is 31 bits of which 26 bits are data, the rest being checking bits. However, for our application the same P(X) is used for (29,24) code instead, which does not significantly reduce the efficiency of the code. The error detection capability of the code chosen is summarized below:

| Error Burst Length | % of Detection |
|---|---|
| Less than or equal to 5 bits | 100 |
| Equal to 6 bits | 94 |
| More than 6 bits | 97 |

The checking bits encoded here will enable a similar check generator at the receiver to decode and determine if the message block has been received correctly as it was transmitted. The check generator comprises the second group of five flip-flops on FIG. 29 with outputs –ICGT.B0 to –ICGT.B4, the input logic in FIG. 29, and five flip-flops B05-B0 (of word W01 in FIG. 26. Control input equations to successive bit stages of the check generator cyclic shift register are:

| | Data Input | 1st Phase Clock | Stage |
|---|---|---|---|
| LICGT.Bϕ = | GCGT & [(LTB & –CGT.B4) + (–LTB & CGT.B4)] | PCGT | Bϕ |
| CGT.Bϕ | | do. | B1 |
| LICGT.B2 = | (LICGT.Bϕ & CGT.B1) + (–LICGT.Bϕ & CGT.B1) | do. | B2 |
| CGT.B2 | | do. | B3 |
| CGT.B3 | | do. | B4 |

Clock Pulse PCGT = (GP1T & GCGT) or (GP1T & TBT.BT5)
Systems Reset signal inputs are the same as those of Time Base Transmitter; 2nd phase clock CP2T gates in 1st phase outputs –ICGT.BN into 2nd phase of the check generator (N=ϕ–4).

e. Idle Pattern Generator (IPG)

Figure 31:
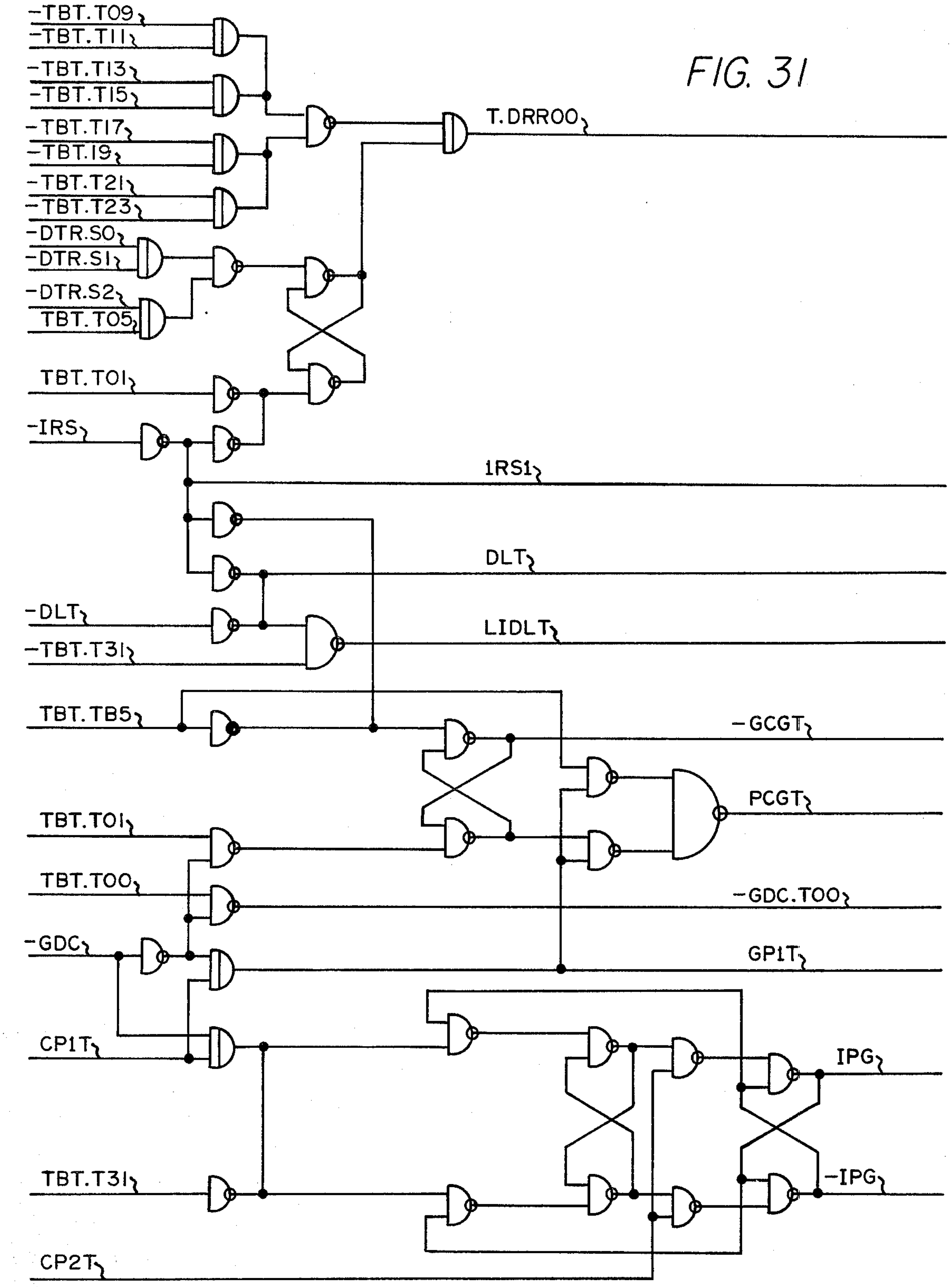

This is a one-bit counter at the bottom of FIG. 31 controlled by the gated clock pulses (IP1) which are generated while the transmitter is in idling mode. Its outputs IPG and –IPG are gated into MUX (FIG. 30) to synchronize with proper TBT timing sequence. If Idle Pattern stopped at a value ONE prior to the start of the transmission, the pattern would recommence at the valve ONE immediately after the last bit of the B.-C check pattern and alternate from there. Conversely, if idle pattern had stopped at ZERO prior to start pattern then it would recommence at ZERO following checking bits.

Input stage data = (IP1 and IPG) + (IP1 and –IPG) = Reset IPG + Set IPG

IP1 = –GDC and CP1T

IPG Synchronization or multiplexing at the Local Terminal Bus = [IPG (–DLT and –GDC + GDC.T00 + –GDC.DLT + TBT.T30=/) + –IPG and TBT.T31].

Duobinary Coding Technique

Detailed treatment of Duobinary Coding in modulator 2501 is beyond the scope of this specification. However, a brief outline is presented. The encoding is done digitally with two clock phases (A and B) and two complementing flip-flops. Assume that the data line is held at 0, and that the differential flip-flop is maintaining a 0 output. The line signal flip-flop will now complement on each B clock only; the resulting square wave after filtering becomes a 1200 HZ signal.

Now assume the data line changes to 1. As before, the line signal flip-flop complements on each B: clock, but in addition, also complements on alternate A: clocks; this is effectively an 1800 HZ signal.

Finally, let the data line return to 0, but at a time when the differential flip-flop is delivering a 1; each A and each B clock now inverts the state of the line signal flip-flop, delivering a 2400 HZ output.

Thus, logic 1 on the data line is represented by 1800 HZ on the facility, and logic 0 is represented by either 1200 HZ or 2400 HZ, depending upon whether there were an even or odd number of logic 1 bits intervening since the last 0 bit. This alternating scheme gives the name to Duobinary coding. The data are recovered at the receiver by first suitably filtering and conditioning the received signal, followed by circuitry that develops an analog output voltage based on received frequency. This is then interrogated at discrete points in time (developed by the "receive clock") and logic 1, 0 decisions are made. The recovered data are delivered in serial digital form, substantially as they appeared at the transmitter bus.

Modulator Carrier Failure Bit (-MCF)

Figure 27:
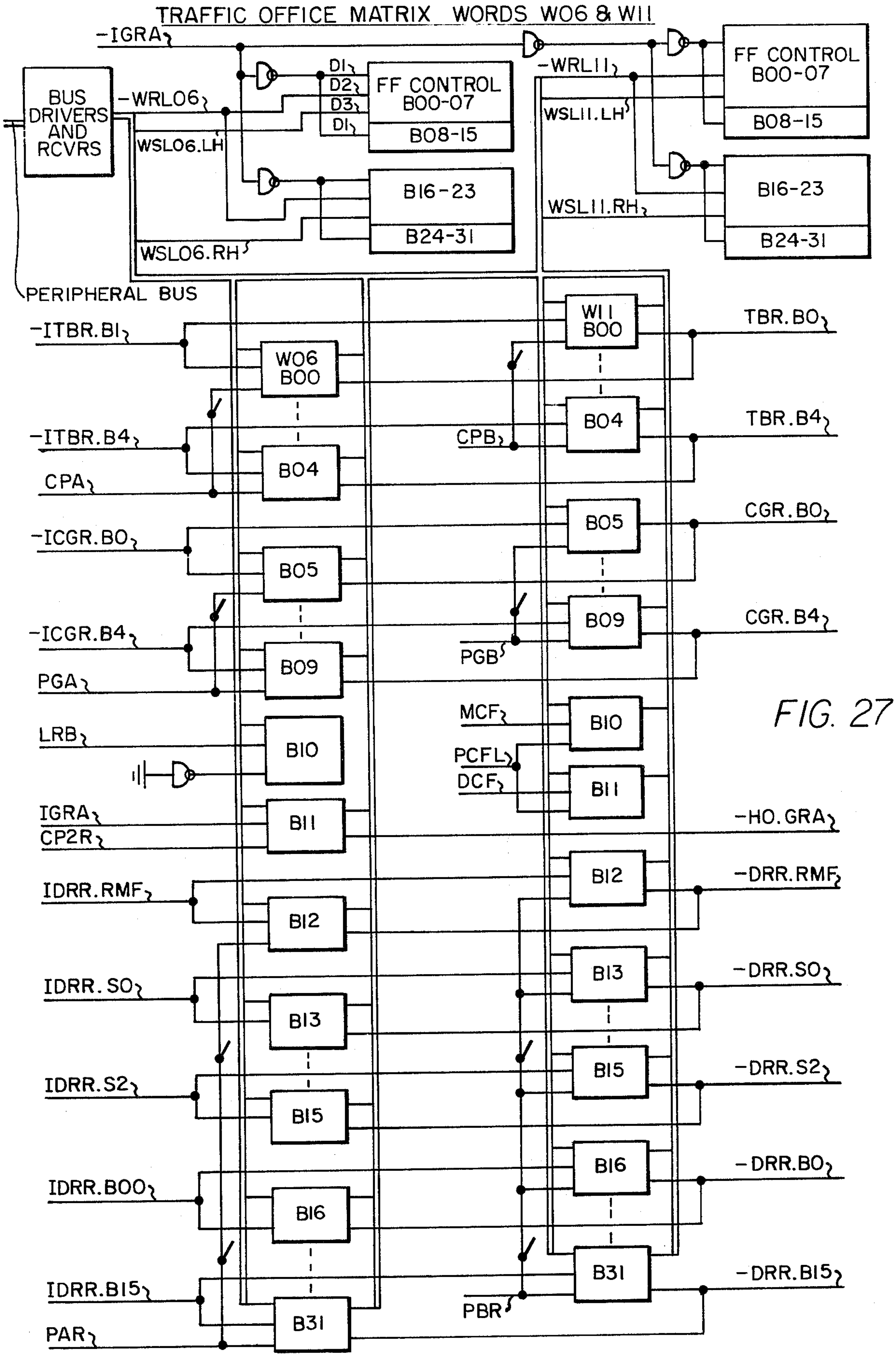
Figure 28:
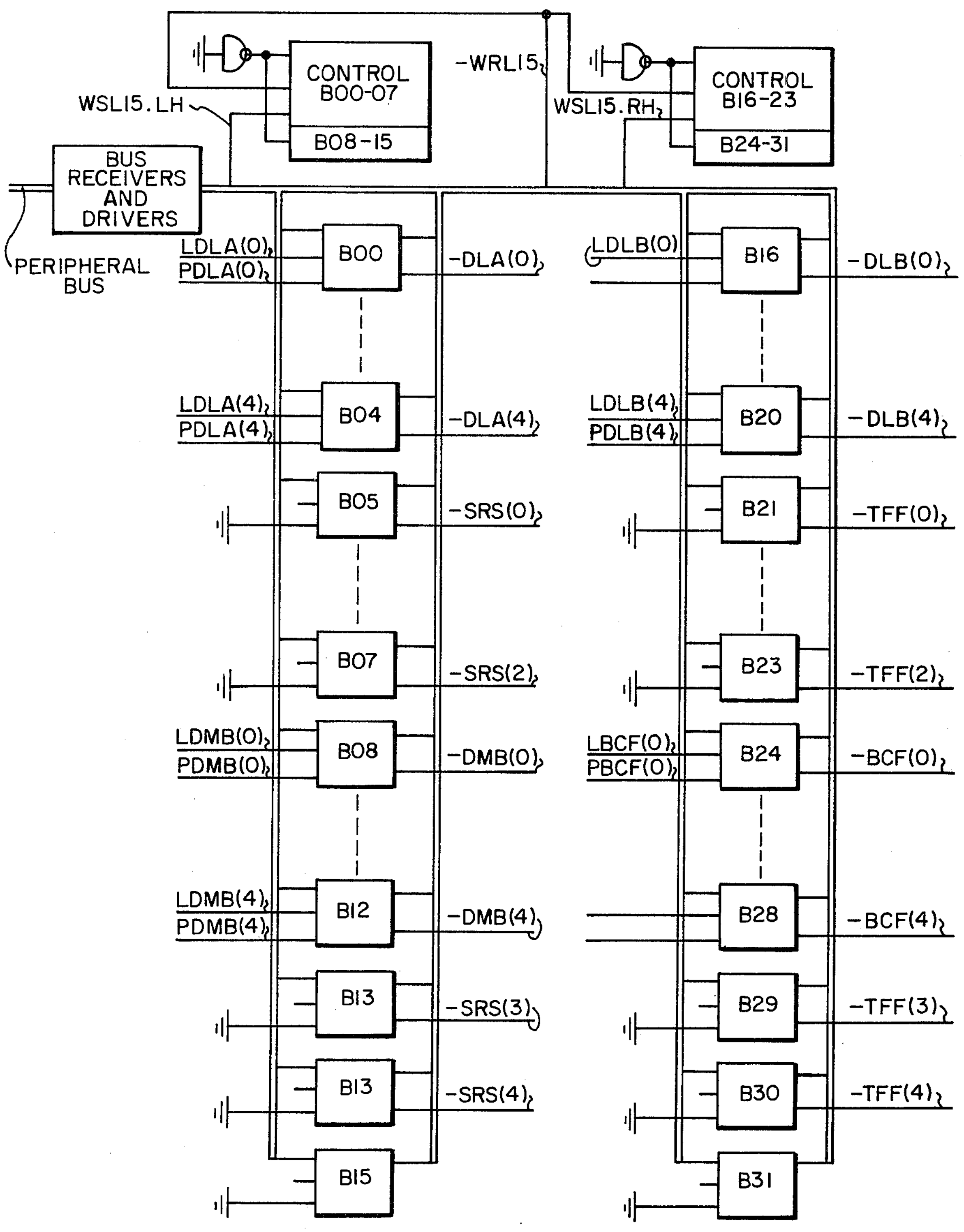
Figure 29:
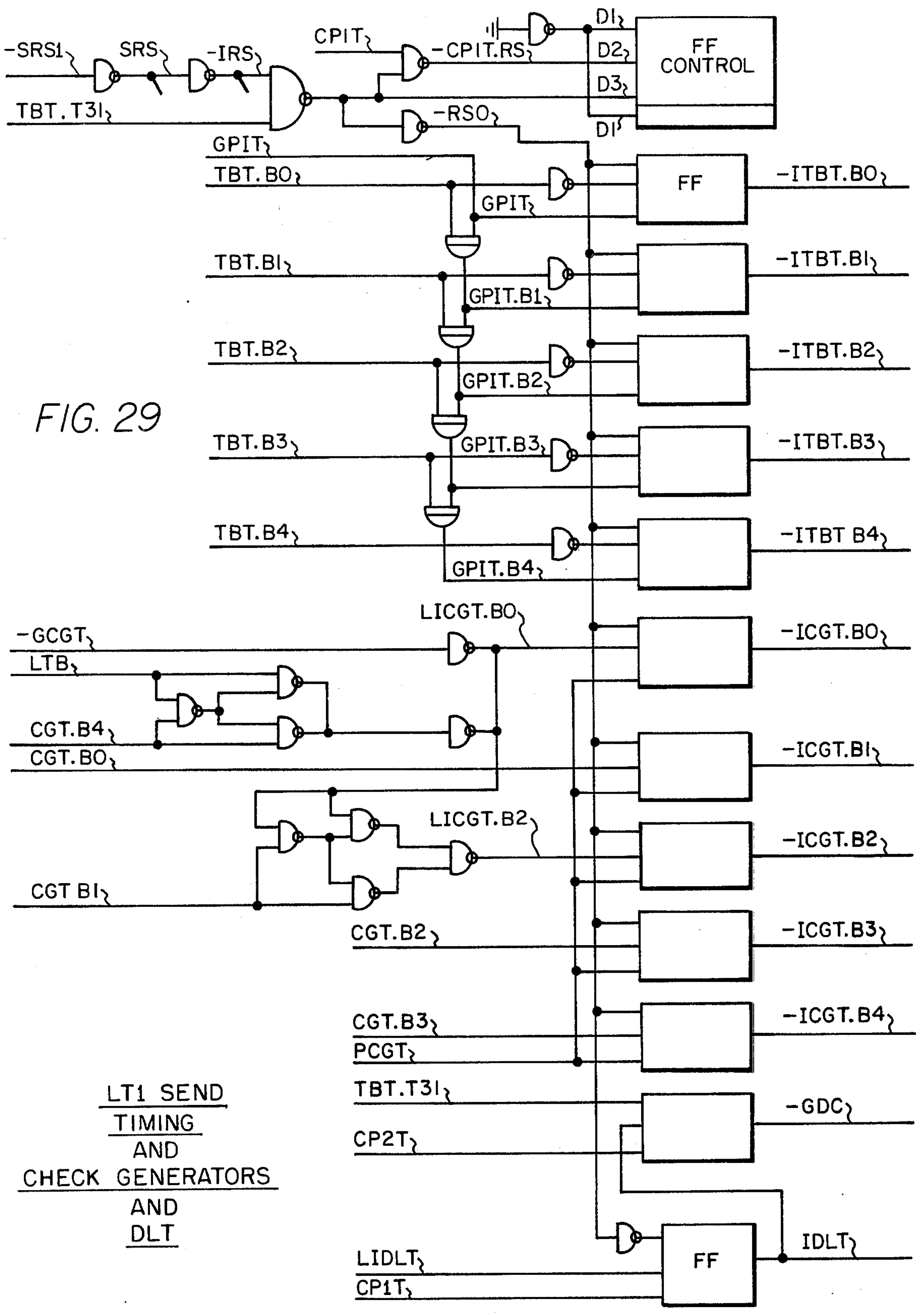
Figure 30:
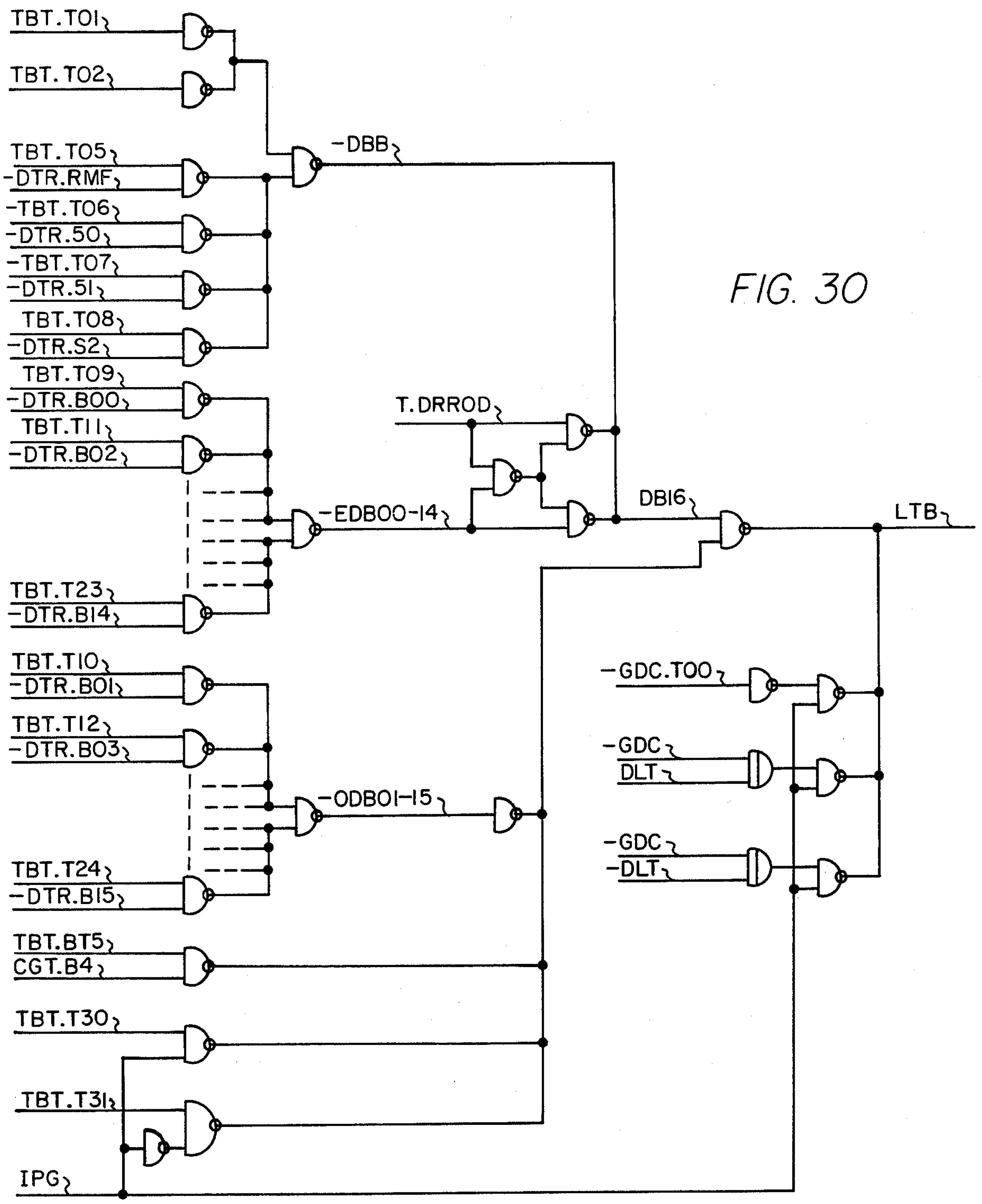

In the absence of a carrier in the modulator a signal MCF becomes true (+12V) which causes flip-flop (−MCF) B10 in FIG. 27 in the TOM word W11 to be "set" thus, indicating failure of the modulator carrier.

Data Link Receiver 3.2 The main functional parts of the LTC Receiver as shown on FIG. 25 and in FIGS. 27 and 33–36 are:

Duobinary Demodulator
Start Pattern Pulses (SPD)
Gated Clock Pulses Control
Demultiplexer Dual Time Bases TBA and TBB
Receive Data Demultiplexer (DEMUX)
Indication Message Dual Input Buffers DRA and DRB.
Dual Bose-Chaudhuri check generators CGA and CGB.
Software-Hardware Interface Control Bits — BCF, DLA, DLB, DMB, SRS and TFF.

a. Duobinary Demodulator SPD BOO, SPD,

The demodulator receives incoming data from Traffic Office Control (RT Transmitter) and delivers the data at Local Receive Bus (LRB). The demodulator supplies clock pulses CPIR and CP2R to the LT receiver.

Demodulator Carrier Failure Bit (−DCF)

In the absence of a carrier in the demodulator a signal DCF becomes true (+12V) which causes flip-flop (−DCF) B11 in FIG. 27 in the TOM word W11 to be "set" thus, indicating failure of the demodulator carrier.

b. Start Pattern Detector (SPD)

Figure 35:
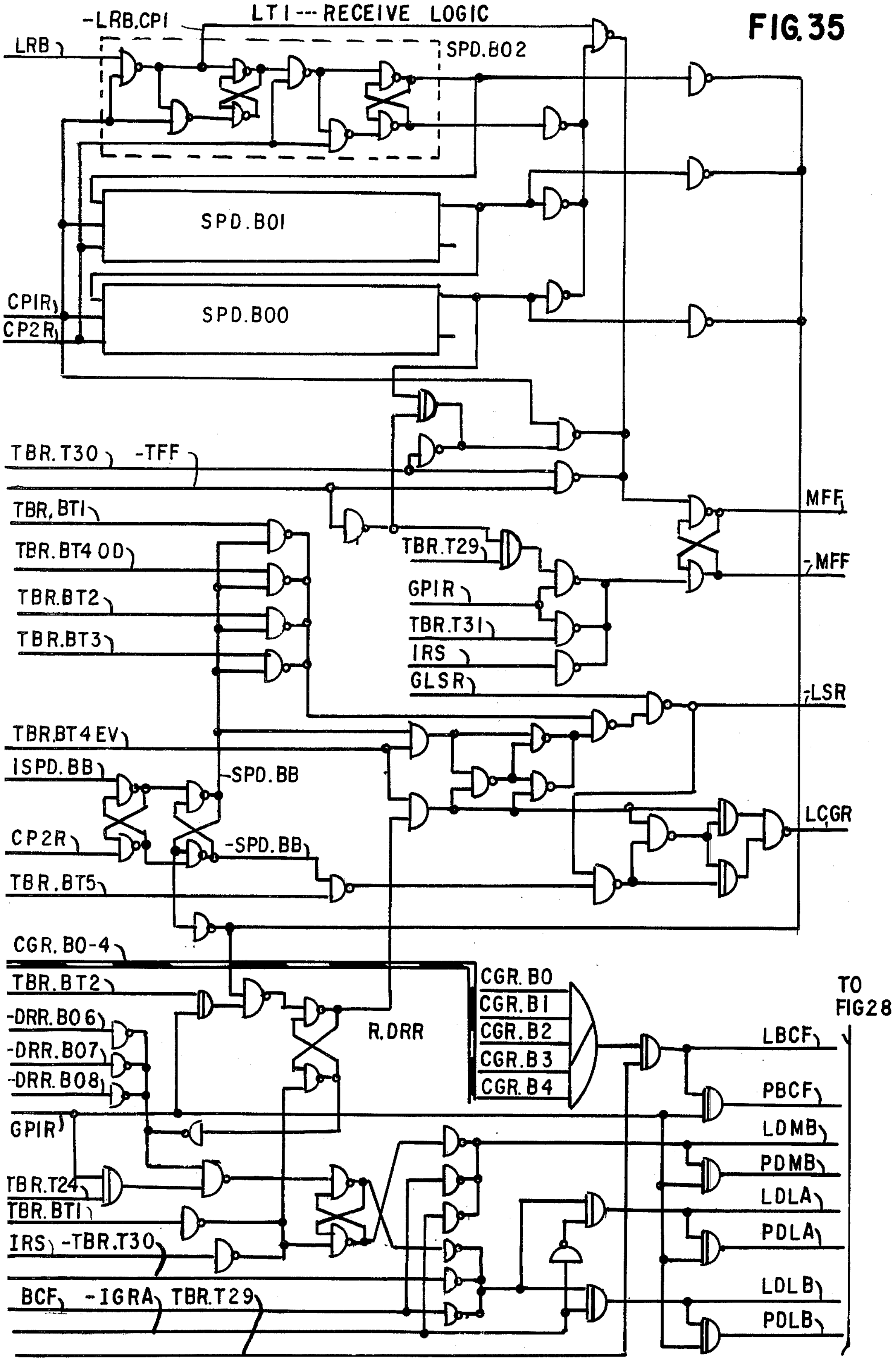

This is a 4-bit serial −parallel shift register at the top of FIG. 35 which receives incoming data from the Demodulator at LRB. Each of the blocks SOD . B00, SPD.B01 and SPD.B00 comprises two latches gated in sequence on the two clock phases CPIR and CP2R as shown in detail for SPD. B02 to store one bit. The fourth bit −LRB.CPIR is the bit on the bus LRB gated by CPIR. A detector gating arrangement takes "snapshot" checks at 416 μs intervals (during clock pulse CP1R) of LRB and 3-bit-SPD combination to check if a start pattern of 0011 has been received. When the start pattern is detected, Message latch (MFF) is set to change the Receiver from "Idle Reception Mode" to "Message Reception Mode". Any data bits received at SPD prior to the start pattern were discarded. (See Table A.)

Gate Data Clock latches GDC1 and GDC2 (FIG. 36) copy the status of MFF after fixed delay periods of 208 μs and 416 μs respectively. They are used to produce basic gated clock pulses GP1R and GP2R from which various other controlling clock pulses are derived.

The receiver may also be made to operate in "Test Mode" under Program control. At an appropriate time the Program sets Test Flip-Flop (TFF) B22 of word W15 in FIG. 28 which in turn sets MFF, thus forcing the Receiver to accept the incoming data of Idle Pattern starting with the first bit in logic ONE state. Thus, 101010 . . . etc.

Set MFF = (−SPD.B00 and −SPD.B01 and SPD.B02 and LRB & CP1R) + (TFF and SPD.B00 and CP1R and −TBR.T30) + (−TFF and TBR.T30).

Reset MFF = (TBR.T31 and GP1R) + (IRS1) + (TFF and TBR.T29 & GP1R).

GP1R = GDC1 and CP1R.

GP2R = GDC2 and CP2R.

c. Gated Clock Pulses Control

This function is basically controlled by Input Gate Reg. A. Flip-flop (IGRA) FF12 in FIG. 33 which is set at the beginning of receipt of a message if DLA bit is reset, and vice-versa, if there was no Bose-Chaudhuri check failure of the preceding message received. Its buffered output gates in second phase clock pulses CPA, PGA AND PAR for Time Base A (TBA), Check Generator A (CGA) and Input Buffer A (DRA) respectively which comprises word W06 in FIG. 27; and as Hardware Read-Out level control for outputs of TBA and CGA as well as the first 4 bits (RMF, S0–S2) of DRA, and for DRA bits B00–B15. Similarly, the inverse buffering of IGRA gates in second phase clock pulses CPB, PGB and PBR for Time Base B (TBB), Check Generator B (CGB) and Input Buffer B (DRB) respectively which comprises word W11; and as Hardware Read-Out level control for TBB, CGB and 1st 4 bits of DRB, and for DRB bits B00–B15.

It should be noted that all of the above registers have individual software input/output controls. Other miscellaneous controls under this function are:

1. Gate Load Shift Register (GLSR)

This signal controls gating-in of the demultiplexed data (−LSR) at the input of the Dual Input Buffers DRA and DRB.

Set GSR = [Set GCGR] = TBR.BT1 and −EICD.
EICD = DLA and DLB (−TBR.T30 + −TBR.T31).
Reset GSR = TBR.T24 + IRS2.
Reset GCGR = (TBR.T39 and GP1R) + IRS2.
GLSR = GSR and − ICD.
PSR = GSR and GPIR and − TBR.T24.
PCGR = GPIR [GCGR and − TBR.T29) + TBR. T31].

Figure 36:
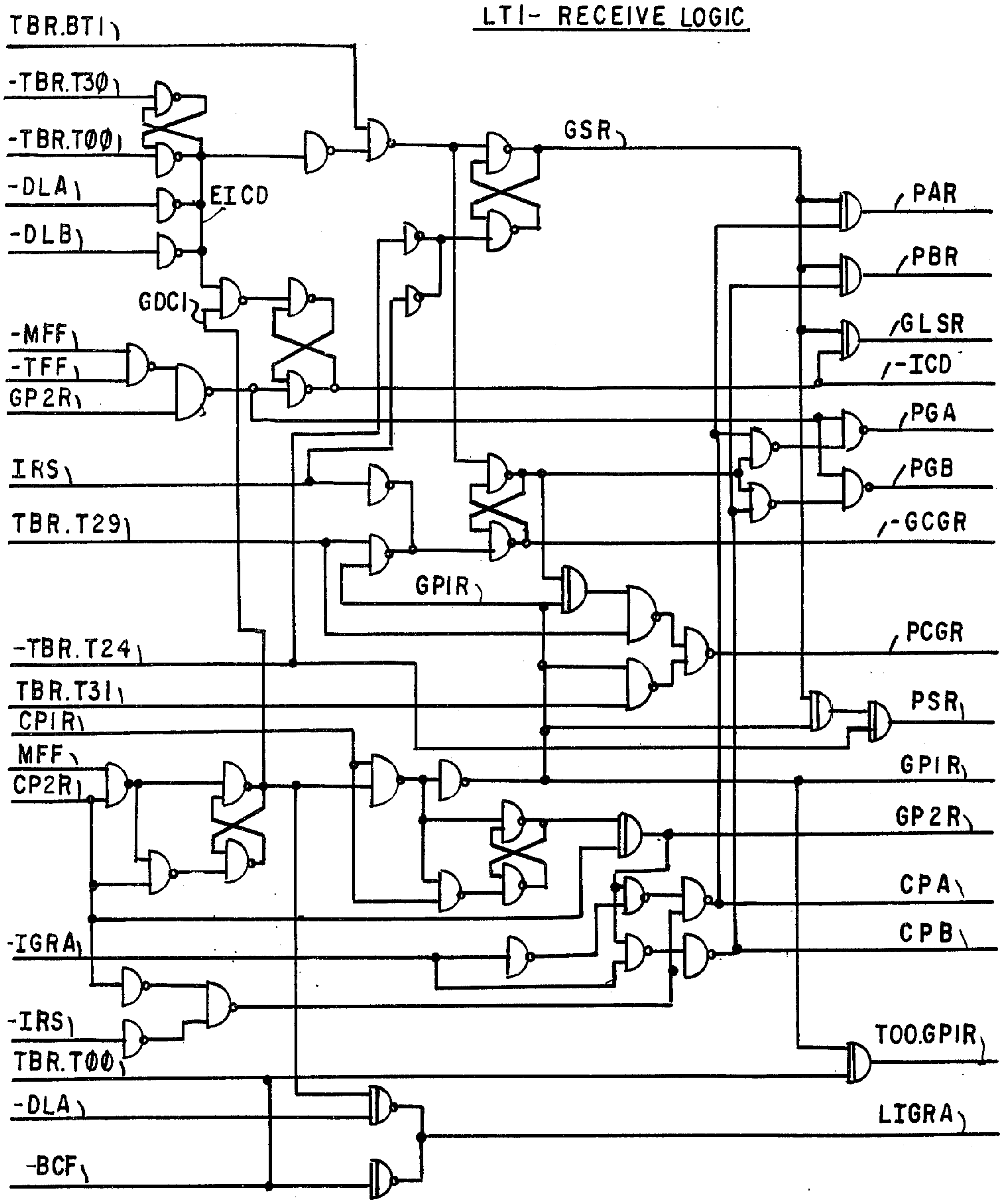

2. Inhibit Common Decoder (−ICD) (FIG. 36)

This is used to allow common decoding of either TBA or TBB under normal operating conditions so that Tiem Base Receiver hardware timing periods TBR.BT1, etc. are available for normal receiving mode. If, under abnormal conditions, both Input Buffers DRA and DRB are full when a third message arrives at the Receiver, MFF and IGRA will cause the Time Base TBB to be stepped up to "time out" faked reception mode. However, Common Decoder outputs are inhibited and as a result there is no demultiplexing operation. The received data message block is discarded (not gated into either DRA or DRB) and also no B-C check of the message is made.

Set ICD = EICD and GDC1.

Reset ICD = (–MFF and GP2R and –TFF) + (IRS2 and CP2R).

d. Demultiplexer Dual Time Bases (TBA and TBB)

Each time base bit stage is controlled by two-phase clock pulses (GP1R for the first phase; and CPA or CPB for the second phase). General control input equations to successive Bit-Stages of the Time Bases are tabulated below:

(1) First Phase (Common Input)

| Data Input | Clock | Bit |
|---|---|---|
| –TBR.Bφ | GP1R=CP1R & GDC1 | –ITBR.Bφ |
| –TBR.B1 | GP1R.B1=FP1R & TBR.Bφ | –ITBR.B1 |
| –TBR.B2 | GP1R.B2=GP1R.B1 & TBR.B1 | –ITBR.B2 |
| –TBR.B3 | GP1R.B3=GP1R.B2 & TBR.B2 | –ITBR.B3 |
| –TBR.B4 | GP1R.B4=GP1R.B3 & TBR.B3 | –ITBR.B4 |

[Systems Reset control common inputs to the First-Phase are: – (at software input points).
Data Inputs = –IRS.TBR = –SRS.
Clock Input = –CP1R.RS = –(CP1R & IRS).
Select Input = IRS.
Hardware Read-Out control signal for First Phase = Logic ONE)]

(2) Second Phase

| Data Input | Clock | Software Bit Stage Outputs | Hardware Common Bit-Stage Output |
|---|---|---|---|
| –ITBR.BN | CPA | TBA.BN | TBR.BN |
| do. | CPB | TBB.BN | do. |

TABLE A

SEQUENCE OF DATA LINK BLOCK BITS
AS RECEIVED IN LTC OR RTC RECEIVER

| TIME BASE | ZRB | S P D. BØ2 | BØ1 | BØØ | BB | DATA REGISTER (DRR OR CDR) B15 | B14 | B13 | B12 | B11 | B1Ø | BØ9 | BØ8 | BØ7 | BØ6 | BØ5 | BØ4 | BØ3 | BØ2 | BØ1 | BØØ |
|---|---|---|---|---|---|---|---|---|---|---|---|---|---|---|---|---|---|---|---|---|---|
| TØØ | 1 | 1 | Ø | Ø | X | X | X | X | X | X | X | X | X | X | X | X | X | X | X | X | X |
| | F | 1 | 1 | Ø | Ø | X | X | X | X | X | X | X | X | X | X | X | X | X | X | X | X |
| Ø1 | SØ | F | 1 | 1 | Ø | X | X | X | X | X | X | X | X | X | X | X | X | X | X | X | X |
| Ø2 | S1 | SØ | F | 1 | 1 | Ø | X | X | X | X | X | X | X | X | X | X | X | X | X | X | X |
| Ø3 | S2 | S1 | SØ | F | 1 | 1 | Ø | X | X | X | X | X | X | X | X | X | X | X | X | X | X |
| Ø4 | BØ | S2 | S1 | SØ | F | 1 | 1 | Ø | X | X | X | X | X | X | X | X | X | X | X | X | X |
| Ø5 | B1 | BØ | S2 | S1 | SØ | F | 1 | 1 | Ø | X | X | X | X | X | X | X | X | X | X | X | X |
| Ø6 | B2 | B1 | BØ | S2 | S1 | SØ | F | 1 | 1 | Ø | X | X | X | X | X | X | X | X | X | X | X |
| Ø7 | B3 | B2 | B1 | BØ | S2 | S1 | SØ | F | 1 | 1 | Ø | X | X | X | X | X | X | X | X | X | X |
| Ø8 | B4 | B3 | B2 | B1 | BØ | S2 | S1 | SØ | F | 1 | 1 | Ø | X | X | X | X | X | X | X | X | X |
| Ø9 | B5 | B4 | B3 | B2 | B1 | BØ | S2 | S1 | SØ | F | 1 | 1 | Ø | X | X | X | X | X | X | X | X |
| 1Ø | B6 | B5 | B4 | B3 | B2 | B1 | BØ | S2 | S1 | SØ | F | 1 | 1 | Ø | X | X | X | X | X | X | X |
| 11 | B7 | B6 | B5 | B4 | B3 | B2 | B1 | BØ | S2 | S1 | SØ | F | 1 | 1 | Ø | X | X | X | X | X | X |
| 12 | B8 | B7 | B6 | B5 | B4 | B3 | B2 | B1 | BØ | S2 | S1 | SØ | F | 1 | 1 | Ø | X | X | X | X | X |
| 13 | B9 | B8 | B7 | B6 | B5 | B4 | B3 | B2 | B1 | BØ | S2 | S1 | SØ | F | 1 | 1 | Ø | X | X | X | X |
| 14 | B1Ø | B9 | B8 | B7 | B6 | B5 | B4 | B3 | B2 | B1 | BØ | S2 | S1 | SØ | F | 1 | 1 | Ø | X | X | X |
| 15 | B11 | B1Ø | B9 | B8 | B7 | B6 | B5 | B4 | B3 | B2 | B1 | BØ | S2 | S1 | SØ | F | 1 | 1 | Ø | X | X |
| 16 | B12 | B11 | B1Ø | B9 | B8 | B7 | B6 | B5 | B4 | B3 | B2 | B1 | BØ | S2 | S1 | SØ | F | 1 | 1 | Ø | X |
| 17 | B13 | B12 | B11 | B1Ø | B9 | B8 | B7 | B6 | B5 | B4 | B3 | B2 | B1 | BØ | S2 | S1 | SØ | F | 1 | 1 | Ø |
| 18 | B14 | B13 | B12 | B11 | B1Ø | B9 | B8 | B7 | B6 | B5 | B4 | B3 | B2 | B1 | BØ | S2 | S1 | SØ | F | 1 | 1 |
| 19 | B15 | B14 | B13 | B12 | B11 | B1Ø | B9 | B8 | B7 | B6 | B5 | B4 | B3 | B2 | B1 | BØ | S2 | S1 | SØ | F | 1 |
| 20 | C4 | B15 | B14 | B13 | B12 | B11 | B1Ø | B9 | B8 | B7 | B6 | B5 | B4 | B3 | B2 | B1 | BØ | S2 | S1 | SØ | F |
| 21 | C3 | C4 | B15 | B14 | B13 | B12 | B11 | B1Ø | B9 | B8 | B7 | B6 | B5 | B4 | B3 | B2 | B1 | BØ | S2 | S1 | SØ |
| 22 | C2 | C3 | C4 | B15 | B14 | B13 | B12 | B11 | B1Ø | B9 | B8 | B7 | B6 | B5 | B4 | B3 | B2 | B1 | BØ | S2 | S1 |
| 23 | C1 | C2 | C3 | C4 | B15 | B14 | B13 | B12 | B11 | B1Ø | B9 | B8 | B7 | B6 | B5 | B4 | B3 | B2 | B1 | BØ | S2 |

TABLE A – Continued

SEQUENCE OF DATA LINK BLOCK BITS
AS RECEIVED IN LTC OR RTC RECEIVER

| TIME BASE | ZRB | S P D. | | | | DATA REGISTER (DRR OR CDR) | | | | | | | | | | | | | | | |
|---|---|---|---|---|---|---|---|---|---|---|---|---|---|---|---|---|---|---|---|---|---|
| | | B Ø2 | B Ø1 | B ØØ | B B | B 15 | B 14 | B 13 | B 12 | B 11 | B 1Ø | B Ø9 | B Ø8 | B Ø7 | B Ø6 | B Ø5 | B Ø4 | B Ø3 | B Ø2 | B Ø1 | B ØØ |
| 24 | C Ø | C 1 | C 2 | C 3 | C 4 | B 15 | B 14 | B 13 | B 12 | B 11 | B 1Ø | B 9 | B 8 | B 7 | B 6 | B 5 | B 4 | B 3 | B 2 | B 1 | B Ø |
| 25 | X | C Ø | C 1 | C 2 | C 3 | B 15 | B 14 | B 13 | B 12 | B 11 | B 1Ø | B 9 | B 8 | B 7 | B 6 | B 5 | B 4 | B 3 | B 2 | B 1 | B Ø |
| 26 | X | X | C Ø | C 1 | C 2 | " | " | " | " | " | " | " | " | " | " | " | " | " | " | " | " |
| 27 | X | X | X | C Ø | C 1 | " | " | " | " | " | " | " | " | " | " | " | " | " | " | " | " |
| 28 | X | X | X | X | C Ø | " | " | " | " | " | " | " | " | " | " | " | " | " | " | " | " |
| 29 | X | X | X | X | X | " | " | " | " | " | " | " | " | " | " | " | " | " | " | " | " |
| 3Ø | X | X | X | X | X | " | " | " | " | " | " | " | " | " | " | " | " | " | " | " | " |
| 31 | X | X | X | X | X | " | " | " | " | " | " | " | " | " | " | " | " | " | " | " | " |

NOTES: F=RMF, SØ-2=SEQ.NO., &BØ-15=DATA BITS; BB-BØ2=SPD BITS; ZRB=LRB OR RRB=LOCAL OR REMOTE RECEIVE BUS; BØØ-15= REG. BITS; SPD= START PATTERN DETECTOR; CØ-4=B.-C. CHECKING BITS; DRR=DATA RECEIVED REGISTER (DRA OR DRB) IN LTC; X=1 OR Ø; CDR=COMMAND DATA REGISTER (CDA OR CDB) IN RTC. DRR INCLUDES 4 EXTRA BITS S2, S1, SØ & RMF WHICH ARE NOT SHOWN HERE.

Where N=0, 1, . . 4 = Bit number of each stage.
TBA Read-Out control input = –IGRA TBB Read-Out control input = IGRA Time Bases TBA & TBB Common Decoder Common Bit Stage outputs TBR.BN are used as decoder inputs to HTL package type of FIG. 24 in conjunction with other gating arrangement. Block Time equations are:

TBR.BTL = TBR.T01 or TBR.T02 or TBR.T03
TBR.BT@= TBR.T04
TBR.BT3 = TBR.T05 + TBR.T07
TBR.BT4)D = TBR.T09 + TBR.T11 + . . . + TBR.T21 + TRB.T23
TBR.BT4EV = TBR.T08 + TBR.T10 + . . . + TBR.T20 + TBR.T22
TBR.BT5 = TBR.T24 + TBR.T25 + TBR.T26 + TBR.T27 + TBR.T28.

e. Receive Data Demultiplexer (DEMUX)

Figure 33:
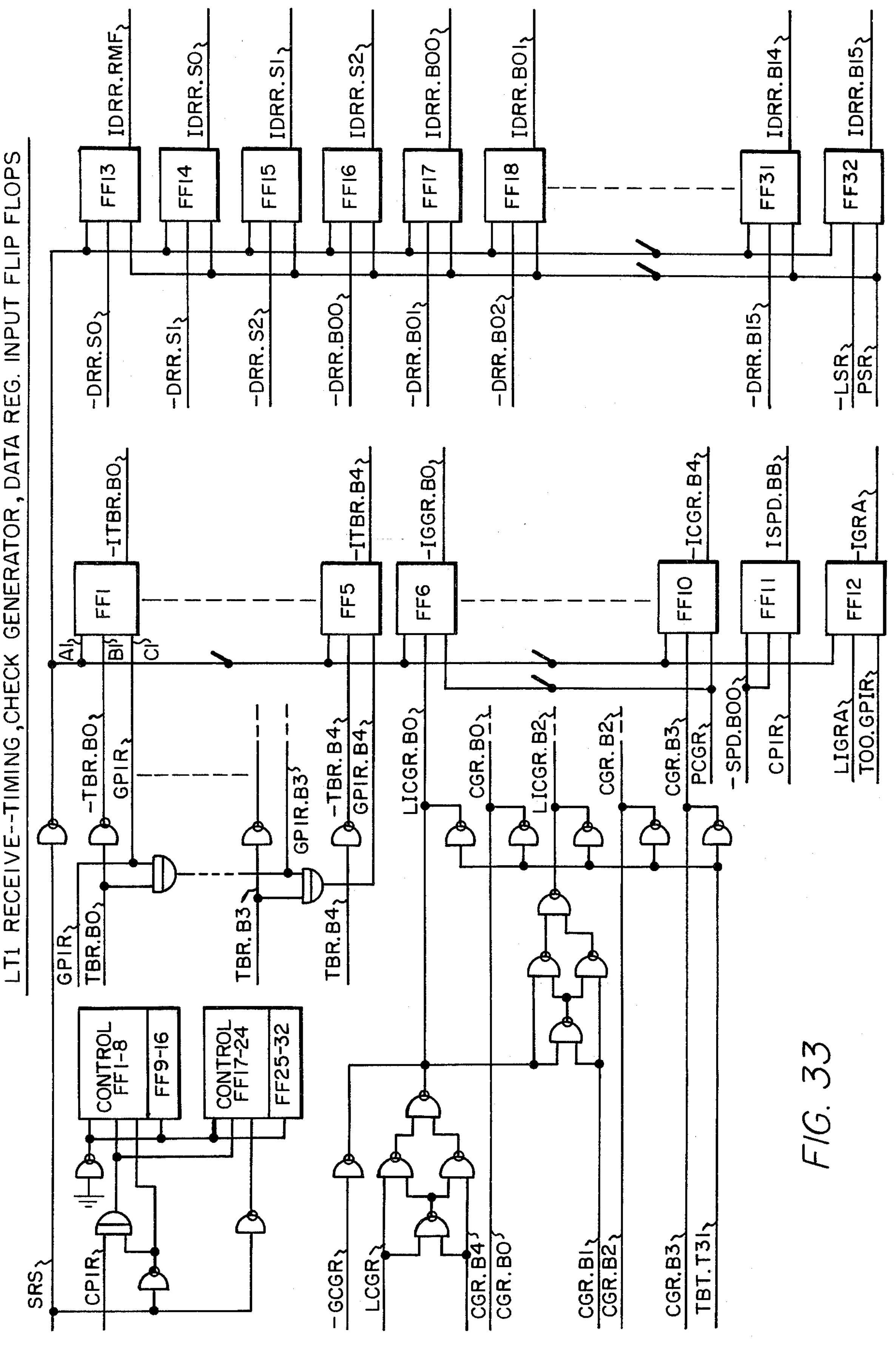

This is a control gating arrangement to accept (and reconvert where necessary) the received serial message data from the output of the Start Pattern Detector latch SPD.BB in FIG. 35 via flip-flop FF11 in FIG. 33 when a start pattern of 0011 has been detected. (This may be read in conjunction with Table A). Block time TBR.BT1 gates the first-four bits (= 0011) into the DEMUX. Then TBR.BT2 gates in RMF bit (F) and TBR.BT3 gates in sequence number bits (S0-2) in that order.

The sixteen message data bits B00–B15 are treated in two different ways as follows:

It should be recalled here that when the messzge was transmitted, the transmitting end inverted even data bit B00, B02, . . . B14 prior to transmission, and odd data bits B01, B03, . . . B15 were transmitted as true values. Therefore, at the DEMUX, the odd timing periods TBR.BT40D gate in the odd data bits B01–B15 in the normal manner. However, the even timing periods TBR.BT4EV gate in the even data bits B00–B14 in conjunction with a "Re-Inversion Generator" (controlled by R.DRREV) which passes true values of the even data bits if they belong to normal messages and inverts these bits if they belong to Dummy or Retransmission Request Messages in order to recover true values at the DEMUX. For instance, bits B00–B16 of a Dummy Message will re-appear as 0000000000000000. R.DRREV is derived from R.DRR flip-flop which gets set during TBR.BT2 (≃ TBR.T04) if the bits F, S0, S1 and S2 (which occupy the bit positions of SPD.BB, SPD.B00, SPD.B01 and SPD.B01 and SPD.B02 respectively at that precise instant) are all ZEROS.

All 24 bits including start pattern and ending with B15 of message data are then serially gated in sequence (controlled by signal GLSR) into appropriate Input Buffers DRA or DRB via a signal –LSR. At the end of this operation, RMF bit, sequence No. bits S0–S2 and Data bits B00–B15 occupy their respective bit positions of DRA or DRB and start-pattern bits are discarded.

Block time TBR.BT5 gates in the five B.C. checking bits which are re-inverted to give true values at signal LCG. This signal represents combination of true serial values in sequence of all 29 bits of the data block. However, at the input to the Dual Bose-Chaudhuri Check Generators CGA and CGB, this LCG is modified by R.DRREV to give LCGR in order to simulate data as transmitted at the transmit bus.

Logic equations:

Set R.DRR = −SPD.BB and −SPD.B00 and −SPD.B01 and −SPD.B02 and TBR.BT2 and GP1R.

Reset R.DRR = TBR.BT1.

R.DRREV = R.DRR and TBR.TB4EV.

General expression for gated in true data.

Received = Σ −](Dn and Tn) or (Dno and Ino)]

where

D*n* = state of the data bit corresponding to the period T*n*.

T*n* = TBR.TNN.

NN = 01, 02, . . . 07,

Dno = state of the data bit corresponding to the period Tno (odd timing).

Tno = TBR.TN0

NO = 09, 11, . . . , 21, 23

General expression for DEMUX output = Σ D*n* and T*n* where

D*n* = as above

Tn = TBR.TNN

NN = 01, 02, . . . 23, 24

"Re-Inversion Generator" Input

DEV = Σ Dne and Tne where Dne = Data for even timing = Even data bits = B00, B02, —, B14

T*ne* = TBR.TNE

NE = 08, 10, . . . 20, 22

"Re-Inversion Generator" Output = DBne = (DEV and R.DRREV) or (−DEV and −R.DRREV)

Load Shift Reg. (−LSR) = −[(ΣDn and Tn) and GLSR]

Load Check Gen. (LCG) = LSR or R(X) where R(X) = re-inverted checking bits in sequence.

f. Indication Message Dual Input Buffers DRA & DRB

Demultiplexer output signal −LSR is used as data input to IDRR.B15 flip-flop FF32 of FIG. 35 of the Common Input (First-Phase) Circuit of DRA & DRB Dual Buffers. The 24-bit serialized Received Data is then shifted along either register A or B part of the Dual circuits according to which register is in use at the time of operation (controlled basically by −IGRA for Reg. A or IGRA for Reg. B set-up). General control input equations to successive Bit-Stages of the registers are as follows:

(1) First Phase (Common Input circuit)

| Data Input | Clock | Bit Stage Output |
|---|---|---|
| −LSR | PSR | IDRR.B15 |
| −DRR.B15 | do. | IDRR.B14 |
| [generally −DRR.BNN | do. | IDRR.BNN−1] |

where NN = 15, 14, ... $\phi$1, $\phi\phi$, S2, S1, S$\phi$
NN−1 = 14, 13, ... $\phi$1, $\phi\phi$, S2. S1, S$\phi$, RMF.

Systems Reset Data Input = −IRS.

Systems Reset Clock Input = −CP1R.RS

Systems Reset Select Input = IRS (2) Second Phase

| Data Input | Clock | Software Bit-Stage Outputs | Hardware Common Bit-Stage Output |
|---|---|---|---|
| IDRR.BNN | PAR | −DRA.BNN | −DRR.BNN |
| do. | PBR | −DRB.BNN | do. |

where NN = 15, 14, . . . , 01, 00, S2, S1, S0; RMF.

Loading operation of either one of the two Input Buffers is stopped after timing period TBR.T23 ready for Program access.

g. Dual Bose-Chaudhuri Check Generators CGA and CGB

Demultiplexer output signal LCGR (FIG. 35) is used as data input to the signal LICGR.B0 of the Common Input (First Phase) Circuit of CGA and CGB Dual Check Generators. All the 29-bit, serialized Received Data is then passed through either CGA or CGB cyclic register according to which register is in use at the time of operation (controlled basically by −IGRA for CGA and IGRA for CGB). General control input equations for successive Bit-Stages of the check generators are as follows:

(1) First Phase (Common Input Circuit)

| Data Input | Clock | Bit Stage Output |
|---|---|---|
| LICGR.B$\phi$ = GCGR & [(LCGR & −CGR.B4) or (−LCGR & CGR.B4)] & −TBR.T31 | PCGR | −ICGR.B$\phi$ |
| CGR.B$\phi$ & −TBR.T31 | do. | −ICGR.B1 |
| LICGR.B2 = [(LICGR.B$\phi$ & −CGR.B1) + (CGR.B1 & −LICGR.B$\phi$)] & −TBR.T31 | do. | −ICGR.B2 |
| CGR.B2 & −TBR.T31 | do. | −ICGR.B3 |
| CGR.B3 & −TBR.T31 | do. | −ICGR.B4 |

Systems Reset control inputs are the same as those of TBA & TBB, except that −IRS.CGR replaces −IRS.TBR as data inputs.

(2) Second Phase

| Data Input | Clock | Software Bit-Stage Outputs | Hardware Common Bit-Stage Output |
|---|---|---|---|
| −ICGR.BN | PGA | CGA.BN | CGR.BN |
| do. | PGB | CGB.BN | do. |

where N = 0, 1, ... 4 = Bit number of each stage.

CGA Read-Out control input = GRA.LH.

CGB Read-out control input = −GRA.LH.

Loading operation of either one of the two check generators is stopped after timing period TBR.T28 and its output are ready for B.C. Check result in TBR.T29. At the end of the timing period TBR.T31, output bits of the check generator in use are reset to all zeros.

h. Software-Hardware Interface Control Bits

BCF, DLA, DLB, DMB, SRS and TFF. Word W15 contains these bits for all five data links of the frame, indicated by parenthetical suffixes in FIG. 28. Those for link 1 are flip-flops B01, B06, B09, B17, B21 and B24 (not shown). This function consists of an All Zeros Detector, Dummy-Retransmission Message Detector and associated controls.

1. All Zeros Detector & BCF

As mentioned in (g) above the outputs of the check generator in use are checked by this detector which is just an OR gating arrangement to give Load Bose-Chaudhuri Check Failure (LBCF), which is a "setting pulse", as data input to the BCF flip-flop in the TOM if the received message fails after B. −C. check ("Pass" if check generator outputs are all zeros and "Fail" otherwise).

LBCF = TBR.T29 and (CGR.B0 + CGR.B1 + CGR.B2 + CGR.B3 or CGR.B4)

Pulse BCF (clock input) = PBCF = LBCF and GP1R.

2. Dummy-Retransmission Message Detector and DMB

As described in DEMUX (e) above if a message received has its bits RMF, S0, S1 and S2 as all zeros and (d) a flip-flop R.DRR is set during period TBR.BT2 to signify that this message is either a Dummy or Retransmission Request. At the end of the message assembly the non-zero sequence number of the message expected in the Retransmission Request occupies bit positions B06–B08 of either one of the Input Buffers (DRA or DRB) in use at the time. If these three bits are all zeros it indicates that the message is a Dummy, As a result Dummy Flip-Flop (DFF) is set for this purpose, and Dummy Bit (DMB) in the TOM is then set during TBR.T30 (if message passes B–C check).

Set DFF = R.DRR and –DRR.B06 and –DRR.B07 and –DRR.B08 and TBR.T24 and GP1R

Reset DFF = TBR.BT1

Load DMB = LDMB = –BCF and DFF and TBR.T30

Pulse DMB = PDMB = LDMB and GP1R

3. "Data Loaded" Bits DLA and DLB

If the data received passes B.C. check and it is not a Dummy, then the appropriate load bit A or B corresponding to the Input Buffer in use at the time (as determined by GRA.LH or –GRA.LH) is set during period TBR.T30.

Enable Load Bit = ELB = –BCF and –DFF and TBR.T30

Load DLA = LDLA = ELB and GRA.LH

Pulse DLA = PDLA = LDLA and GP1R

Load DLB = LDLB = ELB and –GRA.LH

Pulse DLB = PDLB = LDLB and GP1R

All these Software-Hardware Interface Control Bits are set by Data Link hardware as required and reset by Program software after processing.

4. System Reset Signal – SRS Bit

It is desirable to initialize the Data Link system prior to a normal operation by the program. For this purpose, a SRS bit is provided in TOM control word for each of the Traffic Office and it is under exclusive control by the program software. The internal hardware responds to reset various control flip-flops, time bases, B.C. check generators and Receive Data Registers, etc. SRS has to be reset by program after intialization.

5. Test Flip-Flop-TFF

This TFF bit is also provided in TOM control word for each T.O. so that under program control the Data Link receiver can be put in "Test Mode" operation to receive incoming idle pattern as a normal message and check the result of this faked message reception. TFF is set and reset by software only.

TRAFFIC OFFICE CONTROL FRAME

1. The Remote Terminal Circuit (RT)

General 1.1 Functionally, the remote terminal circuit RT performs the same jobs as the local terminal LT described above.

Accepts a 20-bit parallel message and serially transmits it to the distant LT receiver, along with a prefixed start pattern and an appended 5-bit Bose-Chaudhuri check sum. Receives the serial 29-bit message from the LT transmitter and assembles appropriate bits into a register for parallel extension to the user.

The MODEM and much of the control logic are implemented in the same way as the corresponding hardware in the LT. Descriptions of this hardware will principally refer to the preceding part of this specification.

Some differences exist, as RT must provide hardware to perform some of the functions accomplished via software at the base location. These have to do mostly with validity checks, and responses to specific situations:

In the RT, the three bit sequence number in the arriving message must satisfy a hardware counter rather than a software counter.

Check sum or sequence number failure causes hardware to initiate the Retransmission Request message.

Dummy messages, when required, are generated by hardware.

The RT obtains information to be transmitted from the Key Scanner. Messages received from the LT are assembled alternately in the two COMMAND register, where they are extended and acted upon by the Buffer Control.

RT Receiver, Detailed Description 1.2 Main functional parts of the RTC Receiver as shown on FIG. 25 and FIGS. 40–45 are:

Duobinary Demodulator.

Start Pattern Detector (SPD).

Gated Clock Pulses Control.

Demultiplexer Dual Time Bases TBA and TBB.

Receive Data Demultiplexer (DEMUX).

Dual Command Data Registers CDA and CDB.

Dual Bose-Chandhuri Check Generators CGA and CGB.

Miscellaneous Interface Controls (with BBC and KSC) - RMF, SNF, BCF, CDGO, SC, FC, GRR and STS.

a. Duobinary Demodulator

The demodulator 2511 receives incoming data from the TOAF-LTC Transmitter and delivers the data at the Remote Receive Bus (RRB). Duobinary Coding Technique and regeneration of binary data from the line signal is discussed above for the local terminal.

The demodulator also supplies two-phase clock pulses CP1R and CP2R to the RT Receiver.

In the absence of a carrier in the demodulator a signal RTC.DCF (Demodulator Carrier Failure) becomes true (+12V). This signal is passed on to BCC to generate an "alarm" signal to be reported via MRG (Maintenance Report Generator), KSC and the other trouble-free Data Link to the CMC.

b. Start Pattern Detector (SPD)

RT Receiver SPD operates in almost the same way as LT Receiver SPD except that the former is not equipped with hardware to operate in "Test Mode". The first two paragraphs of LT Receiver SPD operation apply equally here.

Set MFF = (–SPD.B00 and –SPD.B01 and SPD.B02 and RRB and CP1R).

Reset MFF = TBR.T31 and GP1R + IRS1.

GP1R = GDC1 and CP1R.

Figure 42:
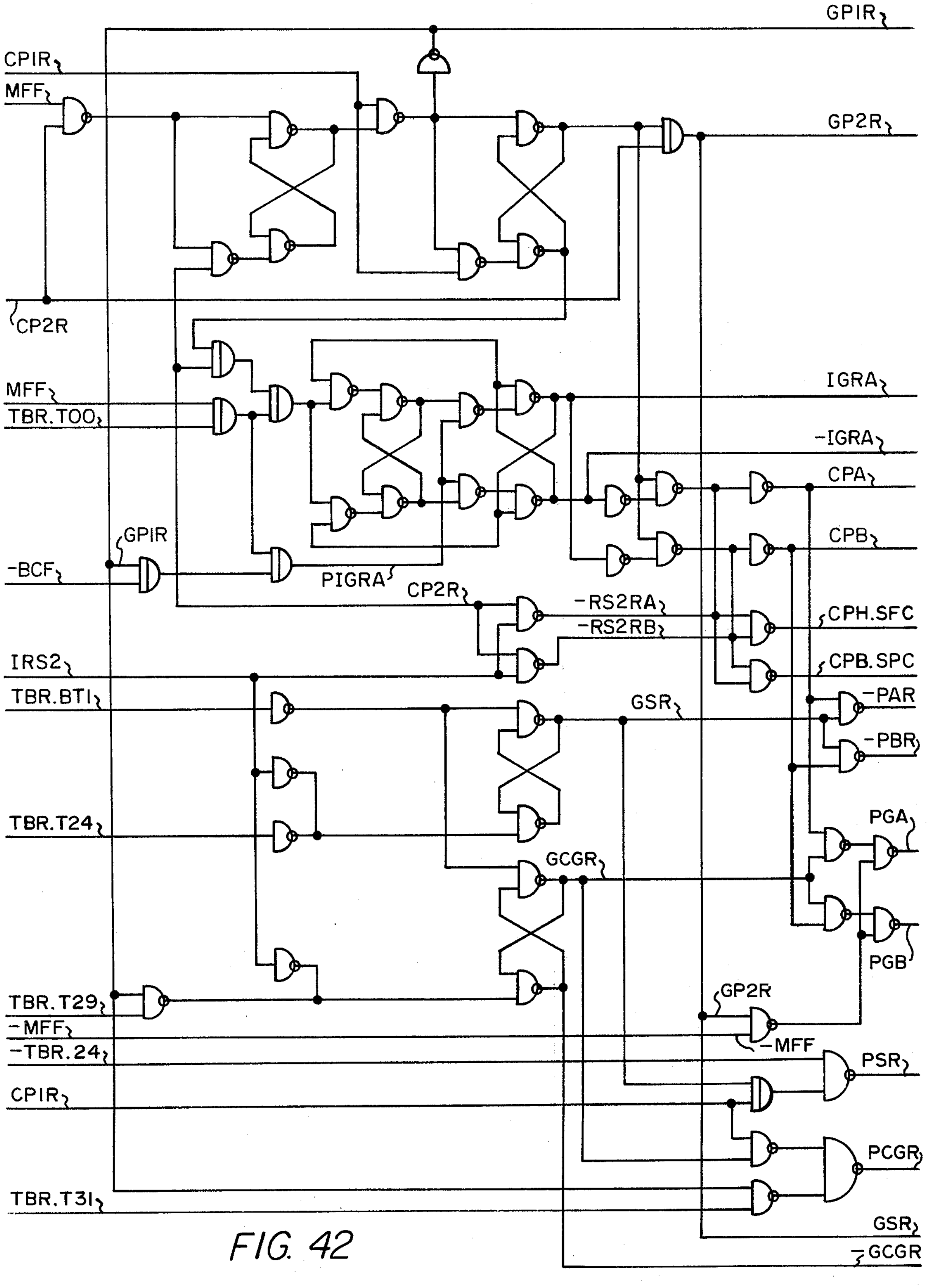

GP2R = GDC2 and CP2R.

c. Gated Clock Pulses Control (FIG. 42)

This function is basically controlled by Input Gate Reg. A latch (IGRA) which is essentially a one-bit counter and changes its output state at the beginning of receipt of a message if these was no Bose-Chandhuri Check Failure of the preceding message received.

Its bufferred output gates in second phase clock pulses CPA, PGA, CPA.SFC and PAR for Time Base A (TBA), Check Generator A (CGA), Sequence Counter A and Fault Counter A (SCA and FCA) and Command Data Register A (CDA) respectively of a 32-bit register. RA in the center of FIG. 40, the signal –IGRH buffered via D1 inputs is used as Hardware Read-Out level control for outputs Y (see FIG. 23) of TBA, CGA, SCA and FCA, and for CDA.

Figure 40:
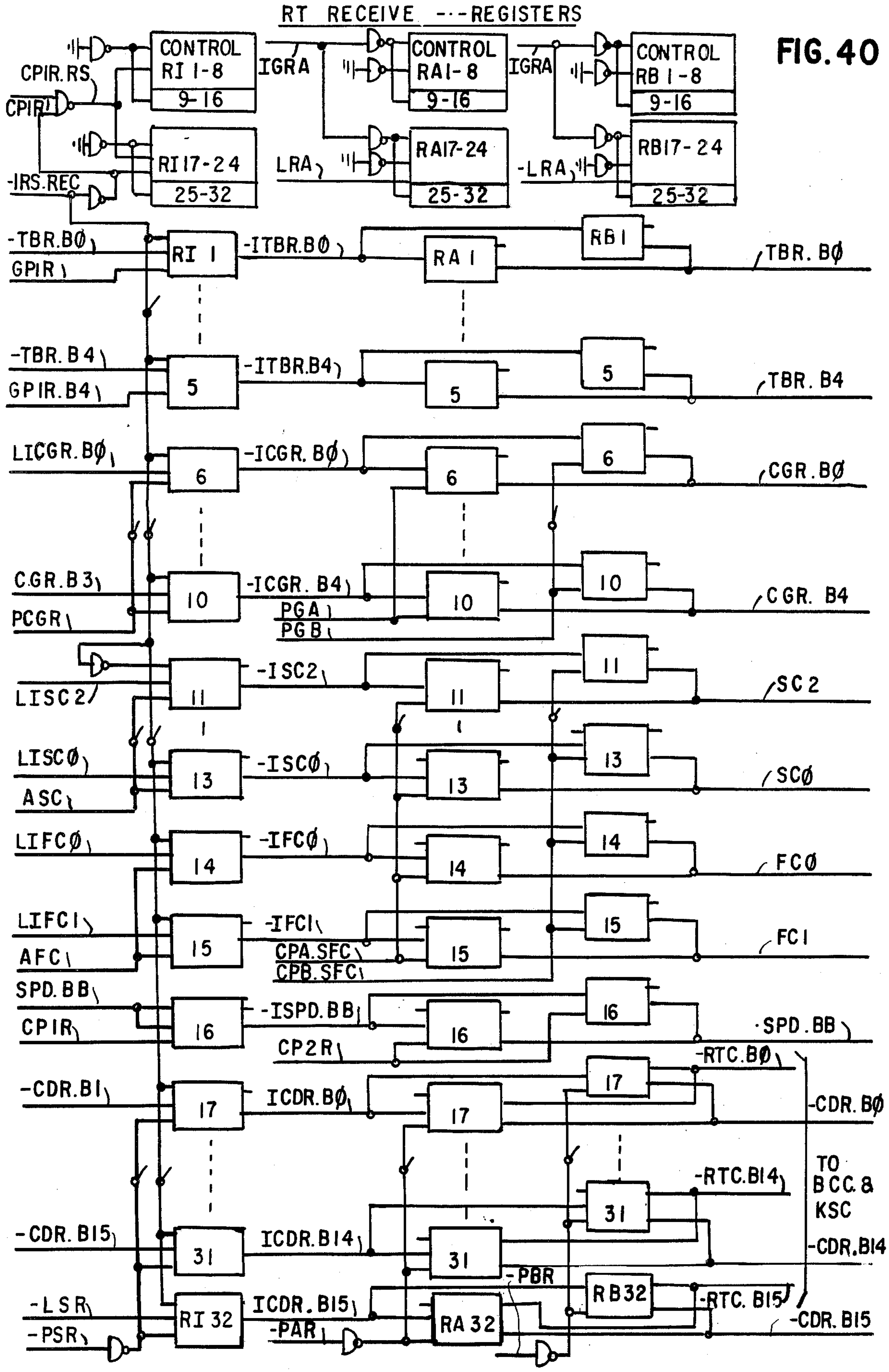

Similarly, IGRA bufferred gates in second phase clock pulses CPB, PGB, CPB.SFC and PBR for Time Base B (TBB), Check Generator B (CGB), Sequence Counter B and Fault Counter B (SCB and FCB) and Command Data Register B (CDB) respectively at right of FIG. 40. Also, IGRA bufferred is used as Hardware Read-Out level control for TBB, CGB, SCB and FCB, and for CDB.

Equations for CPA, PGA, PAR.XH0N, CPB, PGB, PBR are the same as those of LT Receiver.

CPA.SFC = GP2R and IGRA.

CPB.SFC = GP2R and IGRA

The logic for IGRA latches is shown on FIG. 42.

Other Main controls under this function are:

1. Gate Shift-Register (GSR). (FIG. 42)

This signal controls gating-in of the demultiplexed data (−LSR) at the input of the Dual Command Data Registers CDA and CDB.

Set GSR = Set GCGR = TBR.BR1

Equations for Reset GSR and PSR are the same as those in LT Receiver.

2. Gate Check Generator (GCGR). (FIG. 42)

Operation and equations for Set GCGR, Reset GCGR are the same as those in LT Receiver.

PCGR = GP1R [(GCGR and TBR.T29)+ TBR.T31].

Figure 43:
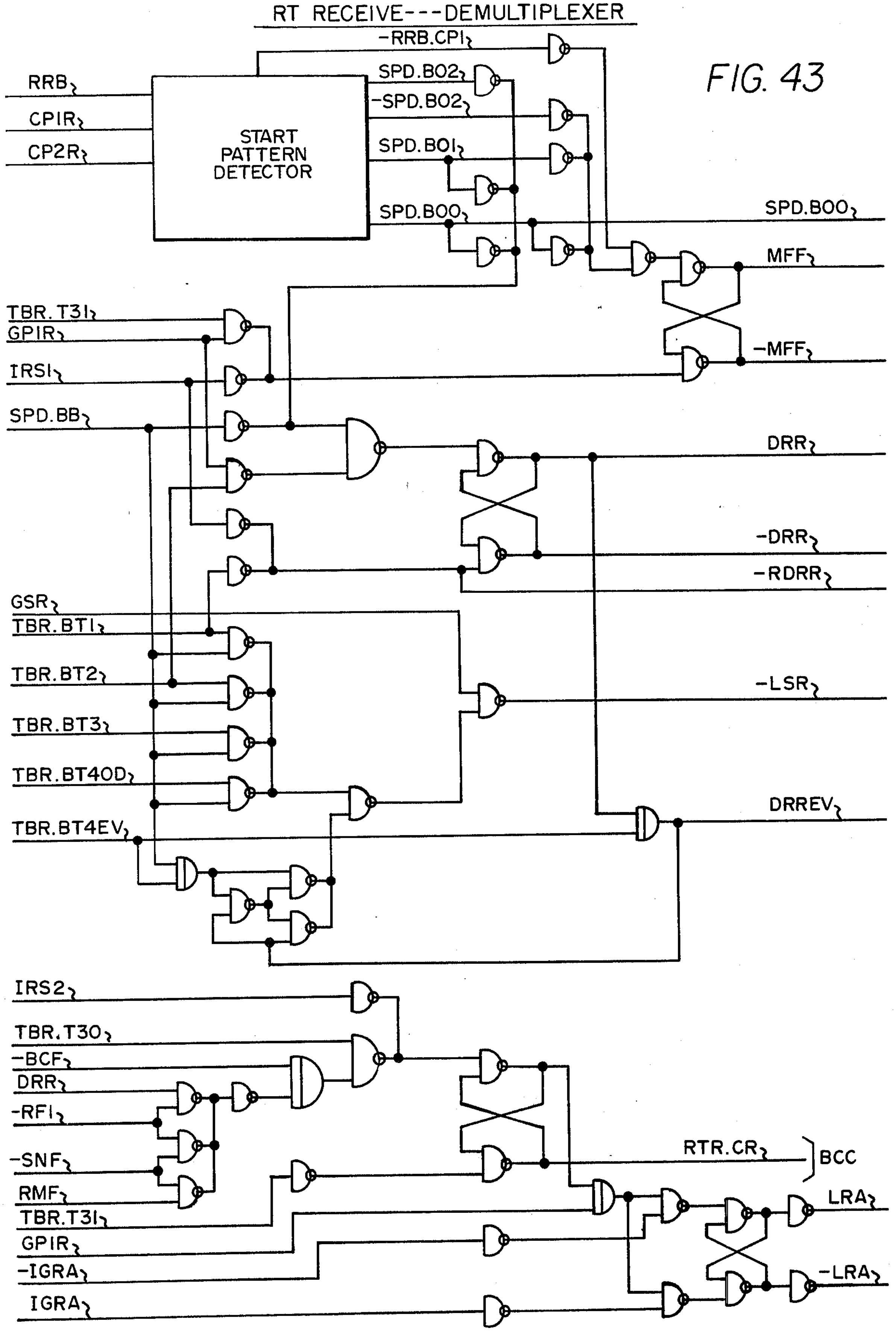

3. Load Register A (LRA). (FIG. 43).

Figure 41:
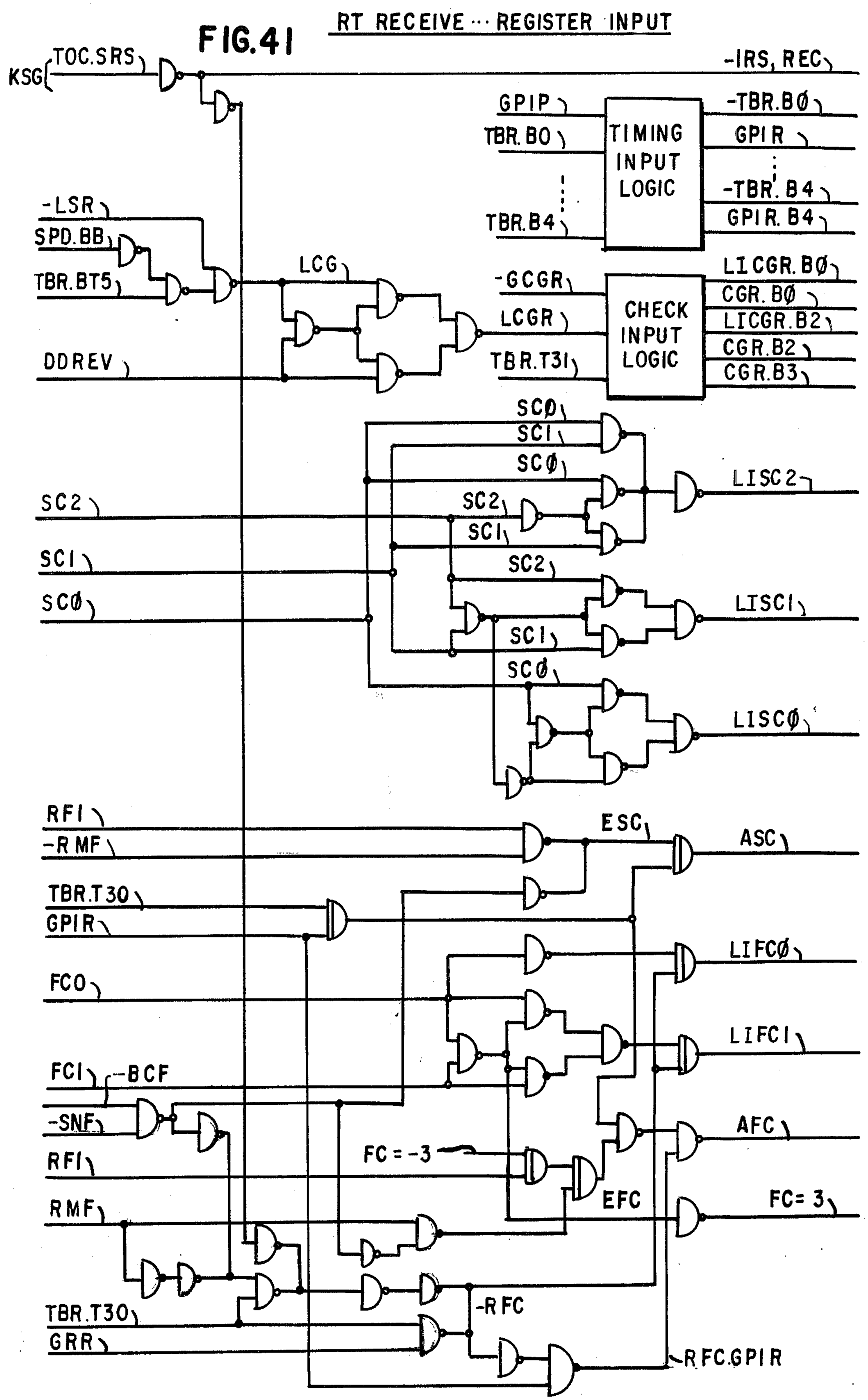

The signals −IGRA and IGRA buffered are used as set and reset input signals to ILRA latch whose buffered outputs give LRA and −LRA respectively. These are used as "software select" input control signals to control the gating-out function of the common outputs −RTC.B0–B15 of the Command Data Registers CDA and CDB to the interface with TOC Buffer Control Circuit (BCC). See (f) below for details. Shown as a block on FIG. 41 is the same as that on FIG. 29.

d. Demultiplexer Dual Time Bases (TBA and TBB). (FIG. 40)

These time bases operate in exactly the same way as those of LT Receiver and the descriptions of LT Receiver are all applicable here. They comprise flip-flops RI1-5, RA1-5, RB1-5. the input logic.

The differences between LT and RT Receiver Times Bases are that the former have software/hardware dual control inputs for second phase of A and B circuits, while the latter have no software control inputs, or software outputs.

e. Receive Data Demultiplexer (DEMUX). FIG. (43)

This DEMUX is almost identical to the LT Receiver DEMUX and operates in the same manner. The differences here are:

1. The Dummy-Retransmission Request Control latch is simply called DRR rather than R.DRR in the LT Receiver to distinguish from T.DRR in the LTC Transmitter and the control signal to -LSR gate here is GSR (FIG. 42) (whereas in the LT Receiver its control signal is GLSR).

2. The RTC Receiver DEMUX feeds all 24 bits into the Command Data Registers CDA or CDB; the start pattern (4 bits), the sequence number bits S0–2 and RMF bit are all discarded at the end of the operation leaving B0–B15 to occupy their respective bit positions in the Command Data Reg.

Set DRR = −SPD.BB and −SPD.B00 and −SPD.B01 and −SPD.B02 and TBR.BT2.

Reset DRR = TBR.BT1.

DRREV = DRR and TBR.Bt4EV.

$DB_{ne}$ = (DEV and DRREV) or (−DEV and −DRREV)

Load Shift Reg. (−LSR) = −[($\Sigma D_n$ and $T_n$) and GSR]

The rest of the equations are the same as those in the LTC Receiver DEMUX.

f. Dual Command Data Registers CDA and CDB. (FIG. 40)

These registers, CDA comprising flip-flops RA17–32 and CDB comprising flip-flops RB17–32, operate in the same way as the Indication Message Dual Input Buffers DRA and DRB of the LT Receiver in so far as the loading and shifting of the demultiplexed received serial data (−LSR) is concerned. Therefore the equations and description are applicable here if we substitute IDRR.BNN and DRR.BNN with ICDR.BNN and CDR.BNN respectively (where NN = 15, 14, —, 1, 0 in this case), keeping in mind the fact that the CDR combination has no provisions for storing sequence number bits S0–2 and RMF bit.

The bistable circuit used in the LT receiver registers, is the DAMP, which provides the dual access for hardware loading and for software output gating (reading).

In the RT, the same bistable circuit is used, with the software gated outputs reassigned: signals LRA and −LRA gate, respectively, the contents of CDA, CDB to BCC (−RTC.B0–B15) and to KSC (−RTC.B0–B5 and −RTC.B13–B15). This is shown on FIG. 40; the input designated D3 is common to the 16 bits in one register (on one printed Wiring Board).

g. Dual Bose-Chaudhuri Check Generators CGA and CGB. (FIG. 40)

These check generators operate in exactly the same way as those of the LT Receiver, and the descriptions for the latter are applicable. The input logic block on FIG. 41 is the same as the logic on FIG. 29.

As in the case of the Time Bases (see (d) above) these RT check generators have neither software inputs nor outputs.

(h) Miscellaneous Interface Controls.

The following paragraphs describe the functions under this category block by block.

Figure 44:
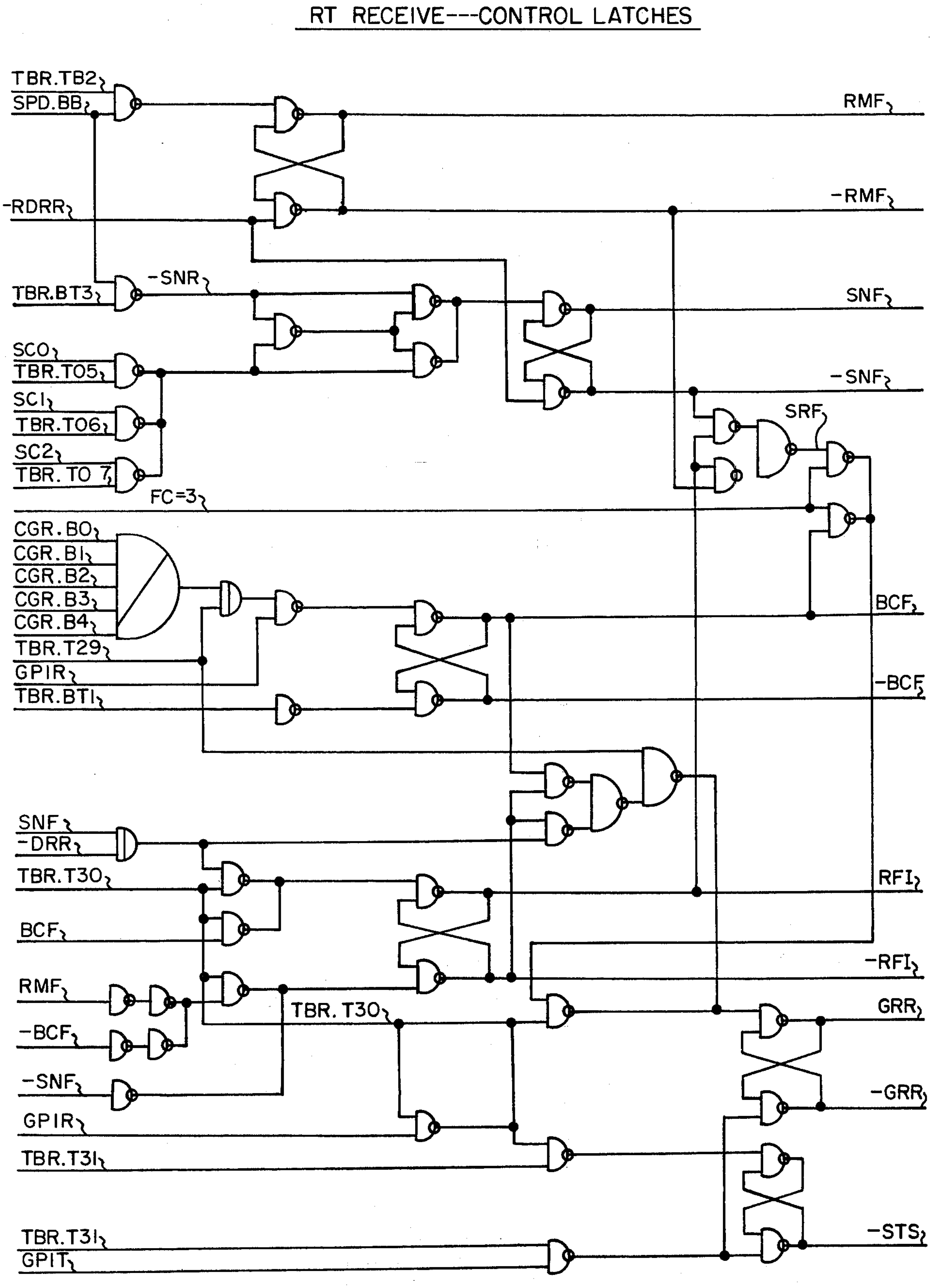

1. Retransmitted Message Flag (RMF) Detector (FIG. 44)

This is a latch which detects the state of the RMF bit in the incoming data block during an appropriate time period (TBR.BT2 = TBR.T04) and gets set if the incoming RMF = 1. From the table A it will be observed that the RMF bit (F) occupies the bit BB position of the SPD output during period T04. Thus, Set RMF = SPD.BB and TBR.BT2

Reset RMF = TBR.BT1 or IRS1

The outputs of RMF as well as SNF and BCF flip-flops (see 2 and 3 below) are used as part of the input gating arrangement for Sequence/Fault Counter, Retransmission Request Signal Generator and Command Data Gate-Out) controls.

2. Sequence No. Comparator (SNF) (FIG. 44)

This comparator compares the states of the seq. number bits in the incoming received data block with those of the corresponding bits in the sequence counter of the RTC Receiver. If they mismatch SNF latch is set to indicate Sequence No. Failure (SNF) of the received data block.

Sequence No. Received (SNF) = SPD.BB and TBR.BT3

Sequence No. Expected (SNE) = (SC0 and TBR.T05) + (SC1 and TBR.T06) + (SC2 and TBR.T07)

Set SNF = [(SNR and SNE) + (−SNR and SNE)] + −CP2R

Reset SNF − TBR.BT1 + IRS1

3. All Zeros Detectors (and BCF) (FIG. 44)

As mentioned in the local terminal description, the outputs of the Check Generators CGR.B0–4 are ready for B.C. check result of the incoming data block during the period TBR.T29. Therefore, with the criterion of —"Pass" if check gen. outputs are all zeros, and "Fail" otherwise — a check is made and the result is stored in Bose-Chaudhuri Check Failure (BCF) flip-flop.

Set BCF = (CGR.B0 + CGR.B1 + CGR.B2 = CGR.B3 + CGR.B4) + TBR.T29 and CP1R.

Reset BCF = TBR.BT1 + IRS2

4. Command Data Gate-Out Control −CDGO −RTC.CR and GCD) (FIG. 43)

The Command Message Data from the CMC received and assembled in either CDA or CDB register is gated out to BCC and KSC interfaces provided it passes the B.C. check and:

It is either a Dummy or Retransmission Request Message and the Receipt Fault Indicator (RFI) in the RTC Receiver is not set; or Its sequence number matches with that of the RTC Receiver Sequence Counter and RFI is not set; or Its sequence number matches with that of the RTC Receiver Sequence Counter and its RMF bit is set.

Note that if the above validity checks on a new message fail, the last received valid message remains gated to BCC.

Approximately 208μs before gating out the Command Message Data (GCD signal), the Command Ready latch RTR.CR is reset to indicate to the BCC that the data at the interface is about to change. After gating out the data (approximately 208μs after GCD) the Command Ready flip-flop is set again to give "Command Ready" signal (RTC.CR) to the BCC.

Reset "CR" = {(−BCF and TBR.T30) and [(−RFI and DRR) + (−RFI and −SNF) + (−SNF and RMF)]} or IRS2

Set "CR" = TBR.T31

Gate Command Data (GCD) = −RTC.CR and GP1R

GCD is used as a controlling "clock" pulse to change states of LRA.

5. Receipt Fault Indicator (RFI) and Sequence Counter-Fault Counter Control. (FIG. 44)

As described for the local terminal receiver, RFI is set to indicate Fault condition if: (a) the incoming message fails B.C. check, or (b) sequence number of the message mismatches with that of the RTC Receiver Sequence Counter and the message is neither a Dummy nor a Retransmission Request from the CMC.

RFI is reset to indicate that the fault is cleared if and only if: (a) the incoming message passes B.C. check, (b) sequence number of the message matches with that of the RTC Receiver Sequence Counter, and (c) the message contains its RMF bit set (=1).

Set RFI = TBR.T30 and [(BCF) + (SNF and −DRR)]

Reset RFI = [TBR.T30 and RMF and −BCF and −SNF] + IRS.REC

Enable Sequence Counter (ESC) (FIG. 41)

Sequence Counter at the RT Receiver is allowed to increment (be enabled) via signal ASC if:

The RFI resetting conditions (a), (b), (c) above are satisfied, or

The incoming message passes B.C. check, its sequence number matches with that of the RTC Receiver Sequence Counter, and RFI is reset at the time.

ESC = −BCF and −SNF (RMF + −RFI)

Enable Fault Counter (EFC) FIG. (41)

Fault Counter at the RTC Receiver is allowed to increment (be enabled) if:

RFI is set, and

Fault Count has not reached 3(FC ≠ 3), and

The incoming message fails B.C. Check, or sequence number of the incoming message mismatches with that of the Sequence Counter, or the incoming message contains its RMF bit reset (=0).

EFC = (RFI and −FC=3) and (BCF + SNF − −RMF).

Reset Fault Counter (RFC) (FIG. 41)

Fault Counter at the RTC Receiver is reset to ZERO soon after the following conditions: (a) Gate Retransmission Request (GRR) is set, or (b) Receipt Fault Indicator (RFI) is reset. FC is also reset to ZERO by the System Reset Signal (TOC.SRS) during initialization period.

RFC = (GRR and TBR.T30) + RRFI where RRFI = Reset RFI.

6. Sequence Counter (SC0–2) (FIG. 40)

This Sequence Counter comprising flip-flops I11–13, RA11–13 and RB11–13 in FIG. 40 in the RT Receiver is a 3-bit mod. 7 counter which counts up from 1 through 7 and then starts from 1 again under control of the signal Advance Sequence Counter (ASC) as its input (first phase) clock pulse. It has SC0 as its most significant bit to conform to the order of bits in the Data Link message block.

Control input equations for the logic in FIG. 41 for the successive Bit-Stages of the Sequence Counter are as follows:

First-Phase

| Data Input | Clock | Bit-Stage Output |
|---|---|---|
| LISC2=(SCφ&SC1) or (SCφ&−SC2) or (SC1 & −SC2) | ASC=(ESC & T30.GP1R) | −ISC2 |
| Load Input Sequence Counter Bit 2, & so on. | | |
| LISC1=(SC1&−SC2) or (−SC1&SC2) | ASC=(ESC &T30.GP1R) | −ISC1 |
| LISCφ=(SCφ%−SC1) or (SCφ&−SC2) or (−SCφ & SC1 & SC2) | ASC=(ESC & T30.GP1R) | −ISCφ |

System Reset Control Inputs:

Select and Clock Inputs are the same as those of TBA and TBB.

Data Inputs are IRS for ISC2 flip-flop and −IRS for ISC1 and ISC0.

Sequence Counter is reset to 0 0 1.

Second-Phase

| Data Input | Clock | Software Outputs | Hardware Common Bit Stage Outputs |
|---|---|---|---|
| −ISCN | CPA.SFC | None | SCN |
| −ISCN | CPB.SFC | None | SCN |

where N = 0, 1, 2 = SC bit number. Read-Out control inputs for A and B parts of the counter are the same as those of TBA and TBB.

7. Fault Counter (FC0–1) (FIG. 40)

This Fault Counter comprising flip-flops 114–15, RA14–15, and RB14–15 in the RTC Receiver is a 2-bit binary counter which counts in 0, 1, 2, 3, 0, — sequence under control of the signal Advance Fault Counter (AFC) as its input (first phase) clock pulse. It has FC1 as its most significant bit.

Control input equations for the logic in FIG. 41 for the successive Bit-Stages of the Fault Counter are as follows:

First-Phase

| Data Input | Clock | Bit-Stage Output |
|---|---|---|
| LIFCϕ =–FCϕ & –RFC | AFC-=(EFC&T3ϕ.GP1R) or RFC.GP1R | –IFCϕ |
| Load Input Fault Counter Bit ϕ | | |
| LIFC1=[(FCϕ&–FC1) or (FC1&–FCϕ)]& –RFC | AFC-=(EFC&T3ϕ.GP1R) or RFC.GP1R | –FC1 |

System Reset Control Inputs:
Select and Clock Inputs are the same as those of TBA and TBB.
Data Inputs = –IRS.SFC = –TOC.SRS
Fault Counter is reset to 0 0.
There are no software outputs for first phase.

Second Phase

| Data Input | Clock | Software Outputs | Hardware Common Bit-Stage Outputs |
|---|---|---|---|
| –IFCN | CPA.SFC | None | FCN |
| –IFCN | CPB.SFC | None | FCN |

Where N = 0, 1 = FC bit number.
Read-Out control inputs for A and B parts of the counter are the same as those of TBA and TBB.

8. Retransmission Request Signal Generator (GRR) (FIG. 44)

This consists of Gate Retransmission Request (GRR) latch and associated control inputs.

As mentioned for the LT receiver, GRR when set will give a signal to the RT Transmitter to send a Retransmission Request Message using the RTC Receiver Sequence Counter outputs SC0–2 as the Sequence number expected at the TOC.

GRR is set at the end of message receipt under one of the following conditions:

There is an initial B.C. check failure of the incoming message received, or

Sequence number of the incoming message mismatches with that of the Sequence Counter, and the message is neither a Dummy nor a Retransmission Request from the CMC, or While RFI is set, sequence number of the message mismatches with that of the Sequence Counter and also the Fault Count reaches 3, or While RFI is set, the incoming message contains its RMF bit = 0 and also the Fault Count reaches 3, or The incoming message fails B.C. Check and the Fault Count = 3.

Set GRR = [–RFI and TBR.T29 and {(BCF) + (SNF and –DRR)} ] + [SRF or BCF) and FC=3 and TBR.T3].

Where SRF = Sequence number or RMF bit mismatch during Fault condition period. = RFI and (SNF + –RMF).

Reset GRR = Reset STS; See (9) below

RTC Transmitter resets GRR at the end of transmission of a message from the TOC.

9. Start Transmit Message Signal Generator (STS) (FIG. 44)

This is a latch which is set by the RT Receiver at the end of receipt of a message from the CMC to signal to the RT Transmitter to start transmission of a message. The flip-flop is reset by the Transmitter at the end of transmission of each message from the TOC or by the System Reset signal during initialization.

Set STS = TBR.T30 and GP1R.

Reset STS = (TBT.T31 and GP1T) or (IRS and CP1R)

RT Transmitter, Detailed Description

1.4 The RTC Transmitter shown in FIGS. 25 and FIGS. 37–39 comprises:

Multiplexer Time Base (TBT) with its associated clock card and clock pulses distributor).
Start Pattern Generator (STP).
Send Data Multiplexer (MUX).
Bose-Chaudhuri Check Generator (CGT).
Idle Pattern Generator (IPG).
Duobinary Modulator Unlike the LT Transmitter, it has no Data Transmitter Register (DTR) of its own, and the Indication Data to be transmitted to the CMC is taken directly across the interface from the KSC.

a. Multiplexer Time Base (TBT.B0–4)

This Time Base is identical to LT Transmitter Time Base and operates in exactly the same way. However, its control bit is STM (instead of DLT, set by the Program in the LTC TRansmitter). STM is set during CP2T time by the asynchronous signal STS from the RTC Receiver described Section 1.2 (h) above. STM in turn sets GDC (after 416 μs delay) and GDC determines the Transmission or Idle modes of the Transmitter as before by gating clock pulses GP1T or IP1 as required.

All the equations given for the Time Base and Clock Pulses Distributor of the LT Receiver are applicable if we substitute STM and ISTM for DLT and IDLT respectively. ISTM Input = LISTM = –STM or TBT.T31 ie Set ISTM = STM and CP1T
Reset ISTM = TBT.T31 and CP1T = Reset STS
Set STM = STS and CP2T
Reset STM = –STS and CP2T
Set GDC = ISTM and CP2T

GDC copies states of ISTM after 208 μs delay.

The 38.4 k Hz crystal oscillator clock 2512 outputs are utilized as follows:

1. CP1T and CP2T clock pulses for the Time Base and other controls in the RTC Transmitter.

2. The signals –RTC.PA0, RTC.PB4, ± RTC.CA2–4, and RTC.CB1 are made available to the KSC for its internal controls. See FIG. 20.

b. Start-pattern Generator (STP)

Figure 38:
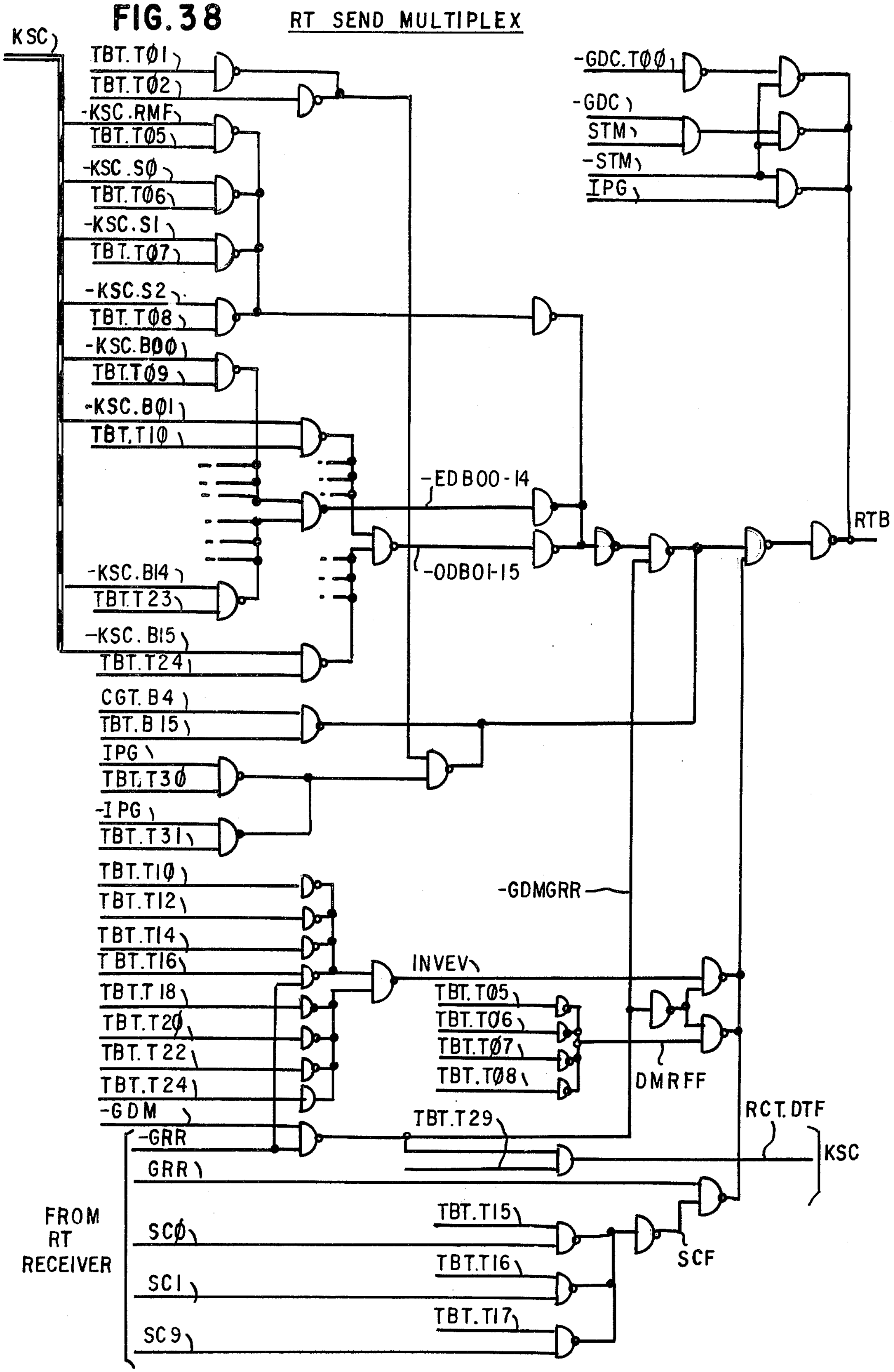

Operation is the same as that of the LT Transmitter STP. an 0011 pattern is generated at the RTB. (See MUX below).

c. Send Data Multiplexer (MUX) (FIG. 38)

RTC Transmitter MUX operates similar to the LTC Transmitter MUX; however, its hardware implementation is somewhat different to allow for the interfaces with the RTC Receiver and the KSC.

As the LT, the MUX output RTB sends the idle pattern until the start of the Transmission Mode; the start pattern is sent during timing periods TBT.T01 through TBT.T04.

At this point, the continuation is conditional on the state of GRR in the RT receive; if the message just received failed acceptance, ¬GRR → GDMRR (FIG. 38) to initiate a Retransmission Request message. In time TBT.T05 – TBT.T08, DMRRF.GDMRR hold RTB = 0 (RMF and Seq. no. bits = 0, alerting the LT receiver that this is either a Dummy or Retransmission Request). Recall now that alternate bits of the data field are to be inverted, to minimize the string of all zeros; they will be reinverted by the LT before loading in the receive register. Accordingly, TBT.T10, 12, 14 = INVEV: GDMRR, INVEV → RTB = 0 in these time slots. In TBT.T15, 16 and 17 the required sequence number SC0, –SC1, SC2 = SCF; GRR.SCF controls RTB. ¬GRR inhibits INVEV in TBT.T16. In the following even timing periods (18–24), GDMRR.INVEV RTB = 0. In all odd timing periods not otherwise excepted above, RTB = 1.

If the received message passed, the action at TBT.T05 is conditional on the state of KSC.DEF, reflecting the availability of a message in the Key Scanner buffer. If the buffer is empty, a dummy is sent. KSC.BEF and TBT.T05 = set GDM; ¬GDM → GDMRR. The sequence is now the same as above for the Retransmission Request except for TBT.T15–17, which is all zeros. Bits 15 and 17 are sent as ones, in accordance with the alternating plan.

It will be noted that the technique for inverting alternate bits in the Retransmission Request and Dummy messages is different from that employed in LTC.

Finally, if in TBT. T05 the received message is O.K. and there is an Indication Message in Key Scanner Buffer Store, ¬GDMRR allows the gating of RMF, SEQ. No. bits 0–2, and the 16 data bits directly to RTB.

Signal –RTC,T02 to KSC in time TBT.T02 provides a timing signal required for Position Status Request.

Signal RTC.DTF (Data Taken Flag) – =GDMRR and TBT.T29 to KSC advances that systems Out Sequence pointer after a message has been transmitted.

MUX Logic Equations:

1. Data Bits in general for the normal 20 bits of an Indication Message (i.e. DB20) are:

$DBn = -(\Sigma - D_n \text{ and } T_n)$ where $D_n$ = KSC.RMF, SO–2, .B00–15 i.e. data from KSC interface at time TBT.$T_n$ (corresponding to each bit) of the RTC Transmitter Time Base.

$n$ = 05, 06, — 23, 24.

Multiplexed output of this function is = DB20 + GDMRR where

DB20 = RMF.S0–2 and EDB00–14 and ODB01–15; RMF.S02, EDB00–14 and ODB01–15 have the same functional values as those in the LTC Transmitter.

2. Dummy and Retransmission Request (DMRR) Control

Set GDM = KSC.BEF and TBT.T05.

Reset DGM = TBT.T03 and IRS1.

Gate Dummy/Retransmission Request

GDMRR = GDM + GRR

Dummy or Retransmission Request Flag

DMRRF = TBT.T05 + TBT.T06 + TBT.T07 + TBT.T08.

Invert Even Timing Period Bits

INVEV = TBT.T10 + TBT.T12 + TBT.T14 + (TBT.T16 and ¬GRR) + TBT.T18 + TBT.T20 + TBT.T22 + TBT.T24.

Sequence Counter Flag

SCR = (SC0 and TBT.T15) + –SC1 and TBT.T16) + (SC2 and TBT.T17).

GDMRR and GRR control the three other signals to give multiplexed output of DMRR Control Function as = – [(GDMRR and INVEV) or (GDMRR and DMRRF) or (SCF and GRR)].

Figure 37:
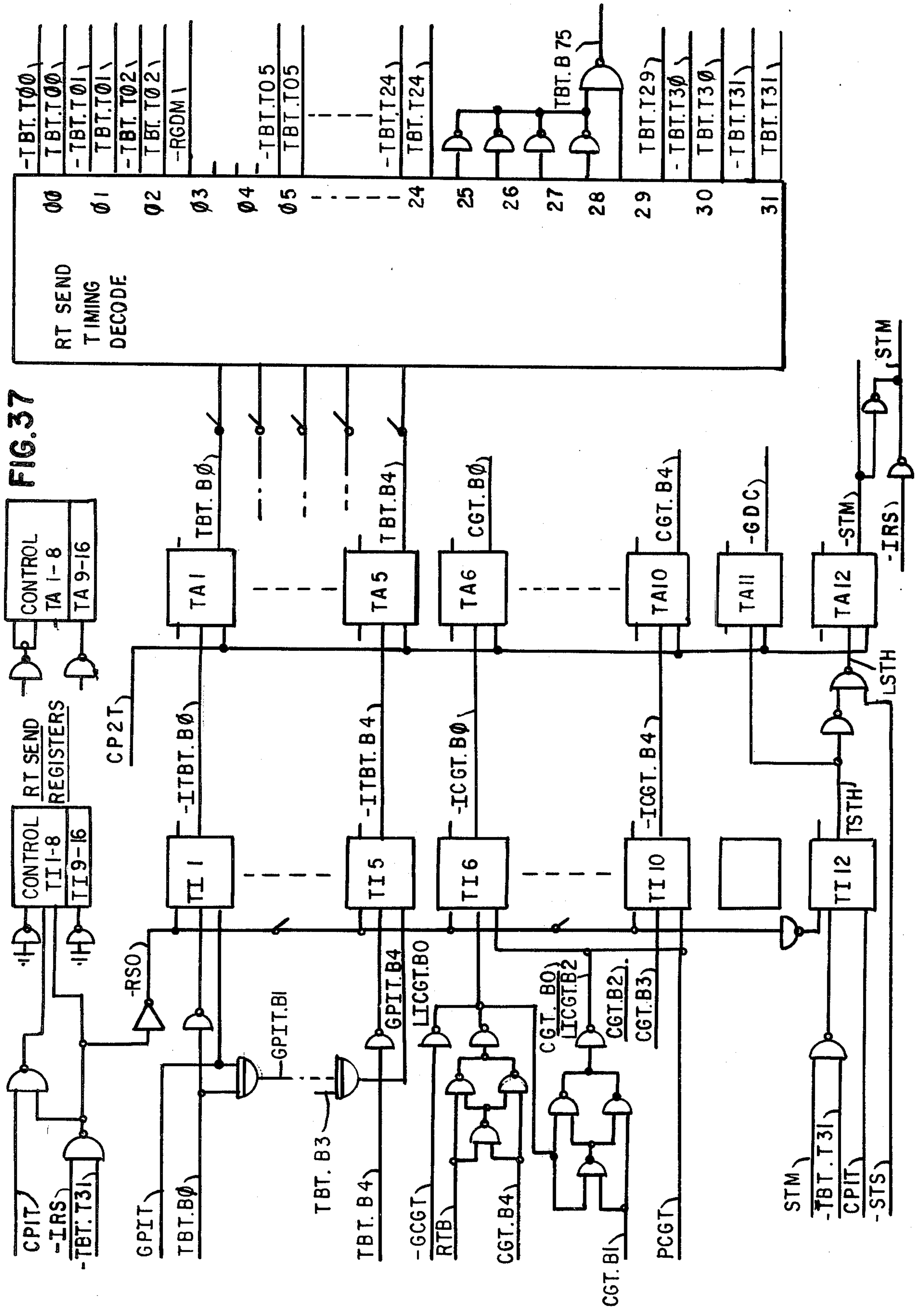
FIGS. 37–39 are functional block diagrams of the remote terminal transmitter.

3. Bose-Chaudhuri Checking Bits $\overline{R(X)}$ are multiplexed in exactly the same way as those in LTC Transmitter and the same equations apply here also.

d. Bose-Chaudhuri Check Generator (CGT.B0–4) (FIG. 37)

Figure 39:
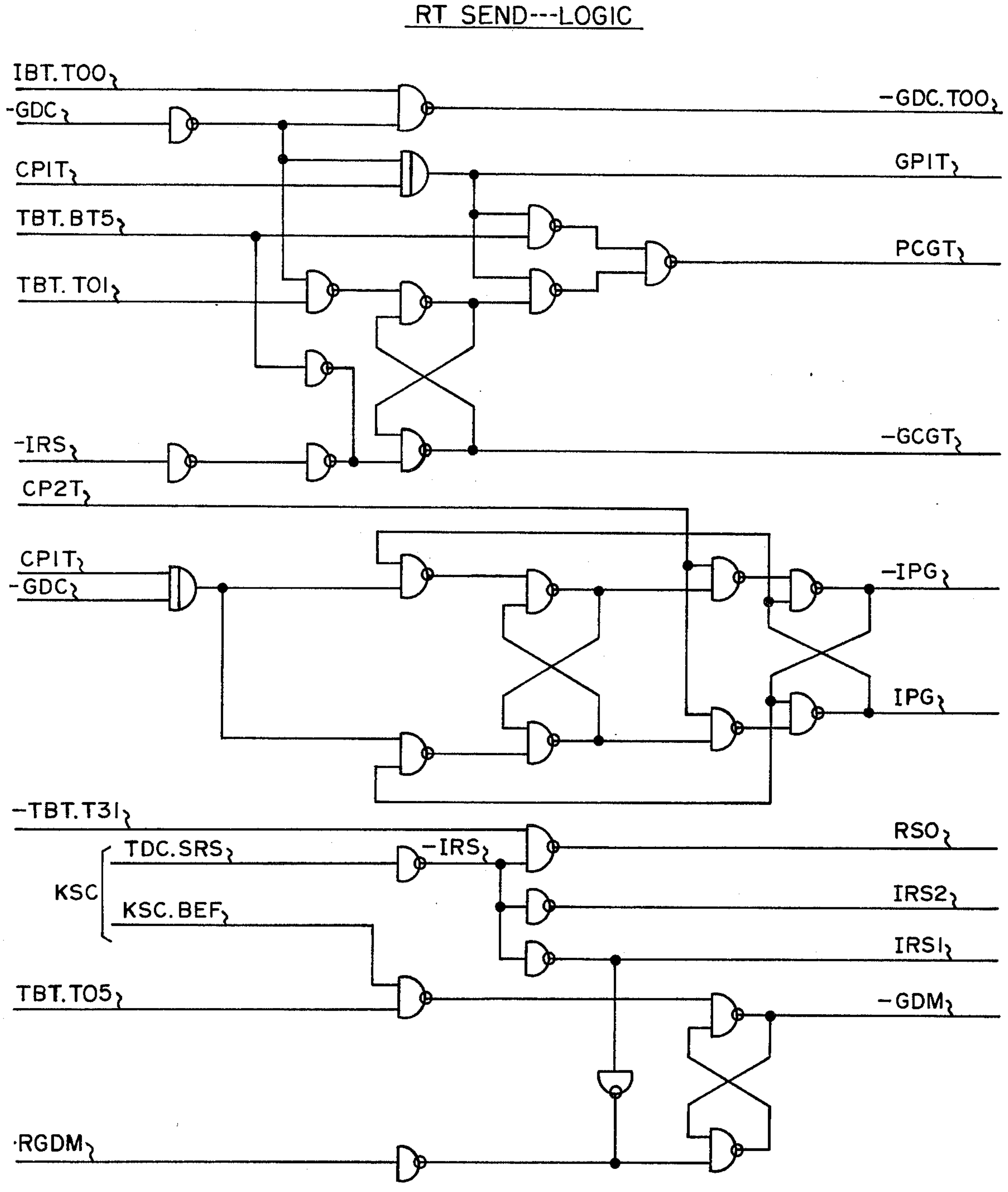

This check generator comprising flip-flop T16–10 and TA6–10 is identical to that of the LT Transmitter and the description and equations given are applicable.

e. Idle pattern Generator (IPG) (FIG. 39)

This IPG operates in the same way as that in the LT Transmitter and the equations given for the latter are applicable here also if we substitute STM for DLT in the IPG Synchronization or multiplexing at the Remote Terminal Bus (RTB).

f. Duobinary Modulator (FIG. 25)

This modulator 2513 picks up signals from Remote Transmit Bus (RTB) and transmits them in a similar way to the LTC Modulator and the descriptions given for the LT Modulator apply here as well.

Modulator Carrier Failure Signal (MCF)

In the Absence of a carrier in the modulator a signal RTC.MCF becomes true (+12v). This signal is passed on via a Ground switch in BCC to the MRG, which generates an "alarm" signal. This is (hopefully) transmitted by the other (troublefree) copy of Data Link to the base location, indicating failure of the RTC Modulator carrier.

Display Buffer-Retransmission Request

FIG. 50 shows a portion of the display buffer, representing decoding of the retransmission request message, gated with the command ready signal RTR.CR, and forwarded to the key scanner as flag signal –BCC.RRF. The figure also shows decoding of the position status flag –BCC.PSF used by the key scanner to obtain the status of the key bus for any position.

Flowcharts

FIGS. 51–56 are flow charts for the operation of the data link, both hardware and software. Note that certain functions are performed by hardware at the traffic office end TOC remote terminal and by software at the base location end CMC local terminal, but it is clear that these functions could also be performed by hardware at the local terminal with circuits corresponding to those at the remote terminal.

DATA LINK SOFTWARE — SPECIFIC EMBODIMENT

The following description along with flowcharts in FIGS. 57–68 constitute a specific embodiment of the software programs for controlling the data links to the traffic offices.

NAME:

S_TRAF_OFF_CON_DATA_LINK_

PURPOSE:

This module performs the functions of handling incoming and outgoing messages at the CMC side of the data link connecting the Control and Maintenance Complex and the Traffic Office. Those functions involve all of the tasks required in maintaining an orderly flow of traffic between the CMC and each equipped traffic office. This module is called by the MAIN program on a 20-millisecond rate.

INPUTS AND OUTPUTS:

DATA BASE:

INPUT_BUF_TOC(T)

This is an array of ten words which are separated into two halfwords. BUFFER2 and BUFFER1. Each word stands for two input buffers per traffic office. These buffers contain the latest two messages received from an office and they are awaiting processing. The array is declared in SG__DATA_LINK_QUEUS.

OUTPUT_Q_TOC(T) PS

These are 64-word queues where messages to be sent to a TOC are stored until they are transmitted. There is a queue, plus a word for its index, for each equipped traffic office. Each queue is accessed by a based variable pointer. They are declared in SO__DATA_LINK_QUEUES.

DATA_LINK_STATUS.CONDITION (PS)

This word contains data that reflects the status of the Traffic Offices and their data links, and control data used in processing input and output messages.

DATA_LINK_MESSAGE (PS)

.SEQ_IN(T)

Each traffic office has a word that contains the incoming (expected) sequence number for both copies of data link. The left half word represents copy 0 and the right half copy 1.

.SEQ_OUT(T)

Each traffic office has a word that contains the outgoing sequence number for both copies of data link. The arrangement is the same as for incoming sequence numbers.

DATA_LINK_RETRANSMISSION (PS)

.NEED (WORD)

.TOC_SEQ_FAIL

This represents the traffic offices that have had a sequence number failure at the CMC.

.TOC_RQST_RTNSM

This represents the traffic offices that have requested a retransmission of a message.

.MODE (WORD)

.CMC_RQST_RTNSM

This represents the traffic offices that have been requested by the CMC to retransmit a message because of sequence number or BOSE-Chaudhuri failures.

.COUNT (I) (WORD)

Each word contains two traffic offices that may be in a retransmission mode. The left half of the word is an odd numbered office and the right half of the word is an even numbered. A total of five words represent ten offices. When an office is in a retransmission mode it will wait for four message scans to receive the requested message. This field is the counter for that case.

TOM (HYBRID)

This is the traffic office matrix that is the terminating point for the data link input and output buffers. The matrix is made up of sixteen words that are subdivided into 5-output buffers (0–4), 5-A input buffers (5–9), 5-B input buffers (10–14) and 1-control word (15). This matrix can only represent 5 traffic offices and only one data link copy. Therefore there will always be at least 2 TOMS and never more than 4 (for a fully equipped system).

Parameters:

This is the number of the traffic office that is being processed.

STATUS

This word reflects the condition of the Data Links, and other data relevant to the Data Link processing.

COPY_0

This is a copy of the control word in the Traffic Office Matrix (TOM) representing copy 0 data links.

COPY_1

This is a copy of the control word in the Traffic Office Matrix (TOM) representing copy 1 data links.

BASE_0

This is the based variable pointer to the TOM, either high or low numbered, associated with copy 0 data links.

BASE_1

This is the based variable pointer to the TOM either high or low numbered, associated with copy 1 data links.

MESSAGE

This is the encoded lamp directive to be sent to a position in the respective TOC. It will be jointed with the position number P and stored in OUTPUT Q TOC(T) to await transmission to the TOC.

P

This is the position number which is to be joined with MESSAGE and which will be a pointer to position in the TOC that message is intended for.

IN_BUFFER

This is the message as it is when unloaded from the input buffer in the TOM. The right half of the word is to be stored in the buffer INPUT_BUF_TOC(T) for later processing by the Key Scan Routine.

ENTRIES:

S_DATA_LINK_CONTROL EXTERNAL

This entry is called by the MAIN program on a regular basis to maintain the control of the data links.

S_LOAD_MESSAGE_QUEUE(MESSAGE,P,T) EXTERNAL

This entry is called by various routines thru out the TSPS program in order to load messages in the output queues.

S_LOAD_MESSAGE_QUEUE__SO(-HEADER,MESSAGE) EXTERNAL

This entry is called in order to load messages into the output queue for the SO.

S_UNLOAD_MESSAGE_QUEUE (T) EXTERNAL

This entry is called to unload a message from an output queue in order to transmit it on a data link.

S_STORE_MESSAGE_IN_BUFFER(T,STATUS-,IN_BUFFER) EXTERNAL

This entry will place a message into the TOC program incoming message buffers.

S_INT_BUF_TOC__LOAD (T) RETURNS(3F) EXTERNAL

This entry will return the index of the output queue referenced by T to the calling module.

S_INT_BUF__TOC_UNLOAD (T) EXTERNAL

This entry will place the Input Buffer for the referenced office into a preselected word in PS.

S_INT_BUF_TOC__POS_DISPLAY(P,T,NO_DISPLAY) EXTERNAL

Parameter:

NO_DISPLAY

A label used in an alternate return.

This entry is used as a means of determining if a selected position has an active display.

Exits and Outputs:

All of the entries eventually pass control back to the calling modules. Each of the internal routines will modify in some way the previously described data base. The only outside calls that this module makes is in cases of errors or for maintenance.

Data Base:

RR__TO_RECY_MC_COMMON

This is the referential data for placing "parameters" indicative of data link status prior to a call to the maintenance program.

MR__SMA_SYN_INTERFACE

This is the referential data for passing parameters to the SMA program.

MODULES USED:

M_SMA_ICR__MISC(PARM1) EXTERNAL

Parameter:

PARM1

This is an indication of the problem that caused this call.

This entry is made when the output queue (T) has overflowed and resulted in lost messages. A count is made on the number of times this call is made.

R_TO_RECY_TOMCI EXTERNAL IS.P0

This call is made for all errors encountered in the processing of the data link and when the maintenance programs want call processing real time. There are no parameters passed, however, PS words are used to store pertinent data.

DESCRIPTIONS:

GENERAL:

This module is comprised of eight submodules each of which is designed to perform a specialized function. The exterior procedure S_TRAF_OF-F_CON__DATA_LINK includes all of the necessary data on a global scale in relation to the later included program submodules. At this level is also included the referential data for TOC recovery and SMA interfaces. The submodules are described as follows:

1. S_DATA_LINK_CONTROL

This is the entry where the MAIN program periodically calls this section of the TOC program. The modules purpose is to scan all of the equipped traffic offices to look for messages that have been received from the TOC's. Both the unload and load functions are determined in this routine but the actual functions are carried out in other routines. In all cases, provided an office is accessible, an outgoing message will always be sent.

2. S_UNLOAD_DATA_LINK

This module is called when S_DATA_LINK_CONTROL finds that a non-dummy message has been received. The routine will qualify the message by degrees before passing it on to the input storage buffers for decoding. If the message does not fit all of the criteria set up for it, that message will be rejected and a report of it will be passed to the TOC recovery program.

3. S_STORE_MESSAGE_IN_BUFFER

This module stores the qualified message into an input buffer which will be read at a later time by the module S_KEY_SCAN_ROUTINE. That module will attempt to decode the message.

4. S_LOAD_DATA_LINK

This module will load a message on the output buffer of the TOM for tansmission to the TOC. If a valid lamp message is not awaiting transmission then a "dummy" message is sent. Each equipped and operational traffic office will be sent a message every time the Data Link program is invoked by the MAIN program.

5. S_UNLOAD_MESSAGE_QUEUE

This module will load a (non dummy) message from the output queue for transmission, if one is available.

6. S_LOAD_MESSAGE_QUEUE

This module will load a message into the output queue of the indicated office.

7. S_INT_BUF_TOC.

This module is a means of passing the status of the TOC data as required by diagnostic programs.

8. S_DATA_LINK_MAINT

This module is called from various places in the Data Link program in order to pass data to the TOC recovery program as a report of errors incurred in message processing.

DETAILED:

MODULES:

S_DATA_LINK_CONTROL

This module controls the flow of traffic on the data links. Associated with each Traffic Office are two data links. Each data link is composed of an output buffer (DTR) and its control bit (DLT) and two input buffers (DRA and DRB) and their control bits (DLA, DLB, DMB and BCF). The normal state of a TOC is to have one data link operating and the second data link in a stand by mode. The purpose of this module is to determine on a per TOC basis if there are any errors that have occurred in the I/O Operation and if there are any messages to be unloaded. Prior to scanning each TOC for work, it must be determined what kinds of conditions are present. If it is found that at least one equipped office is marked "Maintenance Busy" (inaccessible) or that Bose-Chaudhuri error detection has found a mutilated message in one (or more) of the data links, then this routine will recursively test each office for those two cases as well as normal message receipts. When the above case is not rue, then it will be further determined if there have been any valid non-dummy message received. This results in a scan of each office with the intention of unloading a message. When there is a clear indication of no TOC's being maintenance busy or BC errors and no message being received, then this routine checks each office for a "dummy message" received. If none is found for an office this is reported to the TOC recovery program as the syndrome NO_MESSAGE_RECEIVED. It should be noted, that a dummy message is used to keep the active data link in constant operation as a means of error check and control.

This routine never actually looks into the I/O buffers in the TOM for confirmation of receipt, but rather it tests a group of control bits in the last word of the TOM that indicate the status of their associated buffers. A traffic office that is found to be maintenance busy is skipped without any further checking. An indication of a BC failure will cause a request for retransmission of the expected message. No attempt will be made to unload the mutilated message. If either the two input buffers have a message without a BCF indication, the module S_UNLOAD_DATA_LINK will be called to do the job of unloading the message. Upon return of control from the unload module, the module S_LOAD_DATA_LINK is called to load a message in the output buffer. Each office is scanned in the same manner starting with the highest numbered equipped TO.O. and working down to the Service Observing office (T.O.0). At completion of checking all traffice office data links associated within a TOM, the control bits are reset to allow new messages to be received. The TOM represents only one copy data link for five offices. Therefore if the number of equipped offices is greater than five it is necessary to work with four rather than two TOM's. Each office can have either copy data link active independent of the other offices. Based on this fact, it is conceivable that the office scan will require simultaneous handling of both TOM copies.

The TOC recovery program is called by calling module S_DATA_LINK_MAINT which relays the pertinent data to that program. This module will call S_DATA_LINK_MAINT when no message has been received and when a BC failure is detected. The call is made under the syndrome BC_FAIL. Before module S_DATA_LINK_CONTROL returns control back to the MAIN program, it will determine if the TOC recovery program is in need of call processing real time. If so then control is passed to recovery. At this return this routine is then terminated by returning to MAIN program.

request from the traffice office. In this case the third level subroutine RETRANSMISSION_REQUEST_FROM_TOC is called. The output _Q_TOC(T) will be backed up to the message requested. This cannot be greater then seven messages back or not past the index of the last message loaded into the queue. An indicator will be set to "remind" the load routine to mark the next outgoing message as a retransmitted one. The RMF will be set to 1. (2) An incorrect sequence number. If this is so the load module will form a retransmission request to ask the TOC to send the message that was expected. (3) A normal message which will be unloaded and tested further for a possible maintenance message. These come in two forms (1) PSR- bit 22 of the message is set to 1. (2) MRG - POS no. of 0. Both of these messages will be passed on to the recovery program. A non maintenance message will then be passed to module S_STORE_MESSAGE_IN_BUFFER for storage. The above cases are searched for only if the data link is not in a retransmission mode. If it is in this mode then the link will be waiting for a retransmitted message from the TOC. A received message with a

TRAFFIC OFFICE HYBRID MATRIX

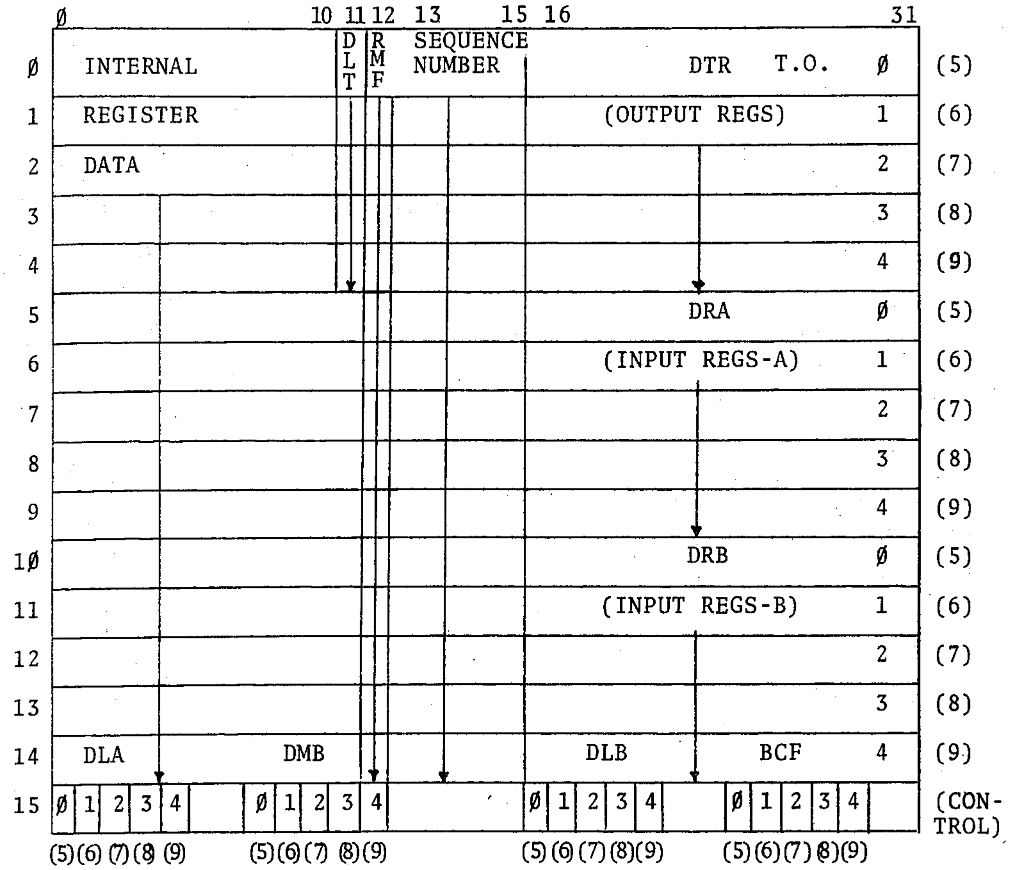

S_UNLOAD_DATA_LINK

The purpose of this module is to unload messages from the active copy data link. There are two input message buffers, DRA and DRB. This mdoule is called on a per TOC basis and it will be entered through one of two entries. The entry call is determined by which data link copy (0 or 1) is active. The subroutine PROCESS_MESSAGE is called which examines the message to determine if it is (1) a message retransmission RMF = 1 indicates retransmitted message. If a message has an RMF - 0, it will be ignored. The data link will wait for 4 message scans before giving up trying to receive it, and it will call maintenance. The message at hand will be accepted and the link mode will be made normal. There is also a possibility of both input buffers being loaded. In this case both messages will be processed first, and then their sequence numbers compared. The message with the lowest number is stored first. In this way message transposition is prevented.

MAINTENACE CALLS from S_UNLOAD_DATA_LINK This module will call S_DATA_LINK_MAIN for seven reasons.

1. DM — A DMB set to 1 with a non-dummy message received.
2. SN — A sequence number failure.
3. CF — A control bit failure.
4. RR — A retransmission request from the TOC
5. A retransmission request failure.
6. — A position status response message.
7. MRG — A maintenance message.

S_STORE_MESSAGE_IN BUFFER

The purpose of this subroutine is to place messages from the data link input buffers into the TOC program incoming message store "INPUT_BUFFER_TOC(T)". Each TOC has associated with it one word in PS representing two message buffers. Buffer 1 (left half) will alway contain the "oldest message" and Buffer 2 (right half) will always contain the "newest message". If two messages are to be loaded into the buffers at the same time, their sequence numbers are compared and the message with the smaller number is loaded first to BUFFER 1 to prevent transposition of messages.

One last test is made on the message before loading. The position number is checked for legality. If it is greater than the last equipped position, the message is not loaded and a call is made to module S_DATA__LINK_MAINT with the syndrome ILL_POS.

S_LOAD_DATA_LINK

The purpose of this module is load messages on the active data link. The message will be one of three types.

1. Those unloaded from the output queue in PS and intended for a specific lamp field on a position
2. Dummy message which indicate that the output queue is empty.
3. A retransmitted message which results from the TOC receiving a mutilated message and requesting a retransmission of that message.

There are two entries to this routine. The one that is invoked by the calling module is dependent on which of the data link copies, associated with the traffic office in question, is active.

Before any processing is done, the output buffer, DTR will be tested to see if the DLT bit has been reset. This will indicate that the previously loaded message has been sent to the T.O. That bit still being set will be a sign that an error state exists in the buffer. A call to S_DATA_LINK_MAINT will be made with the syndrome DLT_STILL_SET. Normal processing consists of testing first for the type of message previously sent. If that message was a lamp reset type, a dummy will automatically follow in order to allow the hardware time react to the command. Otherwise the next step is to determine the need for sending a request for retransmission. The data field DATA_LINK_RETRANSMISSION NEED is tested. If there is a need, then the sequence number of the next expected message is retrieved and used to form a "retransmission request message".

A "normal" message will be unloaded from the output queue (T) if one is available. This is done by calling module S_UNLOAD_MESSAGE_QUEUE. When the queue is empty, a dummy message (all zeros) will be loaded in its stead. When a non dummy message is loaded into the output buffer, it is determined if that message is a retransmitted one. A field in DATA LINK_RETRANSMISSION.NEED indicates this. If it is so the "RMF" bit in DTR will be set. The next outgoing sequence number is affixed to the message. Loading the message consists of writing the formatted message (DLT + RMF + SEQ NO. + MESSAGE) into the TOM output buffer D T R. Then a return of control is made to the calling module.

The various outgoing message formats are as follows:

1. NORMAL - DLT = 1, RMF = 0, SEQ No. = 1 - 7, MESSAGE = POS NO. & LAMP COMMAND
2. DUMMY - DLT = 1, RMF = 0, SEQ No. = 0, MESSAGE = 0
3. RETRANSMITTED - DLT = 1,RMF=1,SEQ No. - 1 — 7 (REQUESTED) MESSAGE = POS NO. AND LAMP COMMAND
4. REQUEST FOR RETRANSMISSION = DLT = 1, RMF = 0, SEQ, NO. = 0 MESSAGE = SEQ NO. (REQUESTED + 1000)

S_UNLOAD_MESSAGE_QUEUE

The purpose of this subroutine is to unload a message from the message queue OUTPUT_Q_TOC(T). The message are unload in a sequential manner and an index of the "Last Out" number (0–63) is kept in the QCONTROL word. A comparison of the "Last In" index and the "Last Out" index indicates whether there is a message to be unloaded or not. The case Last In = Last Out indicates an empty queue. If the queue is empty a dummy message (all zeros) is loaded into the message register. If there is a message to be unloaded, the Last Out index is incremented and the message is withdrawn from the queue. The message is passed (not a function reference) back to the calling module in a preselected register.

S_LOAD_MESSAGE_QUEUE

The function of this module is to load messages into the OUTPUT_Q_TOC(T) for transmission on the data link output buffers. In this case of normal and monitored messages, three parameters (MESSAGE, P,T) are passed to this module. The loaded message is a concatenation of the parameters MESSAGE and P. The appropriated queue is indexed by parameter T.

When the position is being monitored, the parameter MESSAGE is combined with the number of the monitor position to form a second message which is loaded into OUTPUT_Q_TOC immediately following the normal message.

A message for the Service Observation office (TOC0) is a combination of the SO parameters MESSAGE and HEADER. HEADER is the identity of the SO trunk and SO position in the SO office. This message, since it is for TOC 0, is always loaded into the OUTPUT_Q_TOC (0).

If while attempting to load a message, the queue is found to be full, that message (NORMAL, MONITOR or SO) shall be lost and a call to the SMA program shall be made to record this fact by pegging a miscellaneous fault counter. Each message that is loaded increments the index Last-In to indicate the number of messages that are in the queue.

S_INT_BUF_TOC

This module will act as an interface for programs that wish to know status of the I/O buffers, in the TOC program, and the position status for a T.O. This routine will give, depending on the entry called, (1) the index (OUTPUT Q TOC. Q CONTROL) of the output queue of a specified Traffic Office, (2) contents of the input buffer (INPUT_BUF_TOC(T)) for a specified Traffic Office and (3) the display state for a specified position.

S_DATA_LINK_MAINT

The purpose of this routine is to receive reports of error from various points in the data link program. The entry called is indicative of the problem being reported. There are 11 entires representing 11 syndromes. They are:

1 — BC_FAIL
2 — NO_MSG_REC
3 — SB_FAIL
4 — RTNSM_FAIL
5 — RTNSM_RQST
6 — ILLEG_POS
7 — DLT_STK
8 — CON_BIT_FAIL
9 — DMB_STK_AT_1
10 — MRG_MSG

This module will set the parameters up into TOC recovery data base. The necessary data passed is (1) SYNCROME (2) T.O. No. (3) POS NO. (4) MESSAGE (5) SEQ NO.

Finally a call is made to module R_TO_RECY_TOMCI which will act on the data received.

We claim:

1. A full duplex data transmission arrangement between a local terminal and a remote terminal, each terminal having a transmitter and a receiver, for transmitting data messages, each message having a format which includes a retransmitted message flag bit position, a sequence number position, and a principal data position;

message buffer means coupled to each transmitter to store at least N messages, sequence numbering means coupled to each message buffer means for numbering messages in sequence from 1 to N and then back to 1, whereby the sequence number is transmitted in the sequence number position as a part of each message;

error check means coupled to each receiver to check the content of received messages and provide an error indication if the message content is not as expected;

retransmission request means coupled to each receiver which responsive to said error indication supplies a retransmission request signal to the transmitter at the receiving/error indicating terminal;

means coupled to each transmitter responsive to the retransmission request signal to send a retransmission request message with sequence number zero in the sequence number position to the sending/error originating terminal and the data comprising a given code plus the sequence number expected in the principal data position;

retransmission means coupled to each transmitter which responsive to the retransmission request message causes retransmission of the message from the error originating to the error indicating terminal having the expected sequence number and setting the retransmitted message flag bit, followed by transmission of all subsequent messages in sequence whether or not they have already been transmitted;

means coupled to each receiver at the receiving/error indicating terminal to reject all messages received following said request signal which do not have the retransmitted message flag bit set until the retransmitted message is received with said flag bit set and having the exposed sequence number, and to then receive subsequent messages normally.

2. A data transmission arrangement as claimed in claim 1, where coupled to each receiver there is means to count the number of messages rejected because said retransmitted message flag bit was not set after a retransmission request, and reinitiate means coupled to each receiver to again initiate the retransmission signal if the number of rejected messages equals a predetermined number.

3. A data transmission arrangement as claimed in claim 2, wherein the remote terminal includes a sequence counter coupled to said remote receiver and error check means with means to increment it upon correct receipt of each message having a sequence number other than zero, wherein said error check means includes means to compare the sequence number of a message being received with the count in said sequence counter and to provide said error indication if the comparison shows different numbers, a receipt fault indicator bistable device (RFI) with means to set it to indicate a fault condition in response to said error indication, wherein said means to count the number of messages rejected comprises a fault counter and means to increment it for each message received while said receipt fault indicator device is set and the retransmitted message flag bit is not set or there is an error indication.

4. A data transmission arrangement as claimed in claim 3, wherein said message format further includes a check position for check bits;

wherein a check generator is coupled to each transmitter to produce check bits during transmission and insert them in the message in said check position;

a check generator is coupled to each receiver to produce check bits during message receipt; and said error check means includes means to compare the check bits produced in the receiver terminal with those received in the message and to produce said error indication if there is a difference.

5. A data transmission arrangement as claimed in claim 4, wherein coupled to each transmitter there is means to supply a dummy message having sequence number zero which is transmitted whenever it is time to transmit a message and no actual data message is ready.

6. A data transmission arrangement as claimed in claim 5, further including;

means to transmit messages from the local terminal at regular intervals;

means to transmit a message at the remote terminal for each message received; and means to transmit an idle pattern from each transmitter between messages.

7. A data transmission arrangement as claimed in claim 5, wherein coupled to the local terminal there is a control complex including a stored program computer, and registers which are dual access matrix point, being addressed as memory from the control complex to store information in the registers, or to read information for use by the control complex, and means to store information in the registers or read them from the hardware circuits of the local terminal transmitter and receiver.

8. A data transmission arrangement as claimed in claim 7, wherein the remote terminal further includes operator positions and a key scanner and there is means coupling the transmitter and receiver to said operator positions, transmited messages being derived from said key scanner, with the data identifying a position and a key operation;

and received messages being used for control functions which include lighting lamps at operator positions, the data including position identity and the control function 9. A data transmission arrangement as claimed in claim 8, wherein the positions identified are special position identity numbers which do not relate to actual positions, but are used for other maintenance and control functions, and said given code of a retransmission request message includes one of the special position identities and control function data for the retransmission request; and means at the remote terminal to decode the retransmission request message code and supply a signal to the local terminal transmitter.

* * * * *

UNITED STATES PATENT OFFICE
CERTIFICATE OF CORRECTION

PATENT NO. : 3,876,979

DATED : April 8, 1975

INVENTOR(S) : MELVIN WINN et al

It is certified that error appears in the above-identified patent and that said Letters Patent are hereby corrected as shown below:

Column 56, line 1, "exposed" should be -- expected --

Column 56, line 4, "where" should be -- wherein --

Signed and sealed this 15th day of July 1975.

(SEAL)
Attest:

RUTH C. MASON
Attesting Officer

C. MARSHALL DANN
Commissioner of Patents
and Trademarks